United States Patent
Padovano

(10) Patent No.: US 6,606,690 B2
(45) Date of Patent: Aug. 12, 2003

(54) SYSTEM AND METHOD FOR ACCESSING A STORAGE AREA NETWORK AS NETWORK ATTACHED STORAGE

(75) Inventor: Michael Padovano, Englishtown, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 279 days.

(21) Appl. No.: 09/785,473

(22) Filed: Feb. 20, 2001

(65) Prior Publication Data

US 2002/0156984 A1 Oct. 24, 2002

(51) Int. Cl.⁷ .............................................. G06F 12/00
(52) U.S. Cl. ........................ 711/148; 711/170; 709/213; 709/218; 709/220; 709/249
(58) Field of Search ................................. 709/213, 214, 709/215, 218, 219, 220, 221, 249; 711/148, 151, 153, 154, 156, 165, 170, 171, 172, 173

(56) References Cited

U.S. PATENT DOCUMENTS

| | | | |
|---|---|---|---|
| 4,274,139 A | 6/1981 | Hodgkinson et al. | 364/200 |
| 4,404,647 A | 9/1983 | Jones et al. | 364/900 |
| 4,611,298 A | 9/1986 | Schuldt | 364/900 |
| 4,654,819 A | 3/1987 | Stiffler et al. | 364/900 |
| 4,688,221 A | 8/1987 | Nakamura et al. | 371/13 |
| 4,701,915 A | 10/1987 | Kitamura et al. | 371/13 |
| 4,942,579 A | 7/1990 | Goodlander et al. | 371/51 |
| 4,996,687 A | 2/1991 | Hess et al. | 371/10.1 |
| 5,051,887 A | 9/1991 | Berger et al. | 364/200 |
| 5,129,088 A | 7/1992 | Auslander et al. | 395/700 |
| 5,136,523 A | 8/1992 | Landers | 395/54 |
| 5,138,710 A | 8/1992 | Kruesi et al. | 395/575 |
| 5,155,845 A | 10/1992 | Beal et al. | 395/575 |
| 5,157,663 A | 10/1992 | Major et al. | 371/9.1 |
| 5,167,011 A | 11/1992 | Priest | 395/54 |
| 5,175,849 A | 12/1992 | Schneider | 395/600 |
| 5,185,884 A | 2/1993 | Martin et al. | 395/575 |
| 5,206,939 A | 4/1993 | Yanai et al. | 395/400 |
| 5,212,784 A | 5/1993 | Sparks | 395/575 |
| 5,212,789 A | 5/1993 | Rago | 395/600 |

(List continued on next page.)

FOREIGN PATENT DOCUMENTS

| | | | |
|---|---|---|---|
| EP | 0 767 427 A2 | 4/1997 | G06F/9/46 |
| WO | WO 92/18931 | 10/1992 | G06F/11/20 |
| WO | WO 99/34297 | 7/1999 | |

OTHER PUBLICATIONS

Symmetrix 3000 and 5000 Enterprise Storage Systems Product Description Guide, EMC Corporation, downloaded in Sep. 2000, from http://www.emc.com/products/product_pdfs/pdg/symm_3_5_pdg.pdf, pp. 1–32.

(List continued on next page.)

Primary Examiner—Do Hyun Yoo
Assistant Examiner—Christian P. Chace

(57) ABSTRACT

A method, system, and apparatus for accessing a plurality of storage devices in a storage area network (SAN) as network attached storage (NAS) in a data communication network is described. A SAN server includes a first interface and a second interface. The first interface is configured to be coupled to the SAN. The second interface is coupled to a first data communication network. A NAS server includes a third interface and a fourth interface. The third interface is configured to be coupled to a second data communication network. The fourth interface is coupled to the first data communication network. The SAN server allocates a first portion of the plurality of storage devices in the SAN to be accessible through the second interface to at least one first host coupled to the first data communication network. The SAN server allocates a second portion of the plurality of storage devices in the SAN to the NAS server. The NAS server configures access to the second portion of the plurality of storage devices to at least one second host coupled to the second data communication network.

37 Claims, 29 Drawing Sheets

U.S. PATENT DOCUMENTS

| | | | |
|---|---|---|---|
| 5,235,601 A | 8/1993 | Stallmo et al. | 371/40.1 |
| 5,257,367 A | 10/1993 | Goodlander et al. | 395/600 |
| 5,263,154 A | 11/1993 | Eastridge et al. | 395/575 |
| 5,276,867 A | 1/1994 | Kenley et al. | 395/600 |
| 5,278,838 A | 1/1994 | Ng et al. | 371/10.1 |
| 5,317,731 A | 5/1994 | Dias et al. | 395/600 |
| 5,325,505 A | 6/1994 | Hoffecker et al. | 395/425 |
| 5,347,653 A | 9/1994 | Flynn et al. | 395/600 |
| 5,357,509 A | 10/1994 | Ohizumi | 371/10.1 |
| 5,367,682 A | 11/1994 | Chang | 395/700 |
| 5,375,232 A | 12/1994 | Legvold et al. | 395/575 |
| 5,390,313 A | 2/1995 | Yanai et al. | 395/425 |
| 5,404,361 A | 4/1995 | Casorso et al. | 371/40.1 |
| 5,430,866 A | 7/1995 | Lawrence et al. | 395/575 |
| 5,430,885 A | 7/1995 | Kaneko et al. | 395/800 |
| 5,432,922 A | 7/1995 | Polyzois et al. | 395/425 |
| 5,435,004 A | 7/1995 | Cox et al. | 395/575 |
| 5,452,420 A | 9/1995 | Engdahl et al. | 395/285 |
| 5,479,615 A | 12/1995 | Ishii et al. | 395/250 |
| 5,481,701 A | 1/1996 | Chambers | 395/600 |
| 5,495,601 A | 2/1996 | Narang et al. | 395/600 |
| 5,497,483 A | 3/1996 | Beardsley et al. | 395/575 |
| 5,504,882 A | 4/1996 | Chai et al. | 395/182.03 |
| 5,519,844 A | 5/1996 | Stallmo | 395/441 |
| 5,522,046 A | 5/1996 | McMillen et al. | 395/200.15 |
| 5,528,759 A | 6/1996 | Moore | 395/200.11 |
| 5,530,845 A | 6/1996 | Hiatt et al. | 395/500 |
| 5,537,533 A | 7/1996 | Staheli et al. | 395/182.03 |
| 5,544,347 A | 8/1996 | Yanai et al. | 395/489 |
| 5,546,535 A | 8/1996 | Stallmo et al. | 395/182.07 |
| 5,546,556 A | 8/1996 | Matsushita | 395/427 |
| 5,559,958 A | 9/1996 | Farrand et al. | 395/183.03 |
| 5,561,815 A | 10/1996 | Takata et al. | 395/833 |
| 5,566,316 A | 10/1996 | Fechner et al. | 395/441 |
| 5,568,628 A | 10/1996 | Satoh et al. | 395/440 |
| 5,568,629 A | 10/1996 | Gentry et al. | 395/441 |
| 5,583,994 A | 12/1996 | Rangan | 395/200.09 |
| 5,596,736 A | 1/1997 | Kerns | 395/404 |
| 5,611,069 A | 3/1997 | Matoba | 395/441 |
| 5,619,694 A | 4/1997 | Shimazu | 395/615 |
| 5,625,818 A | 4/1997 | Zarmer et al. | 395/615 |
| 5,659,787 A | 8/1997 | Schieltz | 395/200.56 |
| 5,664,144 A | 9/1997 | Yanai et al. | 711/113 |
| 5,671,439 A | 9/1997 | Klein et al. | 395/821 |
| 5,673,322 A | 9/1997 | Pepe et al. | 380/49 |
| 5,673,382 A | 9/1997 | Cannon et al. | 395/182.04 |
| 5,680,580 A | 10/1997 | Beardsley et al. | 395/489 |
| 5,684,945 A | 11/1997 | Chen et al. | 395/182.18 |
| 5,692,155 A | 11/1997 | Iskiyan et al. | 395/489 |
| 5,710,885 A | 1/1998 | Bondi | 395/200.54 |
| 5,710,918 A | 1/1998 | Legarde et al. | 395/610 |
| 5,715,393 A | 2/1998 | Naugle | 395/200.11 |
| 5,719,942 A | 2/1998 | Aldred et al. | 380/49 |
| 5,720,027 A | 2/1998 | Sarkozy et al. | 395/182.04 |
| 5,732,238 A | 3/1998 | Sarkozy | 395/440 |
| 5,737,743 A | 4/1998 | Ooe et al. | 711/112 |
| 5,740,397 A | 4/1998 | Levy | 395/441 |
| 5,742,792 A | 4/1998 | Yanai et al. | 395/489 |
| 5,745,789 A | 4/1998 | Kakuta | 395/841 |
| 5,748,897 A | 5/1998 | Katiyar | 395/200.49 |
| 5,761,410 A | 6/1998 | Martin et al. | 395/183.18 |
| 5,761,507 A | 6/1998 | Govett | 395/684 |
| 5,764,913 A | 6/1998 | Jancke et al. | 395/200.54 |
| 5,765,186 A | 6/1998 | Searby | 711/100 |
| 5,765,204 A | 6/1998 | Bakke et al. | 711/202 |
| 5,768,623 A | 6/1998 | Judd et al. | 395/857 |
| 5,771,367 A | 6/1998 | Beardsley et al. | 395/489 |
| 5,774,655 A | 6/1998 | Bloem et al. | 395/200.5 |
| 5,774,680 A | 6/1998 | Wanner et al. | 395/290 |
| 5,784,703 A | 7/1998 | Muraoka et al. | 711/173 |
| 5,787,304 A | 7/1998 | Hodges et al. | 395/821 |
| 5,787,459 A | 7/1998 | Stallmo et al. | 711/112 |
| 5,787,470 A | 7/1998 | DeSimone et al. | 711/124 |
| 5,787,485 A | 7/1998 | Fitzgerald et al. | 711/162 |
| 5,790,774 A | 8/1998 | Sarkozy | 395/182.04 |
| 5,805,919 A | 9/1998 | Anderson | 395/821 |
| 5,809,328 A | 9/1998 | Noagles et al. | 395/825 |
| 5,809,332 A | 9/1998 | Vishlitzky et al. | 395/835 |
| 5,812,754 A | 9/1998 | Lui et al. | 395/182.04 |
| 5,812,784 A | 9/1998 | Watson et al. | 395/200.57 |
| 5,819,020 A | 10/1998 | Beeler, Jr. | 395/182.03 |
| 5,828,475 A | 10/1998 | Bennett et al. | 359/139 |
| 5,828,820 A | 10/1998 | Onishi et al. | 395/182.04 |
| 5,832,088 A | 11/1998 | Nakajima et al. | 380/22 |
| 5,835,718 A | 11/1998 | Blewett | 395/200.48 |
| 5,835,764 A | 11/1998 | Platt et al. | 395/671 |
| 5,842,224 A | 11/1998 | Fenner | 711/202 |
| 5,848,251 A | 12/1998 | Lomelino et al. | 395/309 |
| 5,850,522 A | 12/1998 | Wlaschin | 395/200.45 |
| 5,852,715 A | 12/1998 | Raz et al. | 395/200.31 |
| 5,857,208 A | 1/1999 | Ofek | 707/204 |
| 5,857,213 A | 1/1999 | Benhase et al. | 711/112 |
| 5,873,125 A | 2/1999 | Kawamoto | 711/202 |
| 5,889,935 A | 3/1999 | Ofek et al. | 395/182.04 |
| 5,893,919 A | 4/1999 | Sarkozy et al. | 711/114 |
| 5,894,554 A | 4/1999 | Lowery et al. | 395/200.33 |
| 5,897,661 A | 4/1999 | Baranovsky et al. | 711/170 |
| 5,901,280 A | 5/1999 | Mizuno et al. | 395/182.04 |
| 5,901,327 A | 5/1999 | Ofek | 395/825 |
| 5,909,540 A * | 6/1999 | Carter et al. | 714/4 |
| 5,909,692 A | 6/1999 | Yanai et al. | 711/4 |
| 5,911,150 A | 6/1999 | Peterson et al. | 711/162 |
| 5,911,779 A | 6/1999 | Stallmo et al. | 714/6 |
| 5,912,897 A | 6/1999 | Steinbach | 370/467 |
| 5,926,833 A | 7/1999 | Rasoulian et al. | 711/147 |
| 5,933,614 A | 8/1999 | Tavallaei et al. | 395/309 |
| 5,933,653 A | 8/1999 | Ofek | 395/826 |
| 5,940,865 A | 8/1999 | Ohzora et al. | 711/167 |
| 5,941,972 A | 8/1999 | Hoese et al. | 710/129 |
| 5,948,108 A | 9/1999 | Lu et al. | 714/4 |
| 5,956,750 A | 9/1999 | Yamamoto et al. | 711/167 |
| 5,959,994 A | 9/1999 | Boggs et al. | 370/399 |
| 5,960,216 A | 9/1999 | Vishlitzky et al. | 395/894 |
| 5,961,593 A | 10/1999 | Gabber et al. | 709/219 |
| 5,969,841 A | 10/1999 | McGinley et al. | 359/163 |
| 5,974,566 A | 10/1999 | Ault et al. | 714/15 |
| 5,978,890 A | 11/1999 | Ozawa et al. | 711/163 |
| 5,983,316 A | 11/1999 | Norwood | 711/112 |
| 5,987,627 A | 11/1999 | Rawlings, III | 714/48 |
| 6,003,030 A | 12/1999 | Kenner et al. | 707/10 |
| 6,003,065 A | 12/1999 | Yan et al. | 709/201 |
| 6,006,017 A | 12/1999 | Joshi et al. | 395/200.11 |
| 6,009,478 A | 12/1999 | Panner et al. | 710/5 |
| 6,012,120 A | 1/2000 | Duncan et al. | 710/129 |
| 6,014,676 A | 1/2000 | McClain | 707/204 |
| 6,014,731 A | 1/2000 | Totsuka et al. | 711/202 |
| 6,021,436 A | 2/2000 | Garrett | 709/224 |
| 6,029,000 A | 2/2000 | Woolsey et al. | 395/705 |
| 6,038,379 A | 3/2000 | Fletcher et al. | 395/200.6 |
| 6,038,630 A | 3/2000 | Foster et al. | 710/132 |
| 6,041,381 A | 3/2000 | Hoese | 710/129 |
| 6,044,081 A | 3/2000 | Bell et al. | 370/401 |
| 6,047,350 A | 4/2000 | Dutton et al. | 710/129 |
| 6,049,819 A | 4/2000 | Buckle et al. | 709/202 |
| 6,049,828 A | 4/2000 | Dev et al. | 709/224 |
| 6,052,727 A | 4/2000 | Kamalanathan | 709/224 |
| 6,052,736 A | 4/2000 | Ogle et al. | 709/244 |
| 6,052,759 A | 4/2000 | Stallmo et al. | 711/114 |
| 6,052,797 A | 4/2000 | Ofek et al. | 714/6 |
| 6,055,602 A | 4/2000 | McIlvain et al. | 711/112 |
| 6,057,863 A | 5/2000 | Olarig | 345/520 |

| | | | |
|---|---|---|---|
| 6,061,356 A | 5/2000 | Terry | 370/401 |
| 6,061,687 A | 5/2000 | Wooten | 707/101 |
| 6,063,128 A | 5/2000 | Bentley et al. | 703/6 |
| 6,065,085 A | 5/2000 | Odenwald, Jr. et al. | 710/129 |
| 6,065,087 A | 5/2000 | Keaveny et al. | 710/129 |
| 6,065,096 A | 5/2000 | Day et al. | 711/114 |
| 6,065,100 A | 5/2000 | Schafer et al. | 711/137 |
| 6,066,181 A | 5/2000 | DeMaster | 717/5 |
| 6,073,209 A | 6/2000 | Bergsten | 711/114 |
| 6,073,222 A | 6/2000 | Ohran | 711/162 |
| 6,081,834 A | 6/2000 | Brandt et al. | 709/213 |
| 6,085,193 A | 7/2000 | Malkin et al. | 707/10 |
| 6,098,128 A | 8/2000 | Velez-McCaskey et al. | 710/65 |
| 6,098,146 A | 8/2000 | Bouvier et al. | 711/100 |
| 6,101,497 A | 8/2000 | Ofek | 707/10 |
| 6,148,412 A | 11/2000 | Cannon et al. | 714/6 |
| 6,167,358 A * | 12/2000 | Othmer et al. | 702/188 |
| 6,300,948 B1 * | 10/2001 | Geller et al. | 345/866 |
| 6,418,478 B1 * | 7/2002 | Ignatius et al. | 709/240 |
| 6,446,141 B1 * | 9/2002 | Nolan et al. | 710/8 |
| 6,487,638 B2 * | 11/2002 | Dawkins et al. | 711/133 |

OTHER PUBLICATIONS

Robertson, Bruce, "New Products Make Replication Easier: An Analysis," Network Computing, The Gale Group, Sep. 1993, p. 99.

Lawrence, Andrew, "Remote Disks: The evolution of remote disk support over public lines means that disks can now be located thousands of kilometers away from the central processor," The Gale Group, IBM System User, vol. 14, No. 2, Feb. 1993, p. 14.

Bobrowski, Steve, "Protecting your data: Overview and Comparison of Backup and Recovery Features in Database Servers," The Gale Group, DBMS, vol. 6, No. 8, Jul., 1993, p. 55.

Patent Abstracts of Japan, Patent No. JP63010286, published Jan. 16, 1988.

Copy of International Search Report Issued Aug. 27, 2001 for PCT/US00/32493, 8 pages.

Vekiarides, Nicos, "Fault-Tolerant Disk Storage and File Systems Using Reflective Memory," IEEE, Proceedings of the 28th Annual Hawaii International Conference on System Sciences, 1995, pp. 103–113.

Vekiarides, Nicos, "Implementation of a Fault-Tolerant Disk Storage System Using Reflective Memory," date and publisher unknown, pp. 1–28.

"Program for Exporting Transmission Control Protocol-Based Services through Firewalls," IBM Corp., IBM® Technical Disclosure Bulletin, vol. 40, No. 12, Dec. 1997, pp. 161–162.

"Product Brief—May 2000: StorageApps' SAN Appliance," The Enterprise Storage Group, 2000, pp. 1–3.

"Enterprise Storage Report: Technical Review," Enterprise Storage Group, www.enterprisestoragegroup.com, vol. 6, date unknown, 5 pages.

Christensen, Brenda, "Building a Storage—Area Network: SANs Boost Performance, Reliability, and Scalability of the Critical Link Between Servers and Storage Devices," Data Communications, Apr. 21, 1998, pp. 67–71.

Jander, Mary, "Launching a Storage–Area Net: High–Speed Storage–Area Networks Help Net Managers Hurl Stored Data Around Quickly– and Take the Load off the LAN and WAN," Data Communications, Mar. 21, 1998, pp. 64–72.

Press Release, HP's High–Speed I/O Business Unit, Hewlett Packard, Aug. 1997, 3 pages.

Press Release, "HP's Tachyon Fibre Channel Controller Chosen by Compaq: Industry–Leading IC to Enable Next-Generation Storage Solutions," Hewlett Packard, Aug. 6, 1997, 2 pages.

Press Release, "HP's Tachyon Family of Fibre Channel Protocol Controllers to be Part of Compaq's Next–Generation Storage Solutions," Hewlett Packard, Dec. 7, 1998, 2 pages.

Mace, Scott, "Serving Up Storage," The McGraw–Hill Companies, Inc., Byte, vol. 23, No. 1, Jan. 1998, p. 72.

Kennedy, Carla, "Fibre Channel Speeds the Convergence of Network and Storage," Storage Management Solutions, Nov. 1997, pp. 28–31.

Fleming, Vincent, "Raid in Clusters," Storage Management Solutions, Mar. 1998, pp. 51–53.

Smith, Brian R., "How Will Migrating to Fibre Channel Occur?" Computer Technology Review, date unknown, pp. 92, 94, 95.

Snively, Robert, "SCSI applications on Fibre Channel," High–Speed Fiber Networks and channels II, The Society of Photo–Optical Instrumentation Engineers, Proceedings SPIE– The International Society for Optical Engineering, Sep. 8–9, 1992, vol. 1784, pp. 104–113.

Copy of International Search Report issued Oct. 9, 2001 for PCT/US00/42337, 7 pages.

Bannister, Dick, "Compaq Storage Resource Manager," Evaluator Group Inc., Storage News, vol. 2, Issue 4, Apr. 2000.

PCT International Search Report for International application No. PCT/US 01/05385, Date of completion of the search Nov. 22, 2002, (5 pages).

Greg Schulz, SAN and NAS; Complementary Technologies SAN and NAS provide Storage and Data Sharing, May 1, 2000, (11 pages).

* cited by examiner

2600

2602 — The IP address upon which the request arrived is determined

2604 — The NAS volumes, NFS exports, and CIFS exports files are checked for any modifications since the last heartbeat message was received 2606 — If it was determined in step 2602 that any of those files have been modified, the modified file is sent in a response to the message 2608 — If any of the NFS locking status files have been modified since the last heartbeat message, the modified NFS locking status file(s) are sent in a response to the message

2902 — The public IP address of the NAS server is brought down

2904 — File systems in the NFS exports file are unexported

2906 — File systems in CIFS exports file are unexported

2908 — File systems in the NAS volumes file are unexported

2910 — The heartbeat to the NAS server is re-started

FIG. 29

SYSTEM AND METHOD FOR ACCESSING A STORAGE AREA NETWORK AS NETWORK ATTACHED STORAGE

CROSS-REFERENCE TO RELATED APPLICATIONS

The following application of common assignee is related to the present application, and is herein incorporated by reference in its entirety:

"Internet Protocol Data Mirroring," Ser. No.09/664,499 Attorney Docket No. 1942.0040000, filed Sep. 18, 2000.

BACKGROUND OF THE INVENTION

1. Field of the Invention

The invention relates generally to the field of storage area networks, and more particularly to providing access to a storage area network as network attached storage.

2. Background Art

Network attached storage (NAS) is a term used to refer to storage elements or devices that connect to a network and provide file access services to computer systems. NAS devices attach directly to networks, such as local area networks, using traditional protocols such as Ethernet and TCP/IP, and serve files to any host or client connected to the network. A NAS device typically consists of an engine, which implements the file access services, and one or more storage devices, on which data is stored. A computer host system that accesses NAS devices uses a file system device driver to access the stored data. The file system device driver typically uses file access protocols such as Network File System (NFS) or Common Internet File System (CIFS). NAS devices interpret these commands and perform the internal file and device input/output (I/O) operations necessary to execute them.

Because NAS devices independently attach to the network, the management of these devices generally occurs on a device-by-device basis. For instance, each NAS device must be individually configured to attach to the network. Furthermore, the copying of a NAS device for purposes of creating a back-up must be configured individually.

Storage area networks (SANs) are dedicated networks that connect one or more hosts or servers to storage devices and subsystems. SANs may utilize a storage appliance to provide for management of the SAN. For instance, a storage appliance may be used to create and manage back-up copies of the data stored in the storage devices of the SAN by creating point-in-time copies of the data, or by actively mirroring the data. It would be desirable to provide these and other SAN-type storage management functions for storage devices attached to a network, such as a local area network.

BRIEF SUMMARY OF THE INVENTION

The present invention is directed to a system and method for interfacing a storage area network (SAN) with a first data communication network. One or more hosts coupled to the first data communication network can access data stored in one or more of a plurality of storage devices in the SAN. The one or more hosts access one or more of the plurality of storage devices as network attached storage (NAS). A SAN server is coupled to a SAN. A NAS server is coupled to the SAN server through a second data communication network. The NAS server is coupled to the first data communication network. A portion of at least one of the plurality of storage devices is allocated from the SAN server to the NAS server. The allocated portion is configured as NAS storage in the NAS server. The configured portion is exported from the NAS server to be accessible to the one or more hosts coupled to the first data communication network.

In a further aspect of the present invention, a system and method for managing the allocation of storage from a storage area network (SAN) as network attached storage (NAS) to a data communication network, is described. A storage management directive is received from a graphical user interface. A message corresponding to the received storage management directive is sent to a NAS server. A response corresponding to the sent message is received from the NAS server.

In still a further aspect of the present invention, an apparatus for accessing a plurality of storage devices in a storage area network (SAN) as network attached storage (NAS) in a data communication network is described. A SAN server includes a first interface and a second interface. The first interface is configured to be coupled to the SAN. The second interface is coupled to a first data communication network. A NAS server includes a third interface and a fourth interface. The third interface is configured to be coupled to a second data communication network. The fourth interface is coupled to the first data communication network. The SAN server allocates a first portion of the plurality of storage devices in the SAN to be accessible through the second interface to at least one first host coupled to the first data communication network. The SAN server allocates a second portion of the plurality of storage devices in the SAN to the NAS server. The NAS server configures access to the second portion of the plurality of storage devices to at least one second host coupled to the second data communication network.

In still a further aspect of the present invention, a storage appliance for accessing a plurality of storage devices in a storage area network (SAN) as network attached storage (NAS) in a data communication network is described.

A first SAN server is configured to be coupled to the plurality of storage devices in the SAN via a first data communication network. The first SAN server is configured to be coupled to a second data communication network. A second SAN server is configured to be coupled to the plurality of storage devices in the SAN via a third data communication network. The second SAN server is configured to be coupled to a fourth data communication network. A first NAS server is configured to be coupled to a fifth data communication network. The first NAS server is coupled to the second and the fourth data communication networks. A second NAS server is configured to be coupled to the fifth data communication network. The second NAS server is coupled to the second and the fourth data communication networks. The first SAN server allocates a first portion of the plurality of storage devices in the SAN to be accessible to at least one first host coupled to the second data communication network. The first SAN server allocates a second portion of the plurality of storage devices in the SAN to the first NAS server. The first NAS server configures access to the second portion of the plurality of storage devices to at least one second host coupled to the fifth data communication network. The second NAS server assumes the configuring of access to the second portion of the plurality of storage devices by the first NAS server during failure of the first NAS server. The second SAN server assumes allocation of the second portion of the plurality of storage devices by the first SAN server during failure of the first SAN server.

The present invention provides many advantages. These include:

1. Ease of use. A graphical user interface (GUI) of the present invention provides a convenient administrative interface. A system administrator may allocate a NAS file system with a single press of a mouse button.
2. Seamless integration into an existing SAN appliance administrative interface. The NAS functionality may be added as a new window in an existing administrative GUI, for example.
3. Maintaining the benefits of a single appliance. In a preferred embodiment, a single appliance is presented that contains data management function and NAS capabilities.
4. Full use of existing SAN appliance data management functions. The features of a SAN appliance (such as data mirroring, virtualization of storage, and instant snapshot copying of storage) are made available to NAS file systems.
5. High-availability. With multiple NAS server capability, the implementation is resistant to single points of failure.
6. High capacity. The NAS implementation is capable of providing data to a large number of clients. It is capable of providing data to UNIX and Windows hosts.
7. Minimal impact on an existing SAN appliance architecture. The NAS implementation has a minimal impact on any existing SAN appliance software code. Addition of the NAS servers does not appreciably degrade the performance of existing features of the SAN appliance.

Further aspects of the present invention, and further features and benefits thereof, are described below. The accompanying drawings, which are incorporated herein and form a part of the specification, illustrate the present invention and, together with the description, further serve to explain the principles of the invention and to enable a person skilled in the pertinent art to make and use the invention.

BRIEF DESCRIPTION OF THE DRAWINGS/FIGURES

In the drawings, like reference numbers indicate identical or functionally similar elements. Additionally, the left-most digit(s) of a reference number identifies the drawing in which the reference number first appears.

Figure 13A:
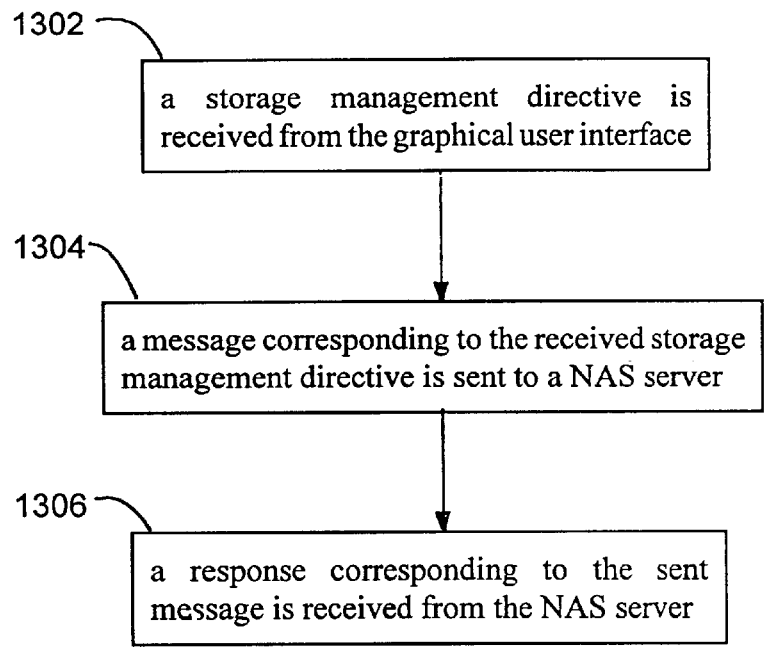
Figure 13B:
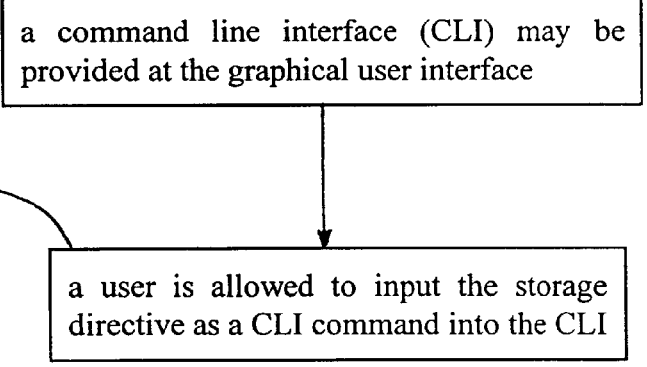

FIGS. 13A–B show a flowchart providing operational steps of an example embodiment of the present invention.

Figure 14A:
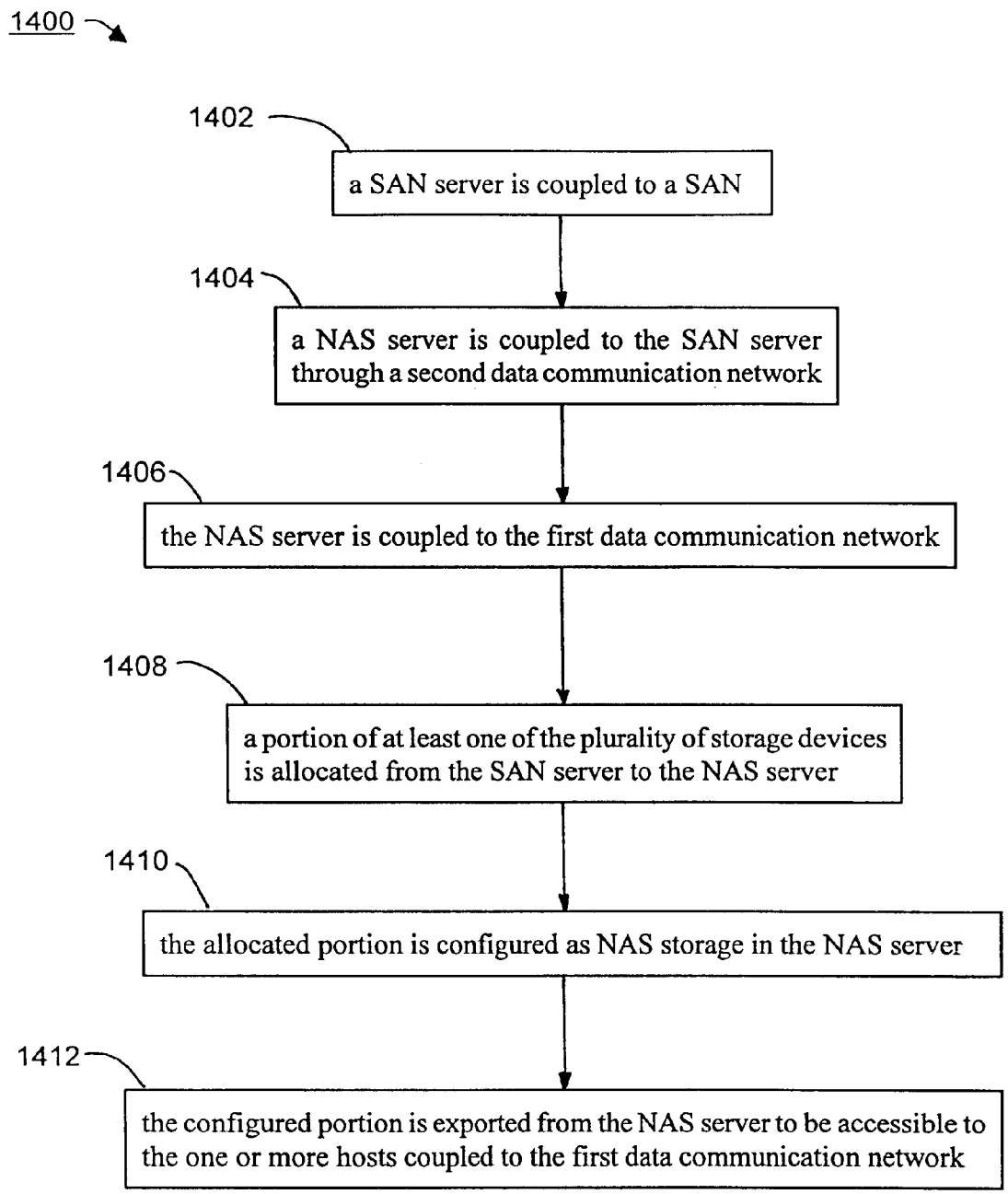
Figure 14B:
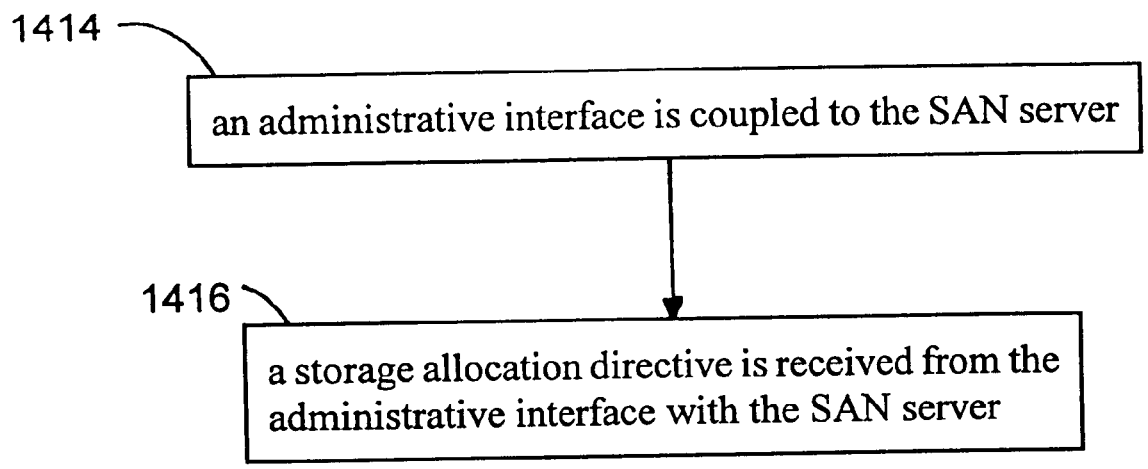

FIGS. 14A–B show a flowchart providing operational steps of an example embodiment of the present invention.

Figure 15:
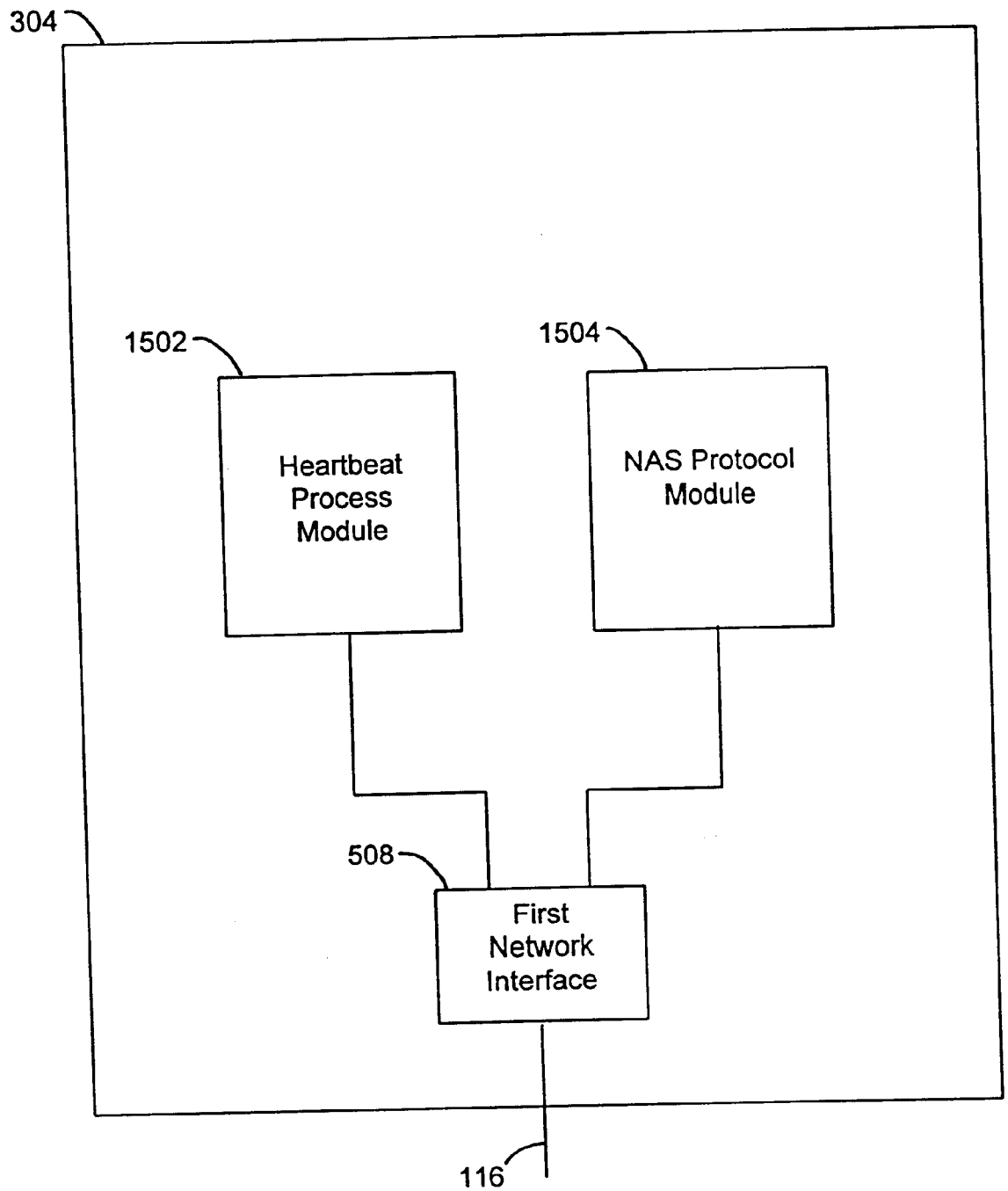

FIG. 15 illustrates a block diagram of a NAS server, according to an exemplary embodiment of the present invention.

FIGS. 16–29 show flowcharts providing operational steps of exemplary embodiments of the present invention.

The present invention will now be described with reference to the accompanying drawings.

DETAILED DESCRIPTION OF THE INVENTION

Table of Contents

| | |
|---|---|
| 1.0 | Overview |
| 2.0 | Terminology |
| 3.0 | Example Storage Area Network Environment |
| | 3.1 Example Storage Appliance |
| 4.0 | Network Attached Storage Embodiments of the Present Invention |
| 5.0 | Storage Appliance Embodiments According to the Present Invention |
| | 5.1 Example SAN Server Embodiments According to the Present Invention |
| | 5.2 Example NAS Server Embodiments According to the Present Invention |
| | 5.3 Administrative Interface of the Present Invention |
| 6.0 | Allocation and Deallocation of NAS Storage |
| | 6.1 Example Protocol for NAS LUN Allocation and De-allocation |
| | 6.2 NAS Server Configuration of Allocated Storage |
| | 6.3 Listing Volumes |
| | 6.4 Unexporting File Systems |
| | 6.5 Exporting File Systems |
| | 6.6 Setting Permissions |
| 7.0 | GUI Command Line Interface |
| 8.0 | Obtaining Statistics |
| 9.0 | Providing High Availability According to The Present Invention |
| | 9.1 NAS Server Configuration |
| |     9.1.1 Configuring NAS Server Addresses |
| | 9.2 NAS Server Boot-up |
| | 9.3 NAS Server Failure and Recovery |
| 10.0 | Example NAS Protocol Directives |
| 11.0 | Example Computer System |
| 12.0 | Conclusion |

1.0 OVERVIEW

The present invention is directed toward providing full storage area network (SAN) functionality in for Network Attached Storage (NAS) that is attached to, and operating in a network. The present invention utilizes a SAN. The SAN may be providing storage to hosts that communicate with the SAN according to Small Computer Systems Interface (SCSI), Fibre Channel, and/or other data communication protocols on a first network. A storage appliance couples the SAN to the hosts. The present invention attaches the storage appliance to a second network, such that storage in the SAN may be accessed by hosts in the second network as one or more NAS devices. The second network may be a local area network, wide area network, or other network type.

According to an aspect of the present invention, the storage appliance provides data management capabilities for an attached SAN. Such data management capabilities may include data mirroring, point-in-time imaging (snapshot) of data, storage virtualization, and storage security. A storage appliance managing a SAN may also be referred to as a SAN appliance. Typically, these functions are controlled by one or more SAN servers within the SAN appliance. According to the present invention, the SAN appliance also provides NAS capabilities, such as access to file systems stored in the SAN over the second network.

According to an aspect of the present invention, NAS functionality is provided by one or more NAS servers within the SAN appliance. The NAS servers are attached to the SAN servers. The SAN servers communicate with the NAS servers using a protocol containing commands that the NAS servers understand. For instance, these commands may direct the NAS servers to allocate and deallocate storage from the SAN to and from the second network.

In a preferred embodiment, the NAS servers appear as separate hosts to the SAN servers. The SAN servers allocate storage to the NAS servers. In turn, the NAS servers allocate the storage to the second network. For instance, storage may be allocated in the form of logical unit numbers (LUNs) to the NAS servers. According to the present invention, the NAS server LUNs are virtualized on the second network, instead of being dedicated to a single host. Thus, the SAN appliance can export LUNs to the entire second network.

According to an embodiment of the present invention, a user, such as a system administrator, can control NAS functions performed by the SAN appliance through an administrative interface, which includes a central graphical user interface (GUI). A GUI presents a single management console for controlling multiple NAS servers.

In accordance with the present invention, the SAN appliance allows storage in a SAN to be accessed as one or more NAS devices. The SAN appliance creates local file systems, and then grants access to those file systems over the second network through standard protocols, such as Network File System (NFS) and Common Internet File System (CIFS) protocols. As such, the present invention unifies local SAN management and provides file systems over the second network.

Terminology related to the present invention is described in the following subsection. Next, an example storage area network environment is described, in which the present invention may be applied. Detailed embodiments of the SAN appliance, SAN server, and NAS server of the present invention are presented in the subsequent sections. Sections follow which describe how storage is allocated and de-allocated, and otherwise managed. These sections are followed by sections which describe configuring a NAS server, and handling failure of a NAS server, followed by a summary of NAS protocol messages. Finally, an exemplary computer system in which aspects of the present invention may be implemented is then described.

2.0 TERMINOLOGY

To more clearly delineate the present invention, an effort is made throughout the specification to adhere to the following term definitions as consistently as possible.

| | |
|---|---|
| Arbitrated Loop | A shared 100 MBps Fibre Channel transport supporting up to 126 devices and 1 fabric attachment. |
| Fabric | One or more Fibre Channel switches in a networked topology. |
| HBA | Host bus adapter; an interface between a server or workstation bus and a Fibre Channel network. |
| Hub | In Fibre Channel, a wiring concentrator that collapses a loop topology into a physical star topology. |
| Initiator | On a Fibre Channel network, typically a server or a workstation that initiates transactions to disk or tape targets. |
| JBOD | Just a bunch of disks; typically configured as an Arbitrated Loop segment in a single chassis. |
| LAN | Local area network; A network linking multiple devices in a single geographical location. |
| Logical Unit | The entity within a target that executes I/O commands. For example, SCSI I/O commands are sent to a target and executed by a logical unit within that target. A SCSI physical disk typically has a single logical unit. Tape drives and array controllers may incorporate multiple logical units to which I/O commands can be addressed. Typically, each logical unit exported by an array controller corresponds to a virtual disk. |
| LUN | Logical Unit Number; The identifier of a logical unit within a target, such as a SCSI identifier. |
| NAS | Network Attached Storage; Storage elements that connect to a network and provide file access services to computer systems. A NAS storage element typically consists of an engine, which implements the file services, and one or more devices, on which data is stored. |
| Point-to-point | A dedicated Fibre Channel connection between two devices. |
| Private loop | A free-standing Arbitrated Loop with no fabric attachment. |
| Public loop | An Arbitrated Loop attached to a fabric switch. |
| RAID | Redundant Array of Independent Disks. |
| SCSI | Small Computer Systems Interface; both a protocol for transmitting large blocks of data and a parallel bus architecture. |
| SCSI-3 | A SCSI standard that defines transmission of SCSI protocol over serial links. |
| Storage | Any device used to store data; typically, magnetic disk media or tape. |
| Switch | A device providing full bandwidth per port and high-speed routing of data via link-level addressing. |
| Target | Typically a disk array or a tape subsystem on a Fibre Channel network. |
| TCP | Transmission Control Protocol; TCP enables two hosts to establish a connection and exchange streams of data; TCP guarantees delivery of data and also guarantees that packets will be delivered in the same order in which they were sent. |
| Topology | The physical or logical arrangement of devices in a networked configuration. |
| UDP | User Datagram Protocol; a connectionless protocol that, like TCP, runs on top of IP networks. Unlike TCP/IP, UDP/IP provides very few error recovery services, offering instead a direct way to send and receive datagrams over an IP network. |
| WAN | Wide area network; a network linking geographically remote sites. |

3.0 EXAMPLE STORAGE AREA NETWORK ENVIRONMENT

In a preferred embodiment, the present invention is applicable to storage area networks. As discussed above, a storage area network (SAN) is a high-speed sub-network of shared storage devices. A SAN operates to provide access to the shared storage devices for all servers on a local area network (LAN), wide area network (WAN), or other network coupled to the SAN.

It is noted that SAN attached storage (SAS) elements can connect directly to the SAN, and provide file, database, block, or other types of data access services. SAS elements that provide such file access services are commonly called Network Attached Storage, or NAS devices. NAS devices can be coupled to the SAN, either directly or through their own network configuration. NAS devices can be coupled outside of a SAN, to a LAN, for example. A SAN configuration potentially provides an entire pool of available storage to each network server, eliminating the conventional dedicated connection between server and disk. Furthermore, because a server's mass data storage requirements are fulfilled by the SAN, the server's processing power is largely conserved for the handling of applications rather than the handling of data requests.

Figure 8:
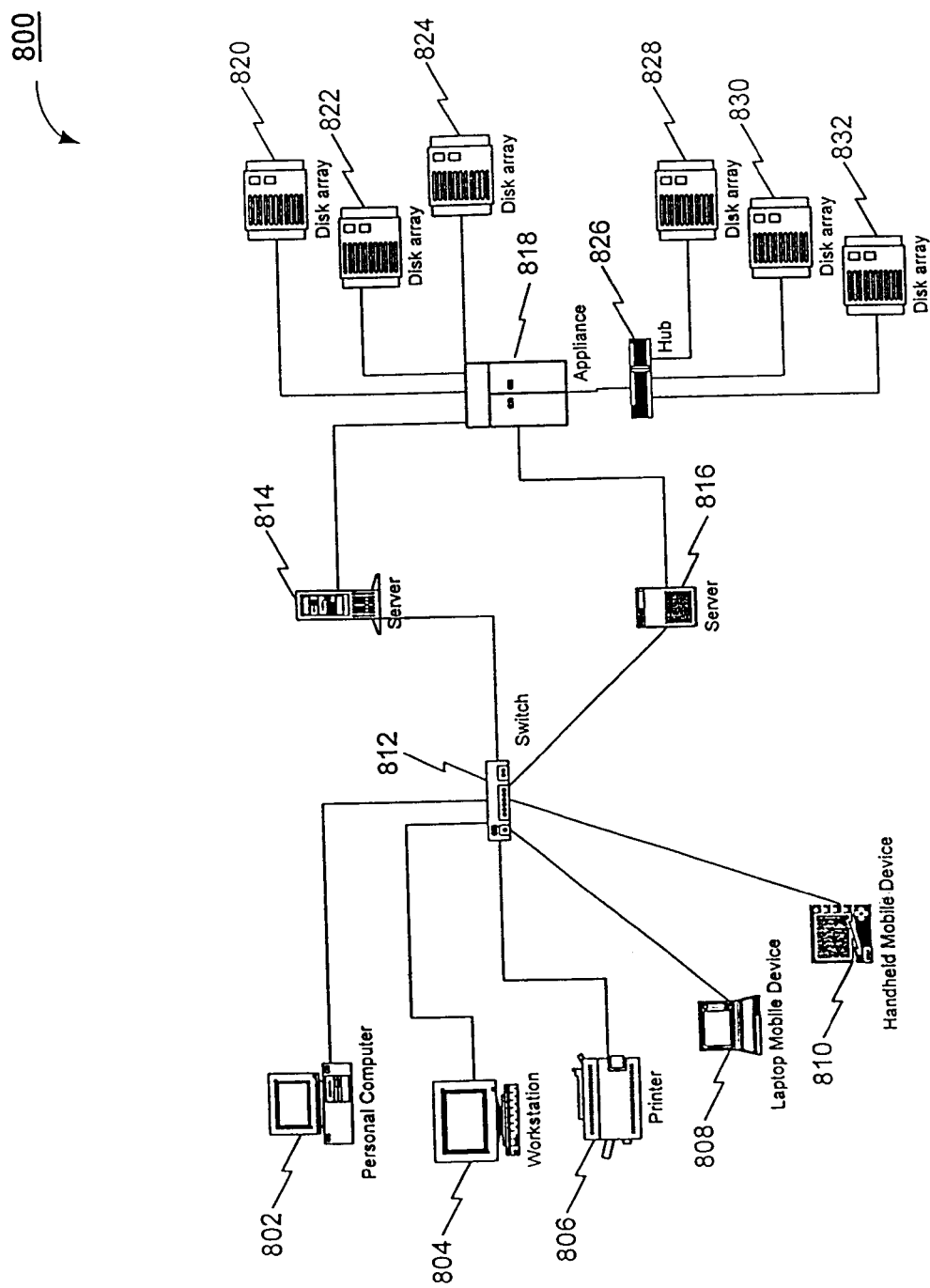
FIG. 8 illustrates an example data communication network, according to an embodiment of the present invention.

FIG. 8 illustrates an example data communication network 800, according to an embodiment of the present invention. Network 800 includes a variety of devices which support communication between many different entities, including businesses, universities, individuals, government, and financial institutions. As shown in FIG. 8, a communication network, or combination of networks, interconnects the elements of network 800. Network 800 supports many different types of communication links implemented in a variety of architectures.

Network 800 may be considered to include an example of a storage area network that is applicable to the present invention. Network 800 comprises a pool of storage devices, including disk arrays 820, 822, 824, 828, 830, and 832. Network 800 provides access to this pool of storage devices to hosts/servers comprised by or coupled to network 800. Network 800 may be configured as point-to-point, arbitrated loop, or fabric topologies, or combinations thereof Network 800 comprises a switch 812. Switches, such as switch 812, typically filter and forward packets between LAN segments. Switch 812 may be an Ethernet switch, fast-Ethernet switch, or another type of switching device known to persons skilled in the relevant art(s). In other examples, switch 812 may be replaced by a router or a hub. A router generally moves data from one local segment to another, and to the telecommunications carrier, such as AT & T or WorldCom, for remote sites. A hub is a common connection point for devices in a network. Suitable hubs include passive hubs, intelligent hubs, and switching hubs, and other hub types known to persons skilled in the relevant art(s).

Various types of terminal equipment and devices may interface with network 800. For example, a personal computer 802, a workstation 804, a printer 806, a laptop mobile device 808, and a handheld mobile device 810 interface with network 800 via switch 812. Further types of terminal equipment and devices that may interface with network 800 may include local area network (LAN) connections (e.g., other switches, routers, or hubs), personal computers with modems, content servers of multi-media, audio, video, and other information, pocket organizers, Personal Data Assistants (PDAs), cellular phones, Wireless Application Protocol (WAP) phones, and set-top boxes. These and additional types of terminal equipment and devices, and ways to interface them with network 800, will be known by persons skilled in the relevant art(s).

Network 800 includes one or more hosts and/or servers. For example, network 800 comprises server 814 and server 816. Servers 814 and 816 provide devices 802, 804, 806, 808, and 810 with network resources via switch 812. Servers 814 and 816 are typically computer systems that process end-user requests for data and/or applications. In one example configuration, servers 814 and 816 provide redundant services. In another example configuration, server 814 and server 816 provide different services and thus share the processing load needed to serve the requirements of devices 802, 804, 806, 808, and 810. In further example configurations, one or both of servers 814 and 816 are connected to the Internet, and thus server 814 and/or server 816 may provide Internet access to network 800. One or both of servers 814 and 816 may be Windows NT servers or UNIX servers, or other servers known to persons skilled in the relevant art(s).

A SAN appliance or device as described elsewhere herein may be inserted into network 800, according to embodiments of the present invention. For example, a SAN appliance 818 may to implemented to provide the required connectivity between the storage device networking (disk arrays 820, 822, 824, 828, 830, and 832) and hosts and servers 814 and 816, and to provide the additional functionality of SAN and NAS management of the present invention described elsewhere herein. Hence, the SAN appliance interfaces the storage area network, or SAN, which includes disk arrays 820, 822, 824, 828, 830, and 832, hub 826, and related networking, with servers 814 and 816.

Network 800 includes a hub 826. Hub 826 is connected to disk arrays 828, 830, and 832. Preferably, hub 826 is a fibre channel hub or other device used to allow access to data stored on connected storage devices, such as disk arrays 828, 830, and 832. Further fibre channel hubs may be cascaded with hub 826 to allow for expansion of the SAN, with additional storage devices, servers, and other devices. In an example configuration for network 800, hub 826 is an arbitrated loop hub. In such an example, disk arrays 828, 830, and 832 are organized in a ring or loop topology, which is collapsed into a physical star configuration by hub 826. Hub 826 allows the loop to circumvent a disabled or disconnected device while maintaining operation.

Network 800 may include one or more switches in addition to switch 812 that interface with storage devices. For example, a fibre channel switch or other high-speed device may be used to allow servers 814 and 816 access to data stored on connected storage devices, such as disk arrays 820, 822, and 824, via appliance 818. Fibre channel switches may be cascaded to allow for the expansion of the SAN, with additional storage devices, servers, and other devices.

Disk arrays 820, 822, 824, 828, 830, and 832 are storage devices providing data and application resources to servers 814 and 816 through appliance 818 and hub 826. As shown in FIG. 8, the storage of network 800 is principally accessed by servers 814 and 816 through appliance 818. The storage devices may be fibre channel-ready devices, or SCSI (Small Computer Systems Interface) compatible devices, for example. Fibre channel-to-SCSI bridges may be used to allow SCSI devices to interface with fibre channel hubs and switches, and other fibre channel-ready devices. One or more of disk arrays 820, 822, 824, 828, 830, and 832 may instead be alternative types of storage devices, including tape systems, JBODs (Just a Bunch Of Disks), floppy disk drives, optical disk drives, and other related storage drive types.

The topology or architecture of network 800 will depend on the requirements of the particular application, and on the advantages offered by the chosen topology. One or more hubs 826, one or more switches, and/or one or more appliances 818 may be interconnected in any number of combinations to increase network capacity. Disk arrays 820, 822, 824, 828, 830, and 832, or fewer or more disk arrays as required, may be coupled to network 800 via these hubs 826, switches, and appliances 818.

Figure 9:
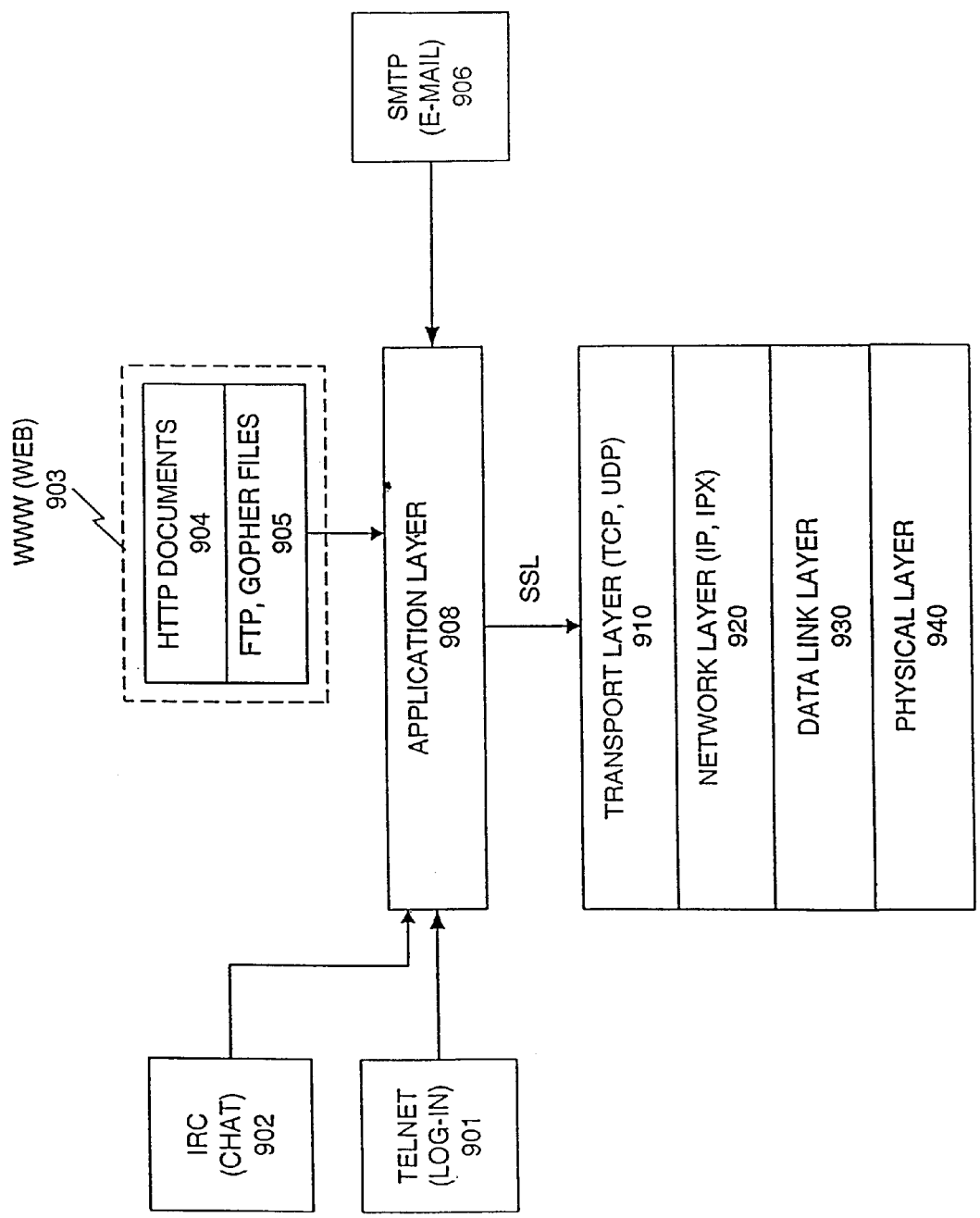
FIG. 9 shows a simplified five-layered communication model, based on an Open System Interconnection (OSI) reference model.

Communication over a communication network, such as shown in network 800 of FIG. 8, is carried out through different layers. FIG. 9 shows a simplified five-layered communication model, based on Open System Interconnection (OSI) reference model. As shown in FIG. 9, this model includes an application layer 908, a transport layer 910, a network layer 920, a data link layer 930, and a physical layer 940. As would be apparent to persons skilled in the relevant art(s), any number of different layers and network protocols may be used as required by a particular application.

Application layer 908 provides functionality for the different tools and information services which are used to access information over the communications network. Example tools used to access information over a network include, but are not limited to Telnet log-in service 901, IRC chat 902, Web service 903, and SMTP (Simple Mail Transfer Protocol) electronic mail service 906. Web service 903 allows access to HTTP documents 904, and FTP (File Transfer Protocol) and Gopher files 905. Secure Socket Layer (SSL) is an optional protocol used to encrypt communications between a Web browser and Web server.

Transport layer 910 provides transmission control functionality using protocols, such as TCP, UDP, SPX, and others, that add information for acknowledgments that blocks of the file had been received.

Network layer 920 provides routing functionality by adding network addressing information using protocols such as IP, IPX, and others, that enable data transfer over the network.

Data link layer 930 provides information about the type of media on which the data was originated, such as Ethernet, token ring, or fiber distributed data interface (FDDI), and others.

Physical layer 940 provides encoding to place the data on the physical transport, such as twisted pair wire, copper wire, fiber optic cable, coaxial cable, and others.

Description of this example environment in these terms is provided for convenience only. It is not intended that the invention be limited to application in this example environment. In fact, after reading the description herein, it will become apparent to persons skilled in the relevant art(s) how to implement the invention in alternative environments. Further details on designing, configuring, and operating storage area networks are provided in Tom Clark, "Designing Storage Area Networks: A Practical Reference for Implementing Fibre Channel SANs" (1999), which is incorporated herein by reference in its entirety.

3.1 EXAMPLE STORAGE APPLIANCE

The present invention may be implemented in and operated from a storage appliance or SAN appliance that interfaces between the hosts and the storage subsystems comprising the SAN. The present invention is completely host (operating system) independent and storage system independent. The NAS functionality of the storage appliance according to the present invention does not require special host software. Furthermore, the NAS functionality according to the present invention is not tied to a specific storage vendor and operates with any type of storage, including fibre channel and SCSI.

The present invention may be implemented in a storage, or SAN, appliance, such as the SANLink™ appliance, developed by StorageApps Inc., located in Bridgewater, N.J. In embodiments, a storage appliance-based or web-based administrative graphical interface may be used to centrally manage the SAN and NAS functionality.

A storage appliance, such as the SANLink™, unifies SAN management by providing resource allocation to hosts. In the case of the SANLink™, for instance, it also provides data management capabilities. These data management capabilities may include:

1. Storage virtualization/mapping. All connected storage in the SAN is provided as a single pool of storage, which may be partitioned and shared among hosts as needed.
2. Data mirroring. An exact copy of the data stored in the SAN storage devices is created and maintained in real time. The copy may be kept at a remote location.
3. Point-in-time copying (Snapshot). An instantaneous virtual image of the existing storage may be created. The virtual replica can be viewed and manipulated in the same way as the original data.
4. Storage security. Access to particular storage devices, or portions thereof, may be restricted. The storage devices or portions may be masked from view of particular hosts or users.

Further data management capabilities may also be provided by a storage appliance. According to the present invention, these SAN data management capabilities are now applicable to NAS storage. In embodiments described below, a NAS server may be incorporated into a conventional storage appliance, according to the present invention. In alternative embodiments, the SAN servers and/or NAS servers may be located outside of the storage appliance. One or more SAN servers and/or NAS servers may be geographically distant, and coupled to the other SAN/NAS servers via wired or wireless links.

4.0 NETWORK ATTACHED STORAGE EMBODIMENTS OF THE PRESENT INVENTION

Figure 1:
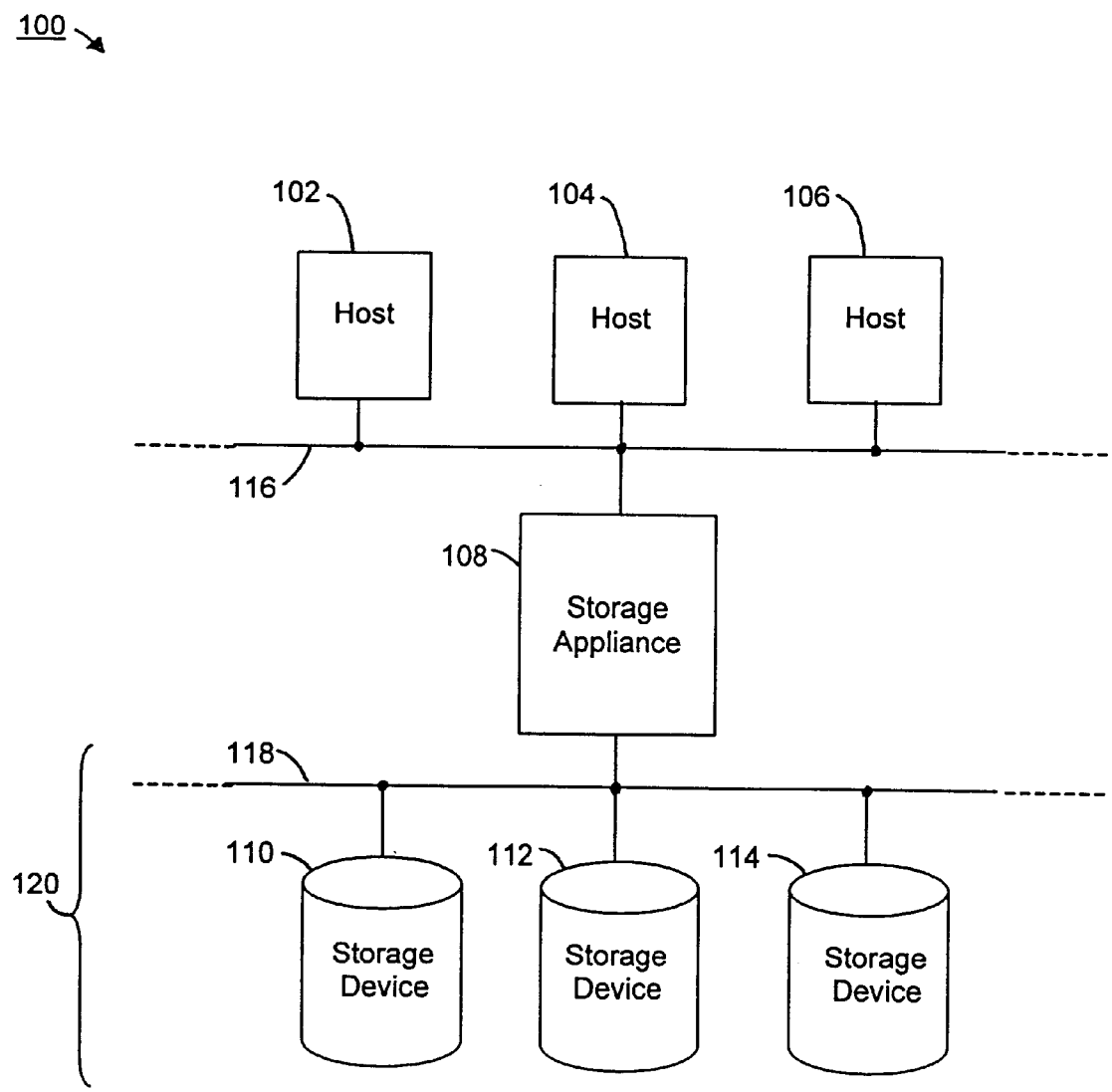
FIG. 1 illustrates a storage appliance coupling computer hosts to storage devices in a storage area network, using a communication protocol such as fibre channel or SCSI, according to an example environment.

FIG. 1 illustrates an example computer environment 100, which may be considered to include a storage area network (SAN). In FIG. 1, storage appliance 108 couples hosts 102, 104, and 106 to storage devices 110, 112, and 114. Storage devices 110, 112, and 114 are coupled to storage appliance 108 via a first data communication network 118. Storage devices 110, 112, and 114 and first data communication network 118 form the storage portion of computer environment 100, and are referred to collectively as SAN 120 herein. Storage appliance 108 manages SAN 120, allocating storage to hosts 102, 104, and 106. Hosts 102, 104, and 106 may be any type of computer system. Hosts 102, 104, and 106 are coupled to storage appliance 108 via a second data communication network 116. First and second data communication networks 118 and 116 typically transport data using a data storage communication protocol such as fibre channel or SCSI.

Figure 2:
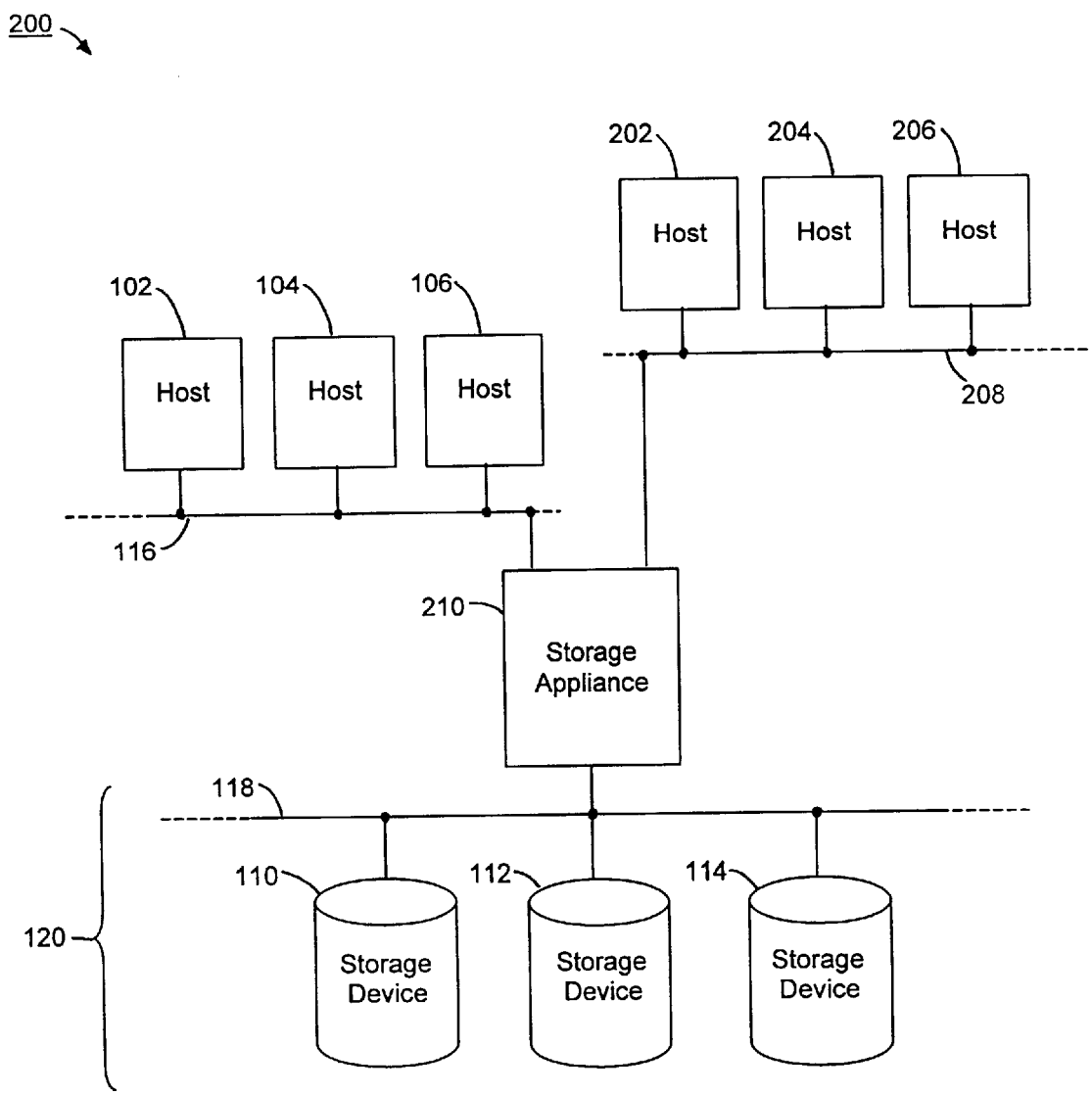
FIG. 2 illustrates a storage appliance coupling computer hosts to storage devices in a storage area network, as shown in FIG. 1, and further coupling computer hosts in a local area network to the storage area network, according to an exemplary embodiment of the present invention.

FIG. 2 illustrates an example computer environment 200, according to an embodiment of the present invention. In computer environment 200, hosts 202, 204, and 206 attached to a network 208 may access the storage devices in SAN 120 as if they are one or more network attached storage (NAS) devices attached directly to network 208.

In FIG. 2, similarly to FIG. 1, a storage appliance 210 couples hosts 102, 104, and 106 to storage devices 110, 112, and 114. Storage devices 110, 112, and 114 are coupled to storage appliance 210 via a first data communication network 118. As described above, storage devices 110, 112, and 114 and first data communication network 118 are referred to collectively as SAN 120. Hosts 102, 104, and 106 are coupled to storage appliance 210 via second data communication network 116. Furthermore, example computer environment 200 shows hosts 202, 204, and 206 coupled to storage appliance 210 via a third data communication network 208.

Hosts 202, 204, and 206, include hosts, servers, and other computer system types that may be present in a data communication network. For instance, one or more of hosts 202, 204, and 206 may be workstations or personal computers, and/or may be servers that manage network resources. For instance, one or more of the servers of hosts 202, 204, and 206 may be network servers, application servers, database servers, or other types of server. Hosts 202, 204, and 206 output requests to storage appliance 210 to write to, or read data from storage devices 110, 112, and 114 in SAN 120. The present invention is applicable to additional or fewer hosts than shown in FIG. 2.

Storage appliance 210 receives storage read and write requests from hosts 202, 204, and 206 via third data communication network 208. The storage read and write requests include references to one or more storage locations in storage devices 110, 112, and 114 in SAN 120. Storage appliance 210 parses the storage read and write requests by extracting various parameters that are included in the requests. In an embodiment, storage appliance 210 uses the parsed read and write request to determine physical storage locations corresponding to the target locations in a logical data space of SAN 120. The structure and operation of storage appliance 210 is further described below. Storage appliance 210 outputs read and write requests to physical storage/LUNs.

Third data communication network 208 typically is an Ethernet, Fast Ethernet, or Gigabit Ethernet network, or other applicable type of communication network otherwise known or described elsewhere herein. The transport protocol for data on third data communication network 208 is typically TCP/IP, but may also be any applicable protocol otherwise known or mentioned herein.

SAN 120 receives storage read and write requests from storage appliance 210 via first data communication network 118. First data communication network 118 routes the received physical storage read and write requests to the corresponding storage device(s), which respond by reading or writing data as requested. Storage devices 110, 112, and 114 comprise one or more storage devices that may be individually coupled directly to storage appliance 210, and/or may be interconnected in a storage area network configuration that is coupled to storage appliance 210. For example, storage devices 110, 112, and 114 comprise one or more of a variety of storage devices, including tape systems, JBODs (Just a Bunch Of Disks), floppy disk drives, optical disk drives, disk arrays, and other applicable types of storage devices otherwise known or described elsewhere herein.

First data communication network 118 typically includes one or more fibre channel links, SCSI links, and/or other applicable types of communications link otherwise known or described elsewhere herein. SAN 120 may further include switches and hubs, and other devices, used to enhance the connectivity of first data communication network 118.

Figure 6:
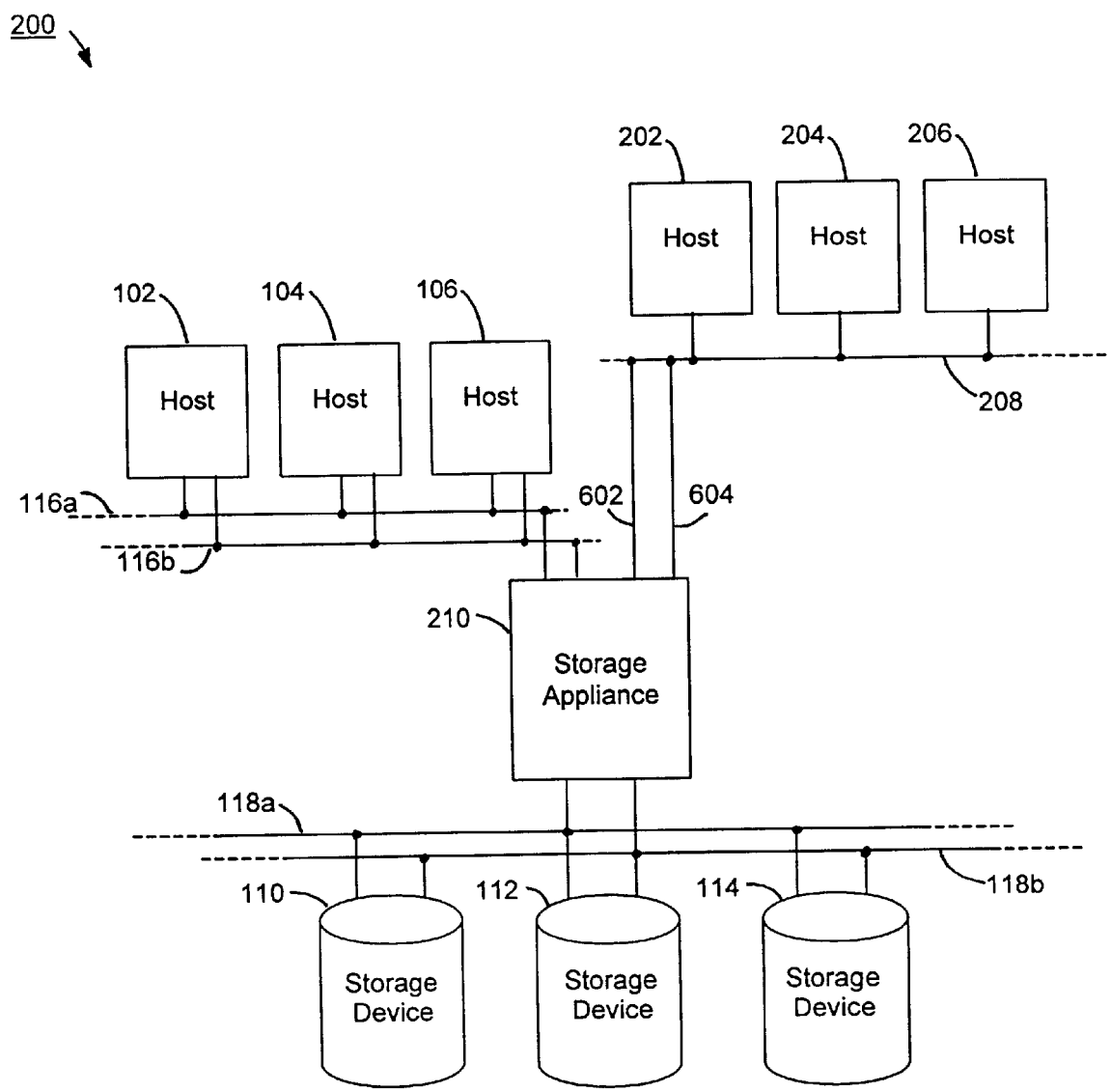
FIG. 6 illustrates a storage appliance coupling hosts in two network types to storage devices in a storage area network, with redundant connections, according to an exemplary embodiment of the present invention.

Redundant configurations may be used to increase system reliability. FIG. 6 illustrates example computer environment 200, according to an exemplary embodiment of the present invention. In FIG. 6, storage appliance 210 couples with hosts 102, 104, 106, 202, 204, and 206, and storage devices 110, 112, and 114, using redundant connections. Storage devices 110, 112, and 114 are coupled to storage appliance 210 through primary first data communication network 118a and redundant first data communication network 118b. Hosts 102, 104, and 106 are coupled to storage appliance 210 through primary second data communication network 116a and redundant second data communication network 116b. Hosts 202, 204, and 206 are coupled to storage appliance 210 through primary third communications link 602a and redundant third communications link 604, which are each coupled to third data communication network 208. Further details of providing NAS functionality according to the configuration shown in FIG. 6 are provided in sections below.

Description in these terms is provided for convenience only. It is not intended that the invention be limited to application in these example environments. In fact, after reading the following description, it will become apparent to a person skilled in the relevant art how to implement the invention in alternative environments known now or developed in the future. Further detailed embodiments of the elements of computer environment 200 are discussed below.

5.0 STORAGE APPLIANCE EMBODIMENTS ACCORDING TO THE PRESENT INVENTION

Structural implementations for the storage appliance of the present invention are described at a high-level and at a more detailed level. These structural implementations are described herein for illustrative purposes, and are not limiting. In particular, the present invention as described herein can be achieved using any number of structural implementations, including hardware, firmware, software, or any combination thereof. For instance, the present invention as described herein may be implemented in a computer system, application-specific box, or other device. Furthermore, the present invention may be implemented in one or more physically separate devices or boxes. In an embodiment, the present invention may be implemented in a SAN appliance, as described above, which provides for an interface between host servers and storage. Such SAN appliances include the SANLink™ appliance.

According to the present invention, a storage appliance attached to a SAN provides NAS functionality. One or more SAN servers are present in the SAN appliance to provide data management functionality. One or more NAS servers, as further described below, may be installed in the SAN appliance, to provide the NAS functionality. In alternative embodiments, the NAS server may be physically separate from the SAN appliance, and may be connected to the SAN appliance by wired or wireless links. Furthermore, additional components may be present in the SAN appliance, such as fibre channel switches, to provide enhanced connectivity.

Figure 3A:
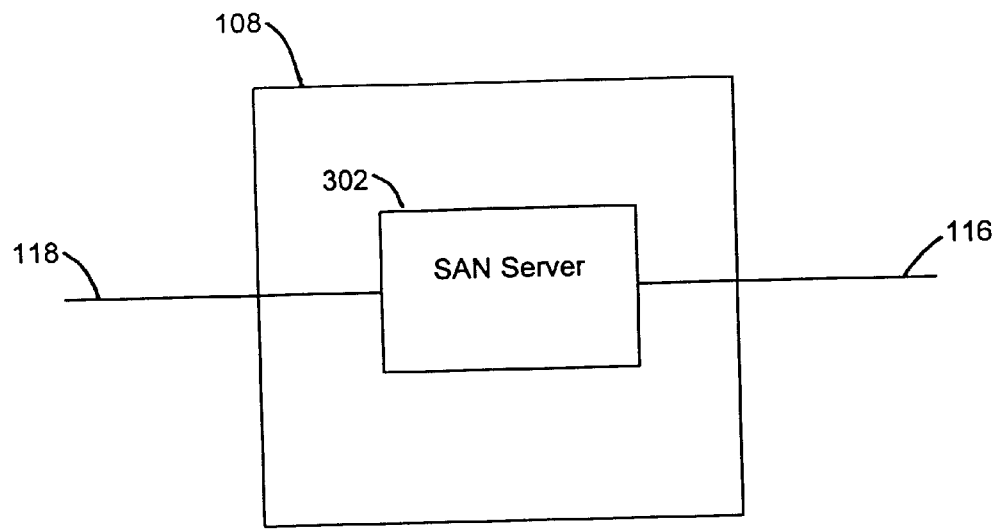
FIG. 3A illustrates a block diagram of a storage appliance.

FIG. 3A shows an example embodiment of a storage appliance 108, which includes a SAN server 302. SAN server 302 is coupled between first data communication network 118 and second data communication network 116. SAN server 302 allocates storage of SAN 120 to hosts 102, 104, and 106, on an individual or group basis, as shown in FIG. 1. SAN server 302 receives read and write storage requests from hosts 102, 104, and 106, and processes and sends these storage requests to the applicable storage device (s) of storage devices 110, 112, and 114 in SAN 120. Storage devices 110, 112, and 114 process the received storage requests, and send resulting data to SAN server 302. SAN server 302 sends the data to the applicable host(s) of hosts 102, 104, and 106. SAN server 302 also performs data management functionality for SAN 120, as described above.

Note that storage appliance 108 may include more than one SAN server 302. Additional SAN servers 302 may be provided for reasons of redundancy, greater bandwidth and I/O capability, and for additional reasons.

Figure 3B:
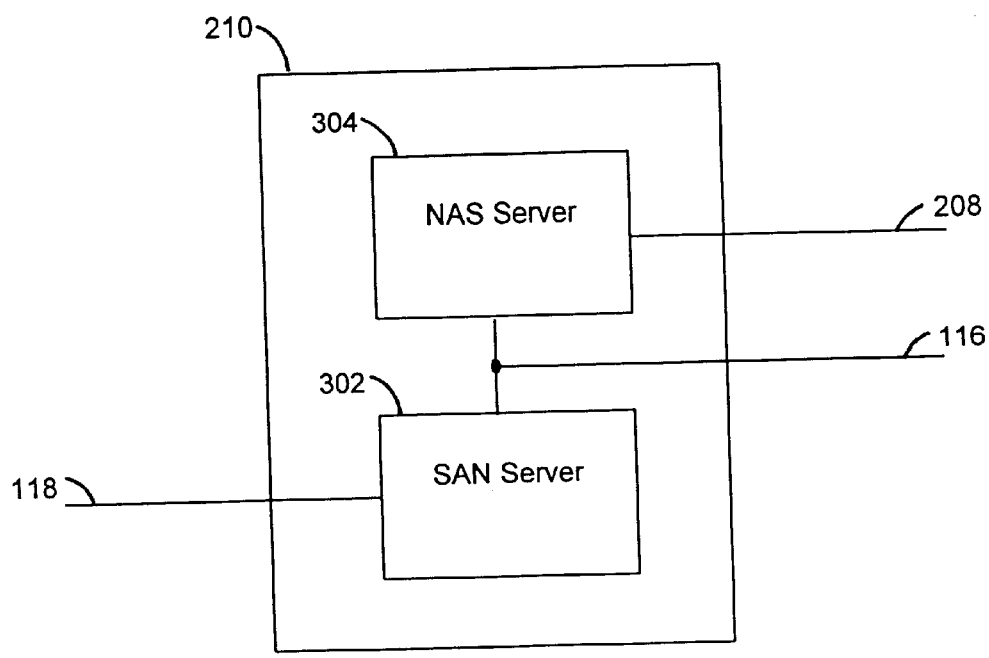
FIG. 3B illustrates a block diagram of a storage appliance with network attached storage server, according to an exemplary embodiment of the present invention.

FIG. 3B illustrates an example of a storage appliance 210, according to an embodiment of the present invention. Storage appliance 210 includes a SAN server 302 and a NAS server 304. SAN server 302 is coupled between first data communication network 118 and second data communication network 116, similarly to the configuration shown in FIG. 3A. NAS server 304 is coupled between second data communication network 116 and third data communication network 208.

In an embodiment, SAN server 302 views NAS server 304 as a host. Storage is allocated by SAN server 302 to NAS server 304, in a manner similar to how SAN server 302 would allocate storage to one of hosts 102, 104, and 106. In other words, SAN server 302 requires little or no modification to interact with NAS server 304. The storage may be allocated in the form of LUNs, for example.

NAS server 304 configures the storage allocated to it by SAN server 302, and exports it to third data communication network 208. In this manner, hosts 202, 204, and 206, shown in FIG. 2, can access the storage in SAN 120.

FIG. 14A shows a flowchart 1400 providing operational steps of an example embodiment of the present invention. FIG. 14B provides additional steps for flowchart 1400. FIGS. 14A–B show a process for interfacing a SAN with a first data communication network. One or more hosts coupled to the first data communication network can access data stored in one or more of a plurality of storage devices in the SAN. The one or more hosts access one or more of the plurality of storage devices as a NAS device. The steps of FIGS. 14A–B may be implemented in hardware, firmware, software, or a combination thereof.

Furthermore, the steps of FIGS. 14A–B do not necessarily have to occur in the order shown, as will be apparent to persons skilled in the relevant art(s) based on the teachings herein. Other structural embodiments will be apparent to persons skilled in the relevant art(s) based on the discussion contained herein. These steps are described in detail below.

The process begins with step 1402. In step 1402, a SAN server is coupled to a SAN. For example, SAN server 302 is coupled to SAN 120.

In step 1404, a NAS server is coupled to the SAN server through a second data communication network. For example, NAS server 304 is coupled to SAN server 302 via second data communication network 116.

In step 1406, the NAS server is coupled to the first data communication network. For example, NAS server is coupled to third data communication network 208.

In step 1408, a portion of at least one of the plurality of storage devices is allocated from the SAN server to the NAS server. For example a portion or all of storage devices 110, 112, and 114 are allocated to NAS server 304 by SAN server 302. In an embodiment, the NAS server is viewed from the SAN server as a host attached to the second data communication network. In this manner, SAN server 302 does not require additional configuration in order to be able to allocate NAS storage. For example, the portion of at least one of the plurality of storage devices is allocated from the SAN server to the NAS server in the same manner as the portion would be allocated from the SAN server to a host attached to the second data communication network.

In step 1410, the allocated portion is configured as NAS storage in the NAS server. For example, NAS server 304 configures the allocated portion as NAS storage. Configuration of storage as NAS storage is described in further detail below.

In step 1412, the configured portion is exported from the NAS server to be accessible to the one or more hosts coupled to the first data communication network. For example, NAS server 304 exports the configured portion of storage on third data communication network 208, to be available to one or more of hosts 202, 204, and 206.

In an embodiment, the SAN server is configured to allocate storage from the SAN to at least one host attached to the second data communication network. For example, SAN server 302 is configured to allocate storage from SAN 120 to one or more of hosts 102, 104, and 106 on second data communication network 116. The SAN server is coupled to the second data communication network.

FIG. 14B provides additional exemplary steps for flowchart 1400 of FIG. 14A:

In step 1414, an administrative interface is coupled to the SAN server. For example, in an embodiment, an administrative interface is coupled to SAN server 302. The administrative interface allows for user control of storage allocation by the present invention. The administrative interface may include a graphical user interface. The administrative interface is described in more detail below. In an alternative embodiment, the administrative interface is coupled directly to NAS server 304.

In step 1416, a storage allocation directive is received from the administrative interface by the SAN server. For example, a user graphically or textually inputs a command to effect NAS or SAN storage management, according to the present invention.

In embodiments, redundant NAS servers may be used in a single SAN appliance, and/or each NAS server may itself provide redundant features. For example, in an embodiment, each NAS server 304 includes two Host Bus Adaptors (HBAs) that interface with second communications network 118, for redundancy and fail-over capabilities. Examples of these capabilities are further described in the sections below.

Figure 7:
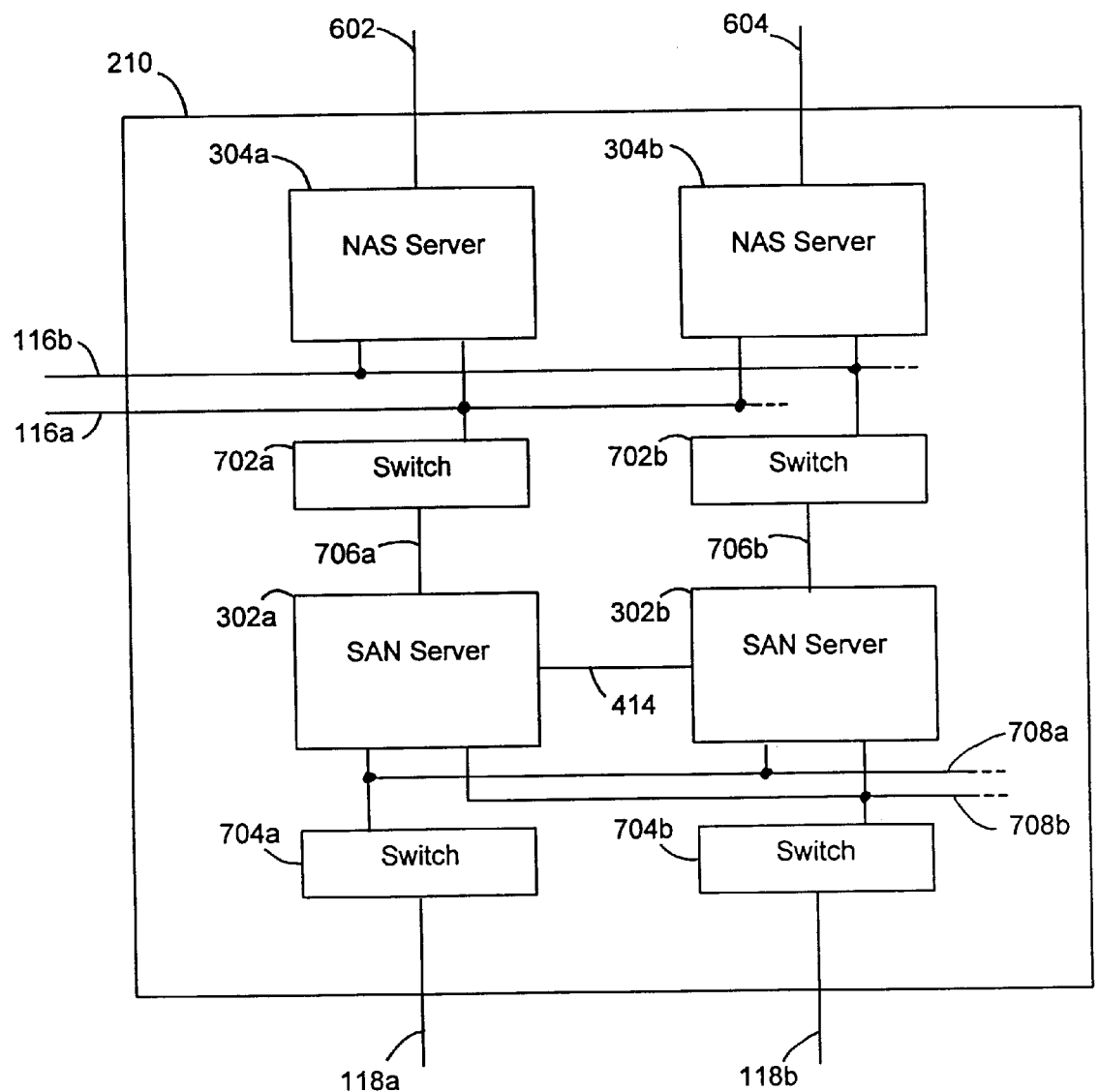
FIG. 7 illustrates a block diagram of a storage appliance with redundant SAN and NAS servers, according to an exemplary embodiment of the present invention.

FIG. 7 illustrates a block diagram of storage appliance 210, according to an exemplary embodiment of the present invention. Storage appliance 210 includes a primary SAN server 302a, a redundant SAN server 302b, a primary NAS server 304a, a redundant NAS server 304b, and switches 702a, 702b, 704a, and 704b. Switches 702a, 702b, 704a, and 704b are optional, as required by the particular application. Switches 702a, 702b, 704a, and 704b are preferably fibre channel switches, used for high data rate communication with hosts and storage, as described above. Storage appliance 210 of FIG. 7 is applicable to computer system environment 200 shown in FIG. 6, for example.

Switch 704a is coupled to primary first data communication network 118a. Primary SAN server 302a and redundant SAN server 302b are coupled to switch 704a. Switch 704a couples SAN servers 302a and 302b to primary first data communication network 118a, as a primary mode of access to storage devices 110, 112, and 114.

Switch 704b is coupled to redundant first data communication network 118b. Primary SAN server 302a and redundant SAN server 302b are coupled to switch 704b. Switch 704b couples SAN servers 302a and 302b to redundant first data communication network 118b, so that they can redundantly access storage devices 110, 112, and 114.

Primary SAN server 302a is coupled to redundant SAN server 302b by SAN server communication link 414. Primary SAN server 302a and redundant SAN server 302b each include two interfaces, such as two HBAs, that allow each of them to be coupled with both of switches 704a and 704b. Additional SAN servers and switches may be coupled in parallel with SAN servers 302*a* and 302*b* and switches 704*a* and 704*b*, as represented by signals 708*a* and 708*b*. In further embodiments, additional switches and SAN servers in storage appliance 210 may be coupled to further redundant networks, or to networks coupled to further storage devices.

Switch 702*a* is coupled to primary SAN server 302*a*. Primary NAS server 304*a*, redundant NAS server 304*b*, and switch 702*a* are coupled to primary second data communication network 116*a*. Switch 702*a* allows for communication between primary SAN server 302*a* and primary and redundant NAS servers 304*a* and 304*b*, and between SAN server 302*a* and hosts attached to primary second data communication network 116*a*.

Switch 702*b* is coupled to redundant SAN server 302*b*. Primary NAS server 304*a*, redundant NAS server 304*b*, and switch 702*b* are coupled to redundant second data communication network 116*b* by switch 702*b*. Switch 702*b* allows for communication between redundant SAN server 302*b* and primary and redundant NAS servers 304*a* and 304*b*, and between SAN server 302*b* and hosts attached to redundant second data communication network 116*b*.

Primary NAS server 304*a* and redundant NAS server 304*b* each include two interfaces, such as two HBAs, that allow each of them to be coupled with both of primary and redundant second data communication network 116*a* and 116*b*. Additional NAS servers and switches may be coupled in parallel with NAS servers 304*a* and 304*b* and switches 702*a* and 702*b*. In further embodiments, additional switches and NAS servers in storage appliance 210 may be coupled to further redundant networks, or to networks coupled to additional hosts.

Primary NAS server 304*a* is coupled to primary third communications link 602. Redundant NAS server 304*b* is coupled to redundant third communications link 604. In further embodiments, additional switches and NAS servers in storage appliance 210 may be coupled to third data communication network 208 through links.

NAS servers 304*a* and 304*b* are considered to be peer NAS servers for each other. SAN servers 302*a* and 302*b* are considered to be peer SAN servers for each other. In an embodiment, primary NAS server 304*a* operates to supply NAS functionality to storage appliance 210, as described for NAS server 304 above. In this configuration, redundant NAS server 304*b* operates as a back-up for primary NAS server 304*a*, and takes over some or all of the NAS functionality of primary NAS server 304*a* when NAS server 304*a* fails. SAN servers 302*a* and 302*b* may have a similar relationship. In an alternative embodiment, primary and redundant NAS servers 304*a* and 304*b* share the NAS functionality for storage appliance 210. For instance, each of NAS servers 304*a* and 304*b* may configure and export some amount of storage to third data communication network 208. Furthermore, NAS servers 304*a* and 304*b* may operates as back-up NAS servers for each other. SAN servers 302*a* and 302*b* may have a similar relationship. Further detail on the operation the elements of storage appliance 210 shown in FIG. 7 are provided in sections below.

Figure 11:
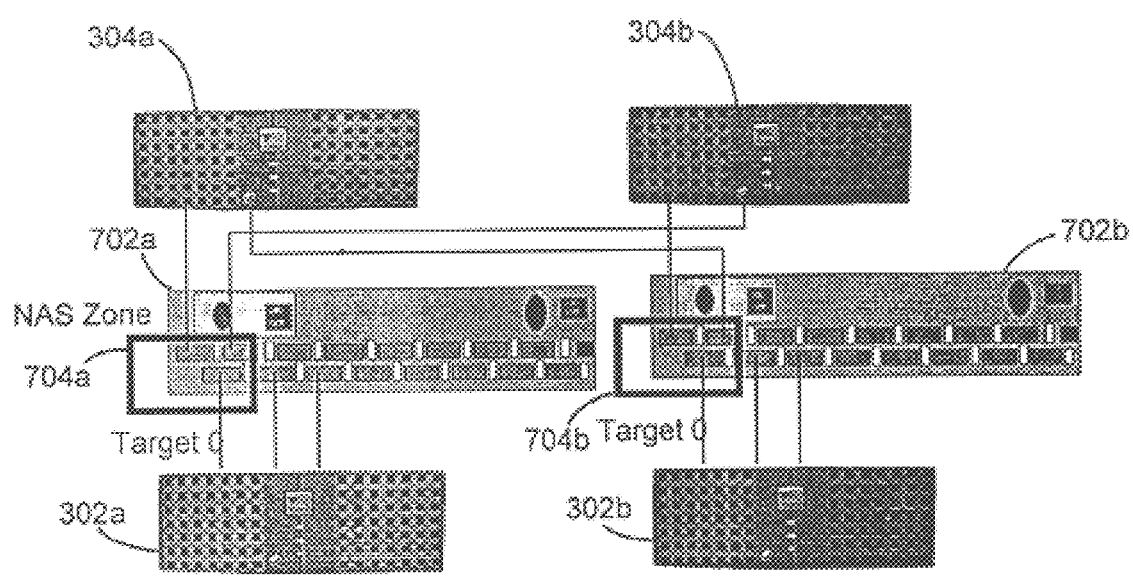
FIG. 11 illustrates the connection of SAN and NAS servers to zoned switches, according to an exemplary embodiment of the present invention.

FIG. 11 illustrates a pair of NAS servers 304*a* and 304*b* coupled to a pair of SAN servers 302*a* and 302*b* via a pair of fibre channel switches 702*a* and 702*b*, according to an embodiment of the present invention. In order to enhance performance, the fibre channel switches 702*a* and 702*b* may be zoned to allow NAS servers 304*a* and 304*b* to reserve a target on the SAN servers 302*a* and 302*b*. FIG. 11 shows the zoning of fibre channel switches 702*a* and 702*b*. The first three ports of each fibre channel switch 702*a* and 702*b* are zoned into a NAS zone 704*a* and 704*b*. This provides NAS servers 304*a* and 304*b* uncontested access to target 0 of SAN servers 302*a* and 302*b*. Further zoning arrangements for switches are within the scope and spirit of the present invention. Furthermore, the present invention is applicable to additional redundant configurations.

5.1 EXAMPLE SAN SERVER EMBODIMENTS ACCORDING TO THE PRESENT INVENTION

Exemplary implementations for a SAN server are described in more detail as follows. These structural implementations are described herein for illustrative purposes, and are not limiting. In particular, the present invention as described herein can be achieved using any number of structural and operational implementations, including hardware, firmware, software, or any combination thereof. For instance, a SAN server as described herein may be implemented in a computer system, application-specific box, or other device. Furthermore, the SAN server may be implemented in a physically separate device or box from the SAN appliance and NAS server(s). In a preferred embodiment, the SAN server is implemented in a SAN appliance, as described above.

Figure 4:
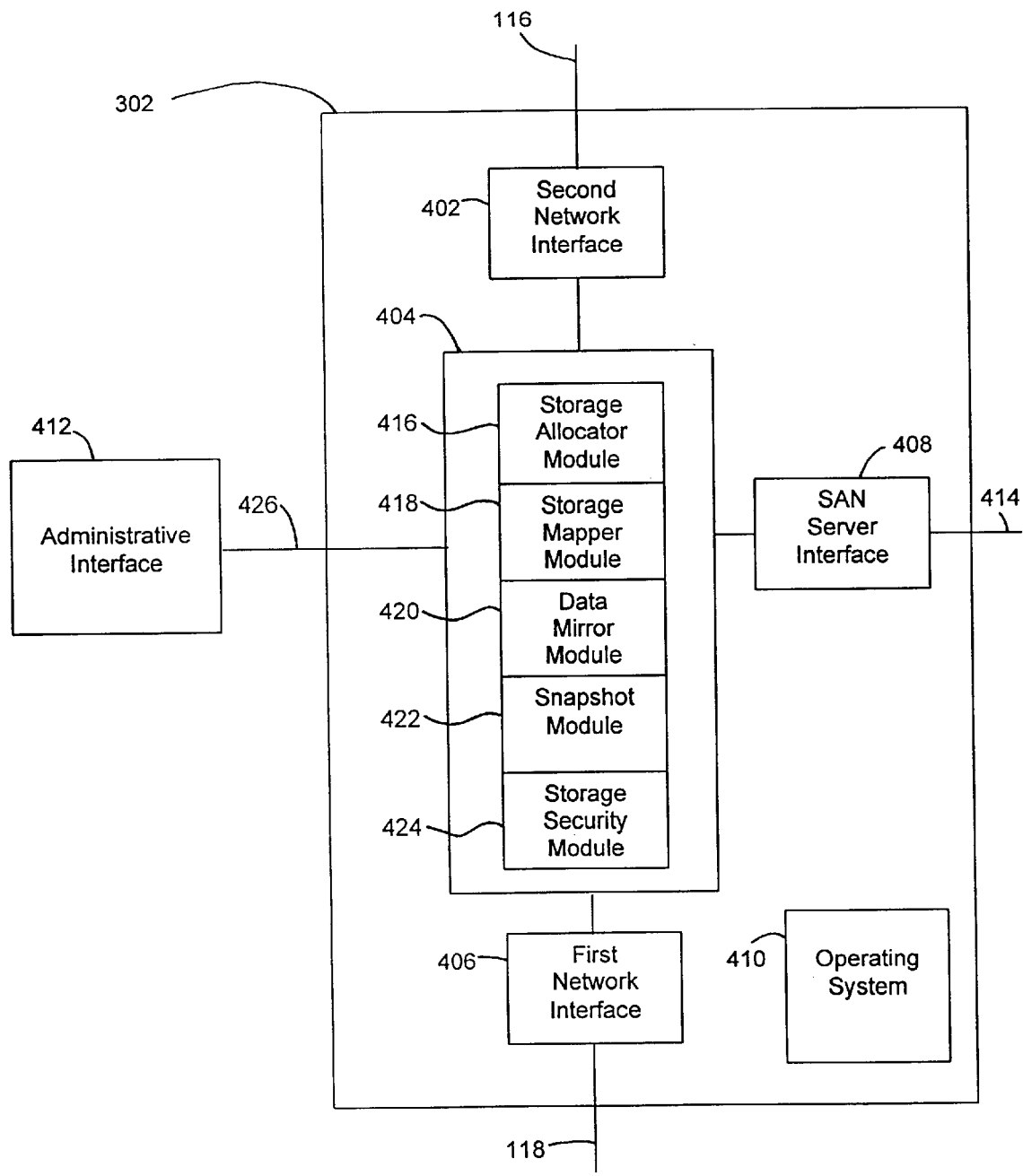
FIG. 4 illustrates a block diagram of a storage area network (SAN) server, according to an exemplary embodiment of the present invention.

FIG. 4 illustrates an exemplary block diagram of a SAN server 302, according to an embodiment of the present invention. SAN server 302 comprises a first network interface 406, a second network interface 402, a SAN storage manager 404, a SAN server interface 408, and an operating system 410. FIG. 4 also shows an administrative interface 412, that is coupled to SAN server 302 through GUI communication link 426. Administrative interface 412 may be coupled to SAN server 302 if SAN server 302 is a primary SAN server for a SAN appliance. Administrative interface 412 is more fully described below.

First network interface 406, second network interface 402, and SAN server interface 408 each include one or more host bus adaptors (HBA), network interface cards (NICs), and/or other adaptors/ports that interface the internal architecture of SAN server 302 with first data communication network 118. First and second network interfaces 406 and 402, and SAN server interface 408, may each support fibre channel, SCSI, Ethernet, TCP/IP, and further data communication mediums and protocols on first data communication network 118, second data communication network 116, and SAN server communication link 414, respectively.

Operating system 410 provides a platform on top of which application programs executing in SAN server 302 can run. Operating system 410 may be a customized operating system, and may be any available operating system, such as Linux, UNIX, DOS, OS/2, and Windows NT.

SAN storage manager 404 provides data management functionality for SAN server 302. SAN storage manager 404 includes one or more modules that are directed towards controlling aspects of data management for the SAN. In the embodiment shown in FIG. 4, SAN storage manager 404 includes a storage allocator module 416, a storage mapper module 418, a data mirror module 420, a snapshot module 422, and a storage security module 424.

Storage allocator module 416 controls the allocation and deallocation of storage in SAN 120, shown in FIG. 2, to hosts 102, 104, and 106, and to NAS server 304. Further details about the operation of storage allocator module 416 are described below.

Storage mapper module 418 controls the mapping of logical storage addresses received from hosts 102, 104, and 106, and from NAS server 304, to actual physical storage addresses for data stored in the storage devices of SAN 120.

Data mirror module 420 controls the mirroring of data stored in SAN 120 with a remote SAN, when such data mirroring is desired. For instance, data mirror module 420 may communicate with a data mirror module located in a remote SAN server, via SAN server interface 408. The remote SAN server is typically located in a remote SAN appliance, and manages data stored in the remote SAN. Data mirror module 420 interacts with the remote data mirror module to mirror data back and forth between the local and remote SANs.

Snapshot module 422 controls single point-in-time copying of data in one or more storage devices of SAN 120 to another location, when a snapshot of data is desired.

Storage security module 424 controls the masking of storage devices, or portions of storage devices in SAN 120, from particular hosts and users.

Second network interface 402 receives read and write storage requests from hosts, and from NAS server 304, via second data communication network 116. Second network interface 402 also sends responses to the read and write storage requests to the hosts and NAS server 304 from SAN server 302.

SAN storage manager 404 receives the read and write storage requests from second network interface 402, and processes them accordingly. For instance, SAN storage manager 404 may map the received storage request from a logical storage address to one or more physical storage address. The SAN storage manager 404 outputs the physical storage address(es) to first network interface 406.

First network interface 406 receives a physical read/write storage request from SAN storage manager 404, and transmits it on first data communication network 118. In this manner, first network interface 406 issues the received read/write storage request to the actual storage device or devices comprising the determined physical storage address (s) in SAN 120. First network interface 406 also receives responses to the read/write storage requests from the storage devices in SAN 120. The responses may include data stored in the storage devices of SAN 120 that is being sent to a requesting host, and/or may include an indication of whether the read/write storage request was successful. First network interface 406 outputs the responses to SAN storage manager 404.

SAN storage manager 404 receives the responses from first network interface 406, and processes them accordingly. For example, SAN storage manager 404 may output data received in the response to second network interface 402. Second network interface 402 outputs the request to second data communication network 116 to be received by the requesting host, or by NAS server 304.

SAN storage manager 404 also communicates with NAS server 304 through second network interface 402, to allocate and deallocate storage from NAS server 304. SAN storage manager 404 may send allocation and deallocation directives, and status directives, to NAS server 304. Network interface 402 may receive responses from NAS server 304, and send these to SAN storage manager 404. In an embodiment, storage allocator module 416 controls this NAS related functionality. Further details of storage allocation and deallocation are provided in sections below.

5.2 EXAMPLE NAS SERVER EMBODIMENTS ACCORDING TO THE PRESENT INVENTION

Figure 5:
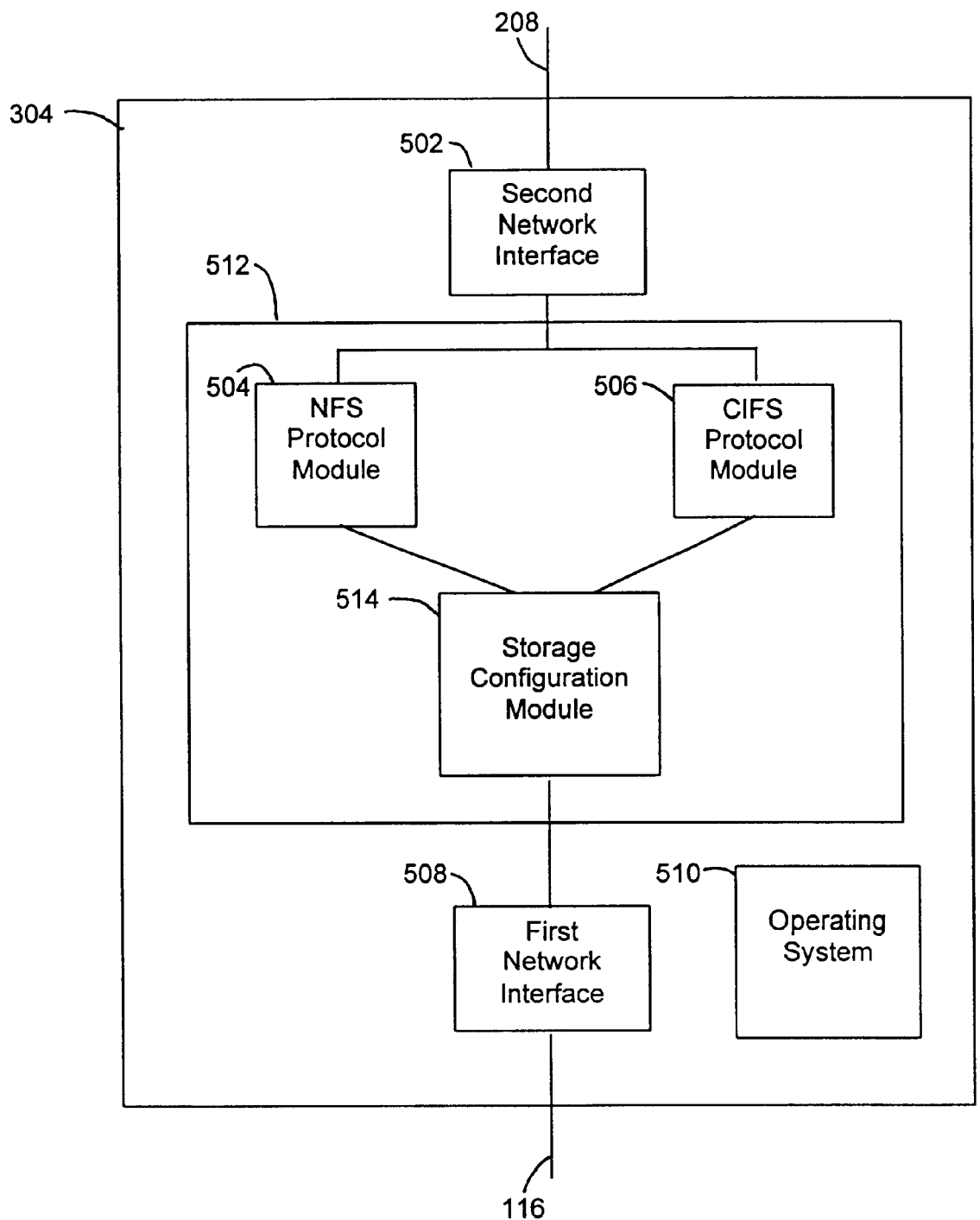
FIG. 5 illustrates a block diagram of a network attached storage (NAS) server, according to an exemplary embodiment of the present invention.

Structural implementations for the NAS server of the present invention are described as follows. These structural implementations are described herein for illustrative purposes, and are not limiting. In particular, the present invention as described herein can be achieved using any number of structural implementations, including hardware, firmware, software, or any combination thereof. For instance, a NAS server as described herein may be implemented in a computer system, application-specific box, or other device. Furthermore, the NAS server may be implemented in a physically separate device or box from the SAN appliance and SAN server(s). In a preferred embodiment, the NAS server is implemented in a SAN appliance, as described above, FIG. 5 illustrates a block diagram of NAS server 304, according to an exemplary embodiment of the present invention. NAS server 304 includes a first network interface 508, a second network interface 502, a NAS file manager 512, and an operating system 510.

First network interface 508 includes one or more host bus adaptors (HBA), network interface cards (NICs), and/or other adaptors/ports that interface the internal architecture of NAS server 304 with second data communication network 116. First network interface 508 may support fibre channel, SCSI, and further data communication mediums and protocols on second data communication network 116.

Second network interface 502 includes one or more host bus adaptors (HBA), network interface cards (NICs), and/or other adaptors/ports that interface the internal architecture of NAS server 304 with third data communication network 208. Second network interface 502 may support Ethernet, Fast Ethernet, Gigabit Ethernet, TCP/IP, and further data communication mediums and protocols on third data communication network 208.

Operating system 510 provides a platform on top of which application programs executing in NAS server 304 can run. Operating system 510 may be a customized operating system, and may be any commercially available operating system, such as Linux, UNIX, DOS, OS/2, and Windows NT. In a preferred embodiment, operating system 510 includes Linux OS version 2.2.18 or greater. Operating system 510 includes a kernel. Linux provides an advantage over the file system limitations of NT, and allows access to kernel source code.

NAS file manager 512 provides file management functionality for NAS server 304. NAS file manager 512 includes one or more modules that are directed towards keeping a record of exported files, and configuring and managing the files exported to third data communication network 208. In the embodiment shown in FIG. 5, NAS file manager 512 includes a NFS protocol module 504, a CIFS protocol module 506, and a storage configuration module 514.

Storage configuration module 514 configures storage allocated by SAN server 302 to NAS server 304, to be made available to hosts on third data communication network 208. Further description of storage configuration module 514 is provided in sections below.

NFS protocol module 504 allows NAS server 304 to use Network File System (NFS) protocol to make file systems available to UNIX hosts on third data communication network 208. CIFS protocol module 506 allows NAS server 304 to use Common Internet File System (CIFS) protocol to make file systems available to Windows clients. For instance, NAS server 304 may include a product called Samba, which implements CIFS.

Second network interface 502 receives read and write storage requests from hosts attached to third data communication network 208. The requests relate to storage exported to third data communication network 208 by NAS server 304. Second network interface 502 also sends responses to the read and write storage requests to the hosts.

NAS file manager 512 receives the read and write storage requests from second network interface 502, and processes them accordingly. For instance, NAS file manager 512 may determine whether the received storage request related to storage exported by NAS server 304. NAS file manager 512 outputs the storage request to first network interface 508.

First network interface 508 receives a physical read/write request from NAS file manager 512, and transmits it on second data communication network 116. In this manner, first network interface 508 issues the received read/write storage request to the SAN server 302. First network interface 508 also receives responses to the read/write storage requests from SAN server 302 on second data communication network 116. The responses may include data stored in the storage devices of SAN 120. First network interface 508 outputs the responses to NAS file manager 512.

NAS file manager 512 receives the responses from first network interface 508, and processes them accordingly. For example, NAS file manager 512 may output data received in the response to second network interface 502 through one or both of NFS protocol module 504 and CIFS protocol module 506. NFS protocol module 504 formats the response per NFS protocol. CIFS protocol module 506 formats the response per CIFS protocol. Second network interface 502 outputs the formatted response on third data communication network 208 to be received by the requesting host.

First network interface 508 also receives storage allocation and deallocation directives, and status directives from SAN server 302, and sends them to NAS file manager 512. Note that in embodiments, second network interface 502 may also or alternatively receive these storage allocation and deallocation directives. Responses to these received storage allocation and deallocation directives, and status directives are generated by NAS file manager 512. NAS file manager 512 sends these responses to first network interface 508, which outputs the responses onto second communication network 116 for SAN server 302.

5.3 ADMINISTRATIVE INTERFACE OF THE PRESENT INVENTION

In a preferred embodiment, the present invention includes an administrative interface to allow a user to configure aspects of the operation of the invention. The administrative interface includes a graphical user interface to provide a convenient location for a user to provide input. As shown in FIG. 4, an administrative interface 412 is coupled to SAN storage manager 404 of SAN server 302. When present, the administrative interface couples to the primary SAN server in the storage appliance 210. The primary SAN server forwards directives to NAS servers. The directives are forwarded to the NAS servers via second data communication network 116 and/or third data communication network 208, and may include a common or custom SAN-to-NAS protocol. An exemplary NAS protocol is described below. Many features of the present invention are described below in relation to the administrative interface. However, in alternative embodiments, an administrative interface is not required and therefore is not present.

In an embodiment, an existing administrative interface that accommodates SAN servers may not require any modification to handle allocation of storage to NAS servers. However, although the SAN servers view the NAS servers as separate hosts, in an embodiment, an existing administrative interface may be enhanced to allow integration of NAS functionality. For example, in an embodiment, the administrative interface may be configured to show the NAS servers as themselves, rather than as hosts. For instance, the administrative interface may allow the storage appliance administrator to allocate a storage portion, such as a LUN, to a NAS server, as a NAS LUN. Any LUN mapping may be done automatically. Once the administrator chooses a LUN to be a NAS LUN, the NAS servers create a file system for that LUN and export that file system to the network. This process is described in further detail below.

In order to represent the NAS servers as NAS servers in the administrative interface, the administrative interface must be able to differentiate NAS servers from hosts. In an embodiment, the NAS servers issue a special registration command via second communications interface 116 to the SAN servers, to identify themselves. For example, in a SAN appliance that includes two NAS servers, the first NAS server may identify itself to the SAN servers as "NASServerNASOne", while the second NAS server may identify itself as "NASServerNASTwo." These names are special identifiers used by the SAN servers when allocating storage to the NAS servers.

Figure 12:
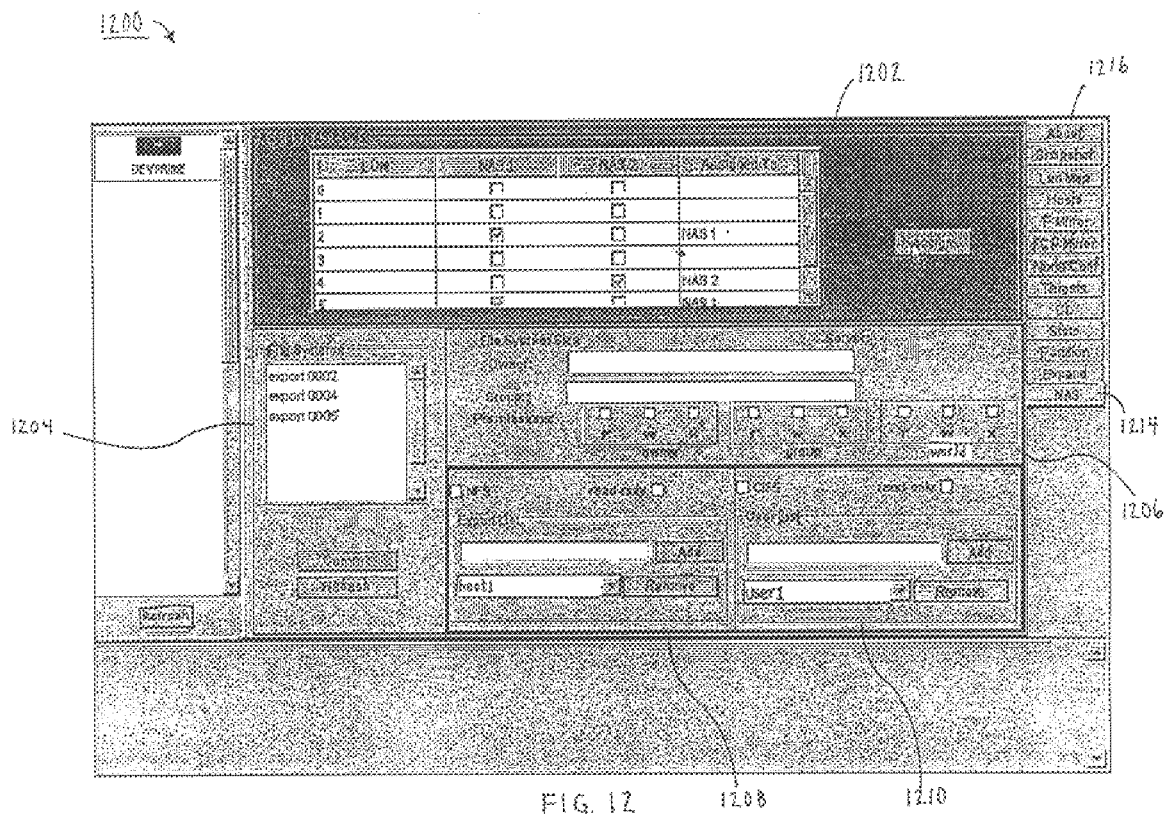
FIG. 12 illustrates an example graphical user interface, according to an exemplary embodiment of the present invention.

FIG. 12 illustrates a graphical user interface (GUI) 1200 for administrative interface 412 of FIG. 4, according to an exemplary embodiment of the present invention. In particular, GUI 1200 in FIG. 12 displays panels related to management of NAS storage. This is because a NAS button 1214 has been selected in a GUI mode select panel 1216 of GUI 1200. Additional features related to SAN management may be displayed by selecting other buttons in GUI mode select panel 1216.

In the embodiment of GUI 1200 shown in FIG. 12, two NAS servers, labeled NAS1 and NAS2, are available for storage allocation. GUI 1200 further includes a first panel 1202, a second panel 1204, a third panel 1206, a fourth panel 1208, and a fifth panel 1210. Each of these panels are more fully described in the following text and sections. In alternative embodiments, fewer or more panels may be displayed in GUI 1200, and fewer or more features may be displayed in each panel, as required by the particular application.

Panel 1202 displays available storage units, in the form of LUNs, for example. In the example panel 1202 of FIG. 12, six LUNs are available for allocation: LUN0, LUN1, LUN2, LUN3, LUN4 and LUN5. The storage units, or LUNs, displayed in panel 1202 may be virtual storage units, or actual physical storage units. Any of the storage units displayed in panel 1202 may be allocated as network attached storage via one or more NAS servers.

A LUN may be allocated to NAS using panel 1202, by selecting the box in the NAS1 column, or the box in the NAS2 column next to the LUN to be allocated, and then pressing the box labeled "Assign." If the box in the NAS1 column was checked, the first NAS server will be instructed to create a file system on the LUN. If the box in the NAS2 column was checked, the second NAS server will be instructed to create a file system on the LUN. For example, the instructed NAS server will create a file system named /exportxxxx, where xxxx is a four-digit representation of the LUN number, such as 0001 for LUN1. After the NAS server creates the file system, it exports the file system via NFS and/or CIFS. For example, the file system is exported by NFS protocol module 504 and/or CIFS protocol module 506. Hence, the file system will be available to one or more hosts and users on third data communication network 208.

A LUN may be deallocated by clearing the box next to the LUN in the NAS1 or NAS2 column of panel 1202, and pressing the box labeled "Assign." That instructs the NAS server to relinquish the file system created for the deallocated LUN, making the file system inaccessible on third data communication network 208.

Panel 1204 displays all NAS file systems that are currently exported by NAS servers. There is one file system for each exported NAS LUN. In an embodiment, an administrator may select a file system name in panel 1204, and GUI 1200 will fill the properties of the selected file system into third, fourth, and fifth panels 1206, 1208, and 1210.

Panel 1206 displays the size, NAS server, ownership, group, and permission attributes of the file system selected in panel 1204. Panel 1206 allows an administrator to change ownership, group, and permission attributes of the file system selected in panel 1204 by modifying these entries in panel 1206.

Panel 1208 displays whether the file system selected in panel 1204 is exported by NFS, whether the NFS file system is read-only, and a list of hosts which may access the file system via NFS. Additional access rights, such as root access, may be selectable for file systems. Panel 1208 allows an administrator to change whether the file system is exported by NFS, whether the file system is read-only, and to modify the list of users and hosts which may access the file system via NFS. Once an administrator has made the desired changes, the changes are implemented by selecting "Commit" in panel 1204.

Panel 1210 displays whether the file system selected in panel 1204 is exported by CIFS, whether the CIFS file system is read-only, and a list of users and hosts which may access the file system via CIFS. Panel 1210 allows an administrator to change whether the file system is exported by CIFS, whether the file system is read-only, and to modify the list of users and hosts which may access the file system via CIFS. Once an administrator has made the desired changes, the changes are implemented by selecting "Commit" in panel 1204.

GUI 1200 has numerous advantages. First, an administrator can allocate a NAS LUN with a single click of a mouse button. Second, GUI 1200 hides that the storage appliance has separate NAS servers (the NAS servers do not appear as hosts, but rather as network interfaces). Third, the administrator can easily provide or eliminate access via NFS and CIFS, restrict permissions, and limit access over the network for a file system. Further advantages are apparent from the teachings herein.

FIG. 13A shows a flowchart 1300 providing operational steps of an example embodiment of the present invention. FIG. 13B provides additional steps for flowchart 1300. FIGS. 13A–B show a process for managing the allocation of storage from a storage area network (SAN) as network attached storage (NAS) to a data communication network. The steps of FIGS. 13A–B may be implemented in hardware, firmware, software, or a combination thereof. Furthermore, the steps of FIGS. 13A–B do not necessarily have to occur in the order shown, as will be apparent to persons skilled in the relevant art(s) based on the teachings herein. Other structural embodiments will be apparent to persons skilled in the relevant art(s) based on the discussion contained herein. These steps are described in detail below.

The process begins with step 1302. In step 1302, a storage management directive is received from a graphical user interface. For example, directives are received from a GUI such as GUI 1200, over GUI communication link 426. For example, the storage management directive may be received by SAN server 302. Example storage management directives that may be received from GUI 1200 are described below. In an embodiment, storage allocator module 416 in SAN storage manager 404 of SAN server 302 processes received storage management directives.

In step 1304, a message corresponding to the received storage management directive is sent to a NAS server. For example, the NAS server is NAS server 304. Example messages that may be received by the NAS server are described below. In an embodiment, storage allocator module 416 in SAN storage manager 404 of SAN server 302 generates messages corresponding to received storage management directives to be sent to NAS server 304.

In step 1306, a response corresponding to the sent message is received from the NAS server. For example, SAN server 302 may receive the response from NAS server 304. Example responses are described below. In an embodiment, storage configuration module 514 receives messages from SAN server 302, processes them, and generates the response for SAN server 302.

In an embodiment, the SAN server sends the response received from NAS server 304 to GUI 1200. GUI 1200 can then display the received response information. In an embodiment, storage allocator module 416 receives the response form NAS server 304, processes the response, and sends the response to GUI 1200.

FIG. 13B provides additional exemplary steps for flowchart 1300 of FIG. 13A:

In step 1308, a command line interface (CLI) may be provided at the graphical user interface. For example, GUI 1200 may include a command line interface where a user may input textual storage management instructions. An example command line interface is described below.

In step 1310, a user is allowed to input the storage directive as a CLI command into the CLI.

In an embodiment, communication between GUI 1200 and the SAN servers may use an existing storage appliance management communication facility. GUI 1200 sends management directives to SAN server 302, via GUI communication link 426, shown in FIG. 4. For example, the management directives may be network messages that start with the letter "c", immediately followed by an integer, and then followed by parameters. When the SAN servers receive a management directive, they perform actions defined by that directive.

The following sections explain the management directives that GUI 1200 sends to the SAN servers when the administrator performs NAS administrative functions. The NAS protocol messages that the SAN servers send to the NAS servers are also described. A complete listing of example NAS Protocol directives is given in a section below. The directives/messages presented herein are provided for purposes of illustration, and are not intended to limit the invention. Alternate directives/messages, differing slightly or substantially from those described herein, will be apparent to persons skilled in the relevant art(s) based on the teachings contained herein. Furthermore, the description herein often refers to storage portions as LUNs, for purposes of illustration. The present invention as described herein, however, is applicable to allocating storage portions of any size or type.

6.0 ALLOCATION AND DEALLOCATION OF NAS STORAGE

This section, and those that follow, provide exemplary operational steps for embodiments of the present invention.

The embodiments presented herein are provided for purposes of illustration, and are not intended to limit the invention. The steps provided below may be implemented in hardware, firmware, software, or a combination thereof. For instance, steps provided in this and following sections, may be implemented by SAN server 302 and/or NAS server 304. Furthermore, the steps of the various embodiments below do not necessarily have to occur in the order shown, as will be apparent to persons skilled in the relevant art(s) based on the teachings herein. Other structural embodiments will be apparent to persons skilled in the relevant art(s) based on the discussions contained herein.

Description of the allocation and deallocation of NAS storage through input applied to GUI 1200 is provided in this section, and following sub-sections, and elsewhere herein. After reading the description herein, it will become apparent to a person skilled in the relevant art how to implement NAS storage allocation and deallocation using any number of processes and structures, in accordance with the present invention.

When an administrator selects the box in the NAS1 column or the NAS2 column next to a LUN in panel 1202 of FIG. 12, and presses "Assign," the LUN is allocated to the NAS server. For example, GUI 1200 may send a c35 storage allocation management directive to the SAN server 302, via GUI communication link 426. The c35 management directive includes three parameters: the LUN number, a flag specifying whether to enable or disable the LUN, and a NAS server number.

For example, if the administrator selects the box in the NAS2 column next to LUN number 15 and press "Assign," GUI 1200 sends the following management directive to SAN server 302:

c35 15 1 2

The directive instructs SAN server 302 to allocate LUN 15 to NAS server NAS2. In embodiments, the directive may be expanded to include further information, such as a directory name to be associated with the LUN. If no directory name is given, a default directory name may be used. For example, the default directory name may be /exportxxxx, where xxxx is the LUN number (the use of this directory name is shown elsewhere herein for example purposes).

Similarly, if the administrator selects the box in the NAS1 column next to LUN number 4 and press "Assign," GUI 1200 sends the following management directive to the SAN server 302:

c35 4 1 1

The directive instructs SAN server 302 to allocate LUN 4 to NAS server NAS1. If the administrator subsequently clears the box in the NAS1 column next to LUN 4, and press "Assign," GUI 1200 sends the following management directive to SAN server 302:

c35 4 0 1

The directive instructs SAN server 302 to remove LUN 4 from NAS server NAS1, such that LUN4 is no longer allocated to NAS server NAS1.

Figure 16:
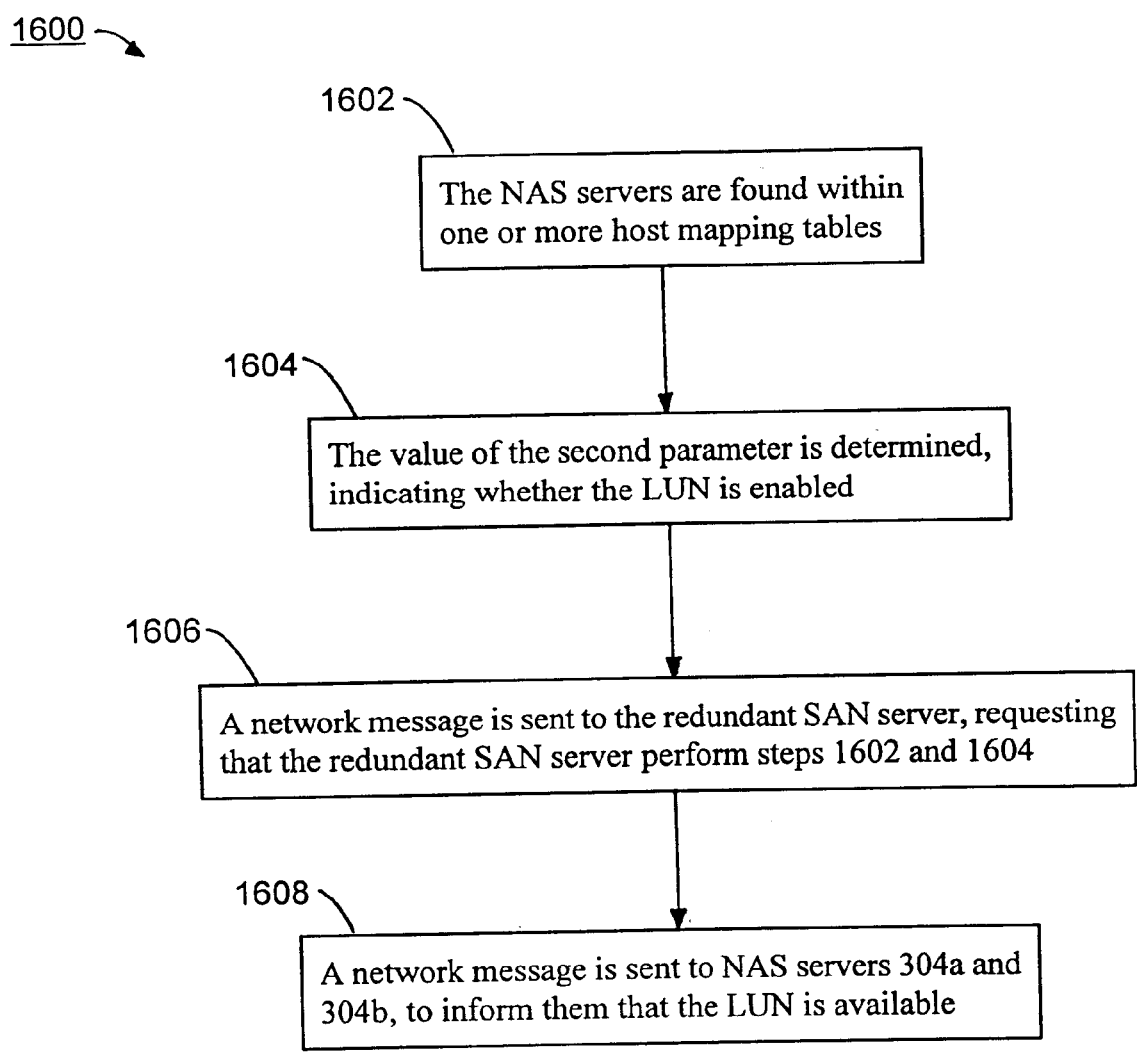

In an embodiment, when SAN server 302*a* receives the c35 management directive, SAN server 302*a* executes the steps shown in flowchart 1600 of FIG. 16, and further described below. For example, the steps below may be executed by SAN storage manager 404 in NAS server 304*a*. In particular, the steps below may be executed by storage allocator module 416 of SAN storage manager 404 to allocate and deallocate storage:

In step 1602, the NAS servers are found within one or more host mapping tables. SAN server 302*a* does this by looking up the special names of the NAS servers registered with SAN server 302*a*. The names of the NAS servers are registered with SAN servers 302*a* and 302*b* when the NAS servers boot up, as described above. For example, the registered names of NAS servers 304*a* and 304*b* are NASServerNASOne and NASServerNASTwo.

In step 1604, the value of the second parameter is determined, indicating whether the LUN is enabled. If the second parameter is a 1, SAN server 302*a* maps the LUN to NASServerNASOne and NASServerNASTwo. The LUN is mapped to both servers in the event of fail-over, as described in further detail below. If SAN server 302*a* determines that the second parameter is a 0, indicating that the LUN is not enabled, SAN server 302*a* removes the LUN from the host map for NAS servers 304*a* and 304*b*.

In step 1606, a network message is sent to the redundant SAN server, requesting that the redundant SAN server perform steps 1602 and 1604.

In step 1608, a network message is sent to NAS servers 304*a* and 304*b*, to inform them that the LUN is available.

The following sub-sections describe an example NAS Protocol for LUN allocation and de-allocation, and the actions taken by the NAS servers.

6.1 EXAMPLE PROTOCOL FOR NAS LUN ALLOCATION AND DE-ALLOCATION

When LUNs are being allocated by SAN server 302 to NAS server 304, SAN server 302 sends NAS servers 304*a* and 304*b* a packet containing the following string:

LUN:Enable:LunNumber:CreateFsFlag

The LunNumber parameter is the identifier for the LUN being allocated, and the CreateFsFlag parameter is a "0" or a "1", depending upon whether the NAS server should create a file system on the LUN. Further information, such as a directory name, may also be provided with the LUN:Enable string.

For example, suppose SAN server 302*a* received the following management directive:

c35 15 1 2

That instructs SAN server 302*a* to allocate LUN 15 to NAS server 304*b*. After mapping the LUN to both NAS servers (as described in steps 1 through 4 above), SAN server 302*a* sends the following string to NAS server 304*a*:

LUN:Enable:15:0

The string informs NAS server 304*a* that LUN 15 is available, and that NAS server 304*a* should configure the LUN into its kernel in case of fail-over. However, NAS server 304*a* will not create a file system on the LUN, nor export the LUN as a NAS device.

SAN server 302*a* sends the following string to NAS server 304*b*:

LUN:Enable:15:1

The string inform NAS server 304*b* that LUN 15 is available, and that NAS server 304*b* should configure the LUN into its kernel, create a file system on the LUN, and export the file system via CIFS and NFS.

If successful, NAS servers 304*a* and 304*b* respond with a packet containing the following string:

NAS:1:0

If unsuccessful, NAS servers 304*a* and 304*b* respond with two messages. The first packet contains the following string:

NAS:0:NumBytes

The NumBytes parameter is the number of bytes in the second message to follow. The second message contains strings describing why the operation failed.

When LUNs are being deallocated by SAN server 302*a*, SAN server 302*a* sends each of NAS servers 304*a* and 304*b* a packet containing the following string:

LUN:Disable:LunNumber

The string instructs NAS servers 304a and 304b to remove the LUN from their kernels. Also, if either NAS server had exported the LUN, the NAS server un-exports it.

The response to the LUN:Disable string is the same as to the LUN:Enable string. That is, if the operation is successful, the NAS servers respond with a packet containing the "NAS:1:0" string. If unsuccessful, the NAS servers respond with the "NAS:0:NumBytes" string, followed by a string that describes the error.

6.2 NAS SERVER CONFIGURATION OF ALLOCATED STORAGE

When a NAS server receives a LUN:Enable string, it configures that LUN from each interface with second data communication network 116. For instance, first network interface 508 may include two HBAs that each interface with second data communication network 116. Each HBA is configured into the NAS server's operating system, creating two new disk devices. The first disk device refers to the LUN on the first HBA, and the second disk device refers to the same LUN on the second HBA.

In an embodiment, a NAS server uses a Linux operating system. The Linux operating system uses symbolic names for disk devices, such as /dev/sda, /dev/sdb, and /dev/sdc. Because of this, it is difficult to determine the LUN number from the symbolic name. To overcome this difficulty, the NAS server maintains a map of LUN numbers to symbolic names. For example, the map may be maintained via Linux symbolic links. The symbolic links may be kept in a directory named /dev/StorageDir, and contain the HBA number, the controller number, the target number, and the LUN number.

For example, NAS server 304a may receive a directive to enable LUN 15. After NAS server 304a configured LUN 15 on HBA 1 into the kernel of operating system 510 of NAS server 304a, the kernel may assign LUN 15 the device name of /dev/sde. To maintain the mapping of LUN 15 on HBA 1 to device /dev/sde, NAS server 304a may create a symbolic link to /dev/sde named /dev/StorageDir/1.0.0.15. Subsequent NAS operations may be performed on /dev/StorageDir/1.0.0.15.

Figure 17:
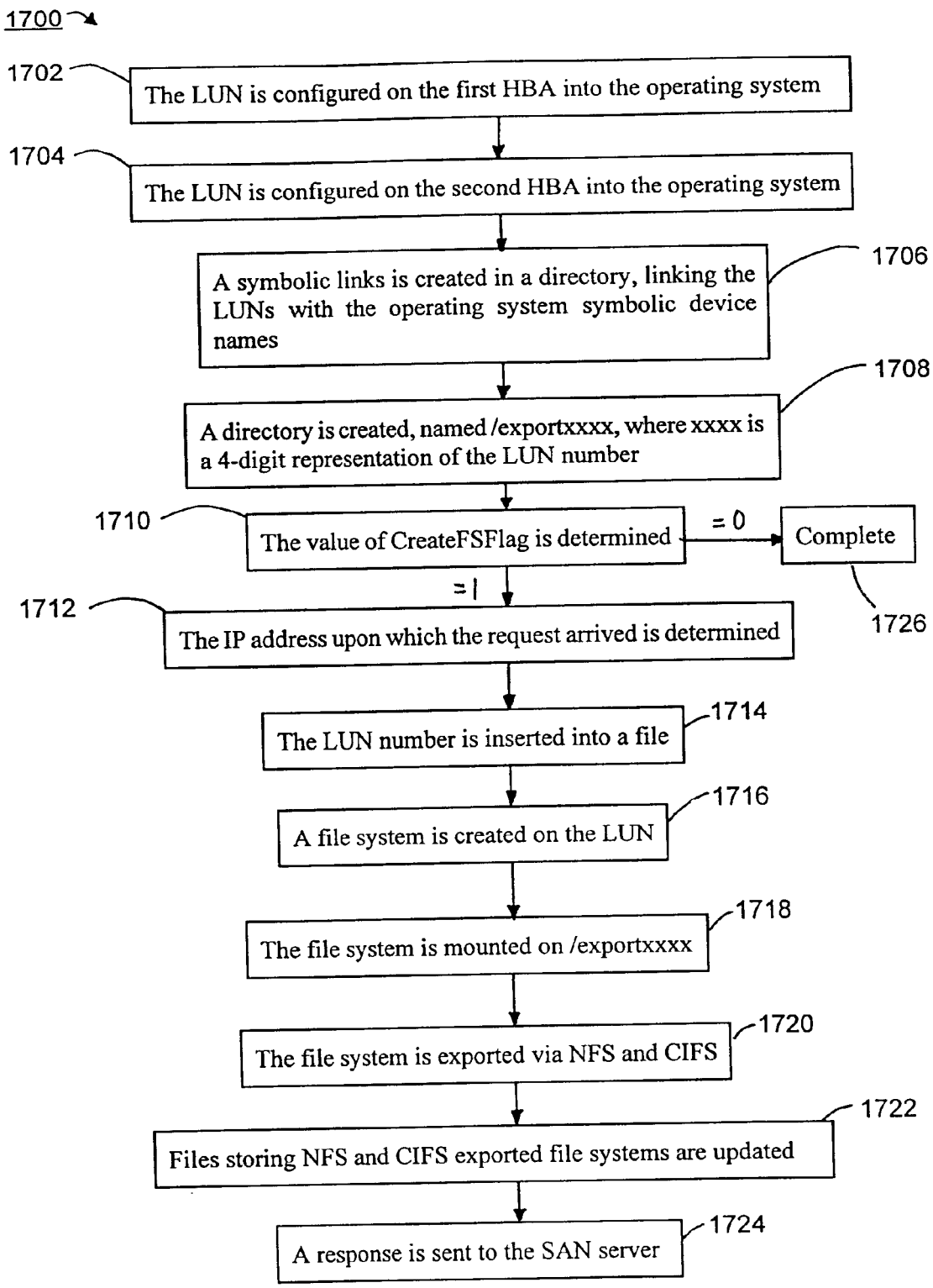

In an embodiment, when the NAS servers receive the LUN:Enable string, NAS servers 304a and 304b may execute the steps shown in flowchart 1700 of FIG. 17, and further described below, for configuring and exporting allocated storage. In particular, the steps for below may be executed by NAS file manager 512 in each NAS server. For example, steps 1702–1718, and 1722–1724 may be executed by storage configuration module 514. Furthermore, the steps below are adaptable to one or more NAS servers:

In step 1702, the LUN is configured on the first HBA into the operating system. For example, the LUN is configured on the first HBA into operating system 510.

In step 1704, the LUN is configured on the second HBA into the operating system. For example, the LUN is configured on the second HBA into operating system 510.

In step 1706, a symbolic link is created in /dev/StorageDir, linking the LUNs with the Linux symbolic device names.

In step 1708, a directory is created, named /exportxxxx, where xxxx is a 4-digit representation of the LUN number (as mentioned elsewhere herein, alternative directory names may be specified).

In step 1710, the value of CreateFSFlag is determined. If CreateFSFlag is 0, then processing is complete. In this case, the NAS:1:0 string is sent to the SAN server. If CreateFSFlag is 1, the processing continues to step 1712.

In step 1712, the IP address upon which the request arrived is determined. The IP address is important to determine, because the NAS server may be in a recovery mode, and may have several IP addresses. The recovery mode is described in a section below.

In step 1714, the LUN number is inserted into a file, for example, named /usr/StorageFile/etc/Ipaddress.NASvolumes, where Ipaddress is the IP address upon which the request arrived. This file is important when fail-over occurs.

In step 1716, a file system is created on the LUN.

In step 1718, the file system is mounted on /exportxxxx.

In step 1720, the file system is exported via NFS and CIFS. For example, NFS protocol module 504 exports the file viaNFS, and CIFS protocol module 506 exports the file via CIFS.

In step 1722, files storing NFS and CIFS exported file systems are updated. A file named /usr/StorageFile/etc/Ipaddress.NFSexports is updated. This file contains a list of all file systems exported via NFS, along with their attributes. A file named /usr/StorageFile/etc/Ipaddress.CIFSexports is updated. This file contains a list of all file systems exported via CIFS.

In step 1724, a response is sent to the SAN server. The NAS:1:0 string is sent to the SAN server if the previous steps were successful. Otherwise, the NAS:0:NumBytes string, followed by the error strings, are sent to the SAN server.

Note that when all processing is complete, one or the NAS servers will have been instructed to export the LUN, while the other will not. For example, NAS server 304a may have been instructed to export the LUN, while NAS server 304b was not. Per the steps above, NAS server 304a will have updated the following files: Ipaddress.NASvolumes, Ipaddress.NFSexports, and Ipaddress.CIFSexports. NAS servers 304a and 304b both would have the LUN configured in their operating system (with symbolic links in /dev/StorageDir). One or more of these files may be used for fail-over and recovery, described in further detail in a section below.

Figure 18:
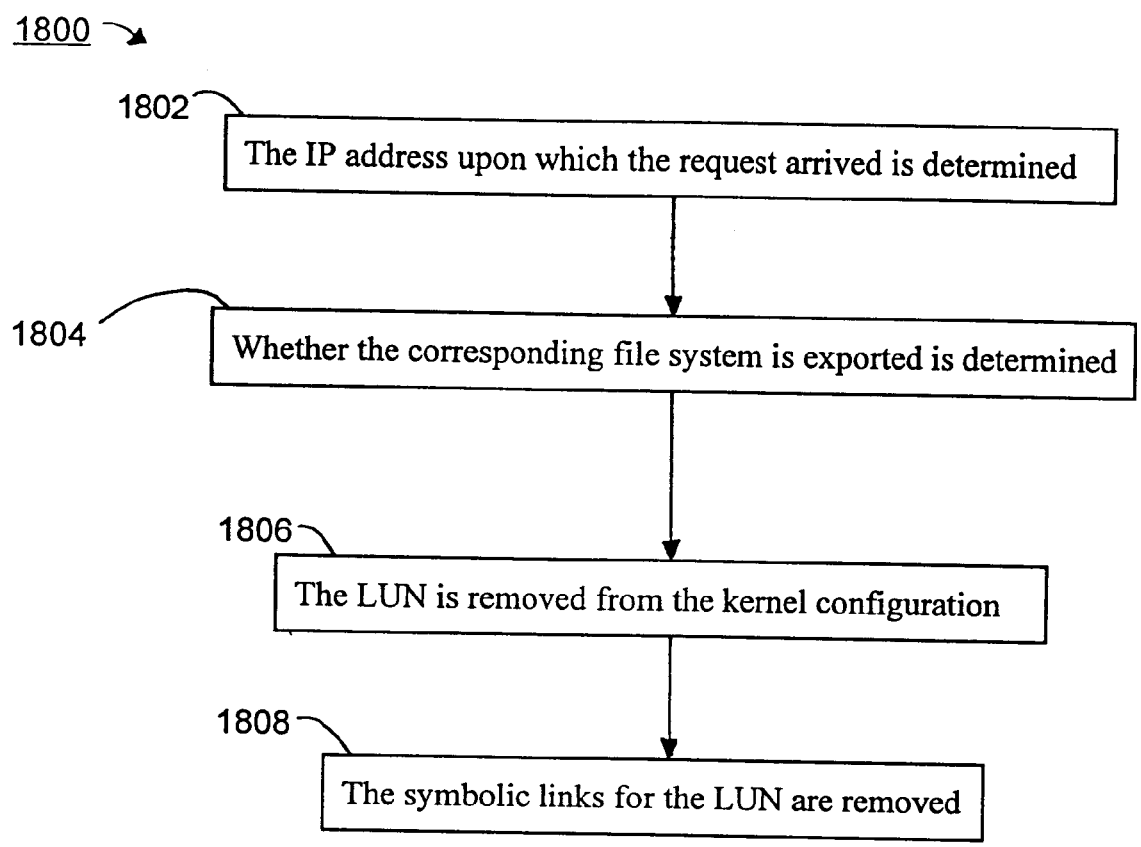

In an embodiment, when a NAS server receives the LUN:Disable string, the steps shown in flowchart 1800 of FIG. 18, and further described below, are executed by the NAS server, for deconfiguring and unexporting unallocated storage. In particular, the steps below may be executed by NAS file manager 512 in the NAS server. For example, steps 1802–1808 may be executed by storage configuration module 514. Furthermore, the steps below are adaptable to one or more NAS servers:

In step 1802, the IP address upon which the request arrived is determined.

In step 1804, whether the corresponding file system is exported is determined. If the NAS server exports the file system, it unexports it from NFS, unexports it from CIFS, unmounts the file system, and removes the information from Ipaddress.NASvolumes, Ipaddress.NFSexports, and Ipaddress.CIFSexports.

In step 1806, the LUN is removed from the kernel configuration.

In step 1808, the symbolic links for the LUN in /dev/StorageDir are removed.

To summarize, the administrator selects a single box in panel 1202 of GUI 1200 to have a LUN become a NAS LUN. However, the processing described above occurs within the NAS servers, and is not visible to, and does not require interaction with the administrator.

6.3 LISTING VOLUMES

After an administrator assigns a NAS LUN, GUI 1200 may display the resultant file system in panel 1204. GUI 1200 also may show the size of the file system, the NAS server that owns the file system, the protocols upon which the file system is exported, and various security attributes in panel 1206. To obtain that information, GUI 1200 sends a c36 list file systems management directive to SAN server 302*a*. The c36 management directive includes one parameter that specifies the type of information being requested. The parameter may be one of the following keywords: PERM, NFS, or CIFS.

If the parameter used is PERM, the SAN server returns a string including the number of NAS file systems, followed by a space character, followed a list of strings that correspond to all NAS file systems. The strings may be of the following form:

/exportxxxx servernum size owner group perm

The /exportxxxx string is the file system name (where xxxx corresponds to the LUN number). The servernum parameter is either 1 or 2, which corresponds to the NAS server (NAS server 304*a* or NAS server 304*b*) to which the file system is allocated. The size parameter is the size of the file system. The owner parameter is the username that owns the file system. The group parameter is the group name of the file system. The perm parameter is a string that lists the permissions on the file system.

For example, suppose an administrator assigned LUN1 and LUN3 to NAS server 304*a,* and LUN2 and LUN4 to NAS server 304*b*. To determine the file systems assigned to NAS, and hence populate the list of file systems in panel 1204, GUI 1200 would issue the following management directive:

c36 PERM

The directive instructs SAN server 302*a* to return the following strings:

| 4 | | | | | |
|---|---|---|---|---|---|
| /export0001 | 1 | 67G | root | root | rwxrwxrwx |
| /export0002 | 2 | 70G | root | root | rwxrwxrwx |
| /export0003 | 1 | 63G | root | root | rwxrwxrwx |
| /export0004 | 2 | 10G | root | root | rwxrwxrwx |

This information is used by GUI 1200 to build the list of file systems in panel 1204.

When a user clicks on a file system in panel 1204, additional information is displayed in panels 1208 and 1210. For example, panel 1208 displays whether the file system is exported via NFS, and, if so, displays a host-restriction list and whether the file system is read-only. Furthermore, panel 1210 displays whether the file system is exported via CIFS, and attributes of that protocol as well. Note that in an embodiment, when a LUN is initially allocated, it is automatically exported via NFS and CIFS by the NAS server. However, as further described below, the administrator can choose to restrict the protocols under which the file system is exported.

To obtain protocol information, GUI 1200 may send the c36 directive to SAN server 302*a* using one of the keywords NFS and CIFS as the parameter. If the parameter is NFS, the SAN server returns a string containing the number of NFS file systems, followed by a space character, followed a list of strings that correspond to all NFS file systems. The strings may be of the following form:

/exportxxxx servernum flag hostlist

The servernum parameter is the same as was returned with a c36 directive using the PERM parameter. The flag parameter is the string "rw" or "ro" (for read-write or read-only). The hostlist parameter is a comma-separated list of hosts (or IP addresses) that have access to the file system via NFS.

If the parameter used is CIFS, the directive returns a string containing the number of CIFS file systems, followed by a space character, followed a list of strings that correspond to all CIFS file systems. The strings may be of the following form:

/exportxxxx servernum flag userlist

The userlist parameter is a comma-separated list of user names that can access the file system via CIFS.

Hence, through the use of the c36 directive with the PERM, NFS, and CIFS parameters, GUI 1200 can fill in panels 1206, 1208, and 1210.

When SAN server 302*a* receives the c36 management directive, it creates a NAS protocol message and forwards it to NAS servers 304*a* and 304*b*. The message may contain a string of the following form:

LUN:ListVols:type

Where the type parameter is one of the keywords PERM, NFS, and CIFS.

Figure 19:
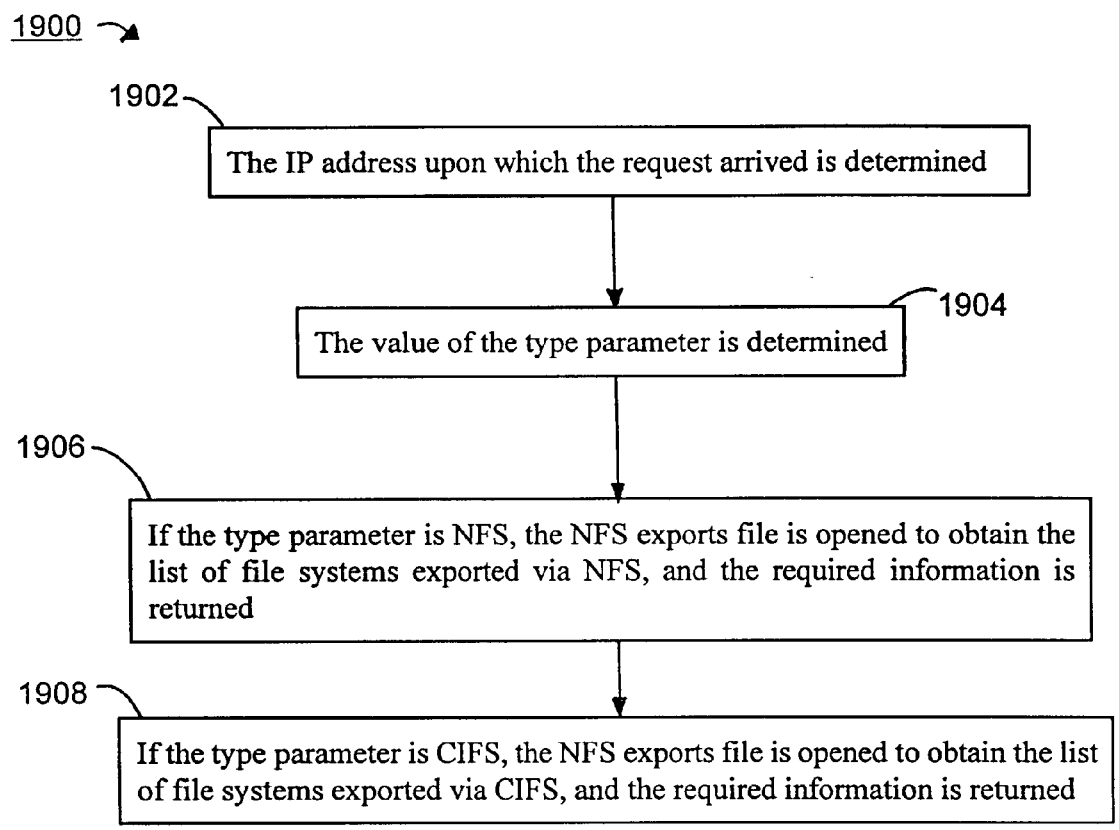

In an embodiment, when the NAS servers receive the LUN:ListVols:type, NAS servers 304*a* and 304*b* may execute the steps shown in flowchart 1900 of FIG. 19, and further described below. In particular, the steps below may be executed by NAS file manager 512 in each NAS server. For example, steps 1902–1908 may be executed by storage configuration module 514:

In step 1902, the IP address upon which the request arrived is determined.

In step 1904, the value of the type parameter is determined. If the type parameter is PERM, the file /usr/StorageFile/etc/Ipaddress.NASvolumes is opened to obtain the list of NAS LUNs, and the required information is returned to the SAN server.

In step 1906, if the type parameter is NFS, the file /usr/StorageFile/etc/Ipaddress.NFSexports is opened to obtain the list of file systems exported via NFS, and the required information is returned.

In step 1908, if the type parameter is CIFS, the file /usr/StorageFile/etc/Ipaddress.CIFSexports is opened to obtain the list of file systems exported via CIFS, and the required information is returned.

If the above steps are successful, the NAS servers respond with a packet containing the "NAS:1:0" string. If the steps are unsuccessful, the NAS servers respond with the "NAS:0:NumBytes" string, followed by a string that describes the error.

As described above, a NAS server makes a NAS LUN available via NFS and CIFS when the corresponding file system is created and exported. However, an administrator may unselect the NFS box in panel 1208, or the CIFS box in panel 1210, for a file system selected in panel 1204. This causes the file system to be unexported, making it unavailable via the unselected protocol. Further details regarding the unexporting of a file system are provided in the following section.

6.4 UNEXPORTING FILE SYSTEMS

After an administrator assigns a NAS LUN, GUI 1200 may show the resulting file system in panel 1204. If the administrator selects the file system in panel 1204, panels 1208 and 1210 indicate that the file system is exported via NFS and/or CIFS. An administrator may choose to deny access to the file system via NFS or CIFS by unselecting the NFS box in panel 1208, or the CIFS box in panel 1210, respectively.

When the administrator denies access to NFS or CIFS in this manner, GUI 1200 sends a c38 management directive to SAN server 302*a*. The c38 unexport file system management directive includes three parameters: the file system name, the protocol from which to unexport the file system, and the number of the NAS server that owns the file system.

For example, the administrator may allocate LUN 15 to NAS server 304*a*, creating file system /export0015. The administrator may want to deny access via CIFS to file system /export0015. The administrator may select /export0015 in panel 1204, unselect the CIFS box in panel 1210, and press "Commit" in panel 1204. GUI 1200 sends the following management directive to SAN server 302*a*:

c38 /export0015 CIFS 1

The directive instructs SAN server 302*a* to deny CIFS access for file system /export0015. Similarly, GUI 1200 may send the following management directive to SAN server 302*a*:

c38 /export0015 NFS 1

The directive instructs SAN server 302*a* to deny NFS access for file system /export0015.

When SAN server 302*a* receives the c38 management directive, SAN server 302*a* creates a NAS protocol message, and forwards the message to the NAS server (NAS server 304*a* or 304*b*) that is specified by the third parameter. The message may contain a string of the following forms:

NFS:Unexport:fileSystemName

Or

CIFS:Unexport:fileSystemName

Figure 20:
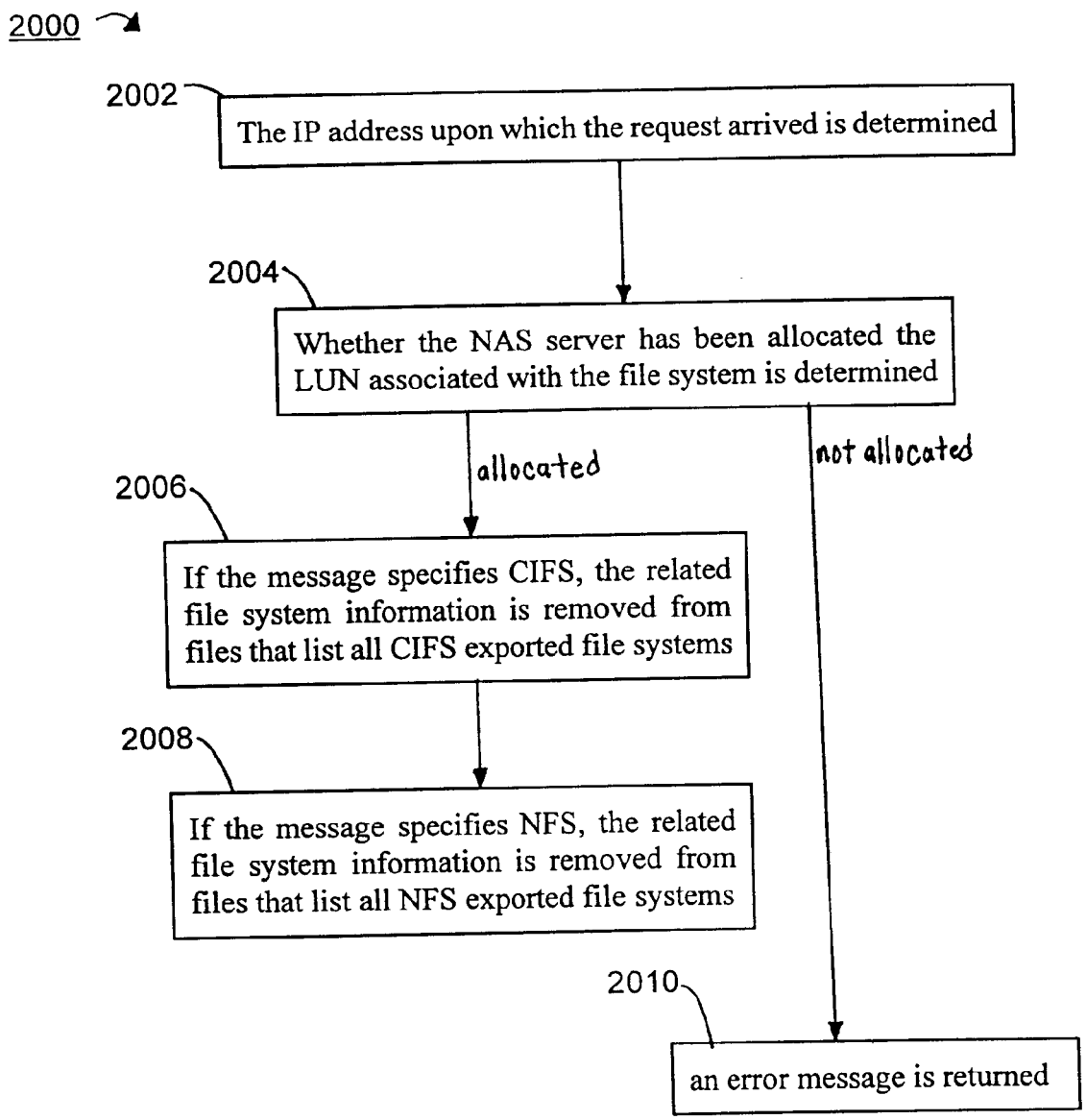

In an embodiment, when the NAS servers receive one of these strings, NAS servers 304*a* and 304*b* may execute the steps shown in flowchart 2000 of FIG. 20, and further described below. In particular, the steps below may be executed by NAS file manager 512 in each NAS server. For example, steps 2002–2008 may be executed by storage configuration module 514:

In step 2002, the IP address upon which the request arrived is determined.

In step 2004, whether the NAS server has been allocated the LUN associated with the file system is determined. If the NAS server has not been allocated the LUN, an error string is returned, and the process ends.

In step 2006, if the message specifies CIFS, the related file system information is removed from the system file that lists all CIFS exported file systems (referred to as the CIFS configuration file elsewhere herein), and the file system is removed from /usr/StorageFile/etc/Ipaddress.CIFSexports.

In step 2008, if the message specifies NFS, the related file system information is removed from the system file that lists all NFS exported file systems (referred to as the NFS configuration file elsewhere herein), and the file system is removed from /usr/StorageFile/etc/Ipaddress.NFSexports.

If these steps are successful, the NAS servers respond with a packet containing the "NAS:1:0 " string. If the steps are unsuccessful, the NAS servers respond with the "NAS:0:NumBytes" string, followed by a string that describes the error.

In addition to allowing a file system to be unexported, GUI 1200 allows the administrator to export a previously unexported file system, and to change attributes of an exported file system (such as access lists and read-only access).

6.5 EXPORTING FILE SYSTEMS

As described above, an administrator can view attributes of a NAS file system displayed in GUI 1200. If a file system is unexported, the administrator can choose to export the file system by selecting the NFS box in panel 1208, and/or the CIFS box in panel 1210, and pressing "Commit" in panel 1204. An administrator may also change access lists, or make the file system read-only, for these protocols through panels 1208 and 1210.

When directed to export a file system, GUI 1200 sends a c37 management directive to SAN server 302*a*. The c37 export file system management directive includes five parameters: the file system name, the protocol in which to export the file system, the number of the NAS server that was allocated the file system, a flag that specifies read-only or read-write, and a comma-separated access list.

For example, the administrator may assign LUN 17 to NAS server 304*b*. In an embodiment, that file system is made available over CIFS and NFS by default. The administrator may want to change attributes of the file system, such that NFS access is read-only, and that access to the file system is restricted only to hosts named client1, client2, and client3. Accordingly, the administrator may select /export0017 in panel 1204, modify the respective attributes in panel 1208, and press "Commit" in panel 1204. GUI 1200 sends a resulting management directive to SAN server 302*a*:

c37 /export0017 NFS 2 ro client1,client2,client3

The directive instructs SAN server 302*a* to re-export the file system /export0017 via NFS as read-only, and to restrict access only to hosts named client1, client2, and client3.

Similarly, the administrator may want to set CIFS access to file system /export0017 to be read-write, and restrict access only to users named betty, fred, and wilma. Accordingly, the administrator may select /export0017 in panel 1204, modify the respective attributes in panel 1210, and press "Commit" in panel 1204. GUI 1200 sends a resulting management directive to SAN server 302*a*:

c37 /export0017 CIFS 2 rw betty,fred,wilma

The directive instructs SAN server 302*a* to export file system /export0017 via CIFS as read-write, and to restrict access to the file system to users betty, fred, and wilma.

After SAN server 302*a* receives the c37 management directive, it creates a NAS protocol message and forwards the message to the NAS server (NAS server 304*a* or 304*b*) specified by the third parameter. Two messages may be required for exporting a file system. For example, the first message contains a string of the following forms:

NFS:Export:fileSystemName:rwFlag:NumBytes

Or

CIFS:Export:fileSystemName:rwFlag:NumBytes

The fileSystemnName parameter is the name of the file system whose attributes are being modified. The rwFlag parameter includes the string "ro" or "rw". The NumBytes parameter is the number of bytes in an access list (including commas). If NumBytes is greater than 0, the SAN server sends a second message containing the comma-separated access list.

Figure 21:
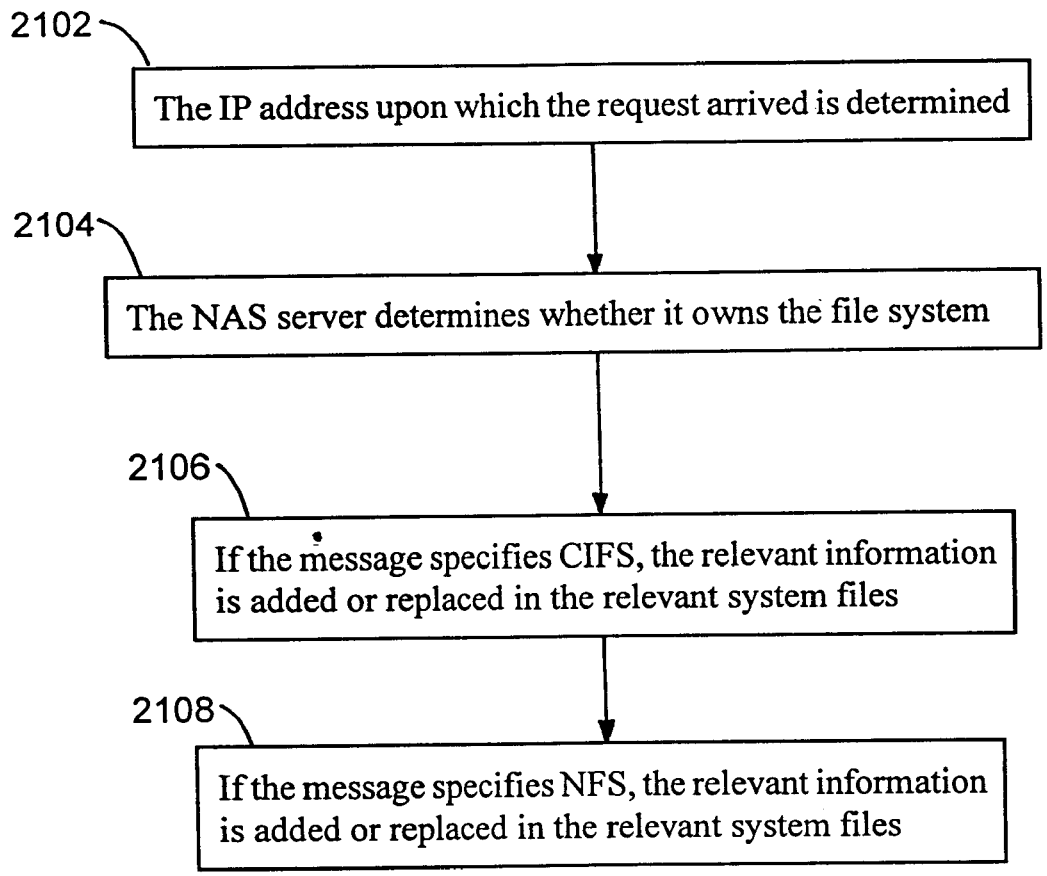

In an embodiment, when the NAS servers receive one of these messages, NAS servers 304*a* and 304*b* may execute the steps shown in flowchart 2100 of FIG. 21, and further described below. In particular, the steps below may be executed by NAS file manager 512 in each NAS server. For example, steps 2102–2108 may be executed by storage configuration module 514:

In step 2102, the IP address upon which the request arrived is determined.

In step 2104, the NAS server determines whether it owns the file system.

In step 2106, if the message specifies CIFS, the relevant information is added or replaced in the CIFS configuration file, and the file /usr/StorageFile/etc/Ipaddress.CIFSexports is updated.

In step 2108, if the message specifies NFS, the relevant information is added or replaced in the NFS configuration file, and the file /usr/StorageFile/etc/Ipaddress.NFSexports is updated.

If the steps are successful, the NAS servers respond with a packet containing the "NAS:1:0" string. If the steps are unsuccessful, the NAS servers respond with the "NAS:0:NumBytes" string, followed by a string that describes the error.

6.6 SETTING PERMISSIONS

After an administrator assigns a NAS LUN, the administrator can modify the file system's owner, group, and permissions attributes. This may be accomplished by selecting the file system from the list in panel 1204, modifying the relevant attributes in panel 1206, and pressing "Commit" in panel 1204.

When directed to change attributes of a file system, GUI 1200 sends a set permissions management directive to SAN server 302a. The c39 management directive includes five parameters: the file system name, the number of the NAS server that has been allocated the file system, the new owner of the file system, the new group name of the file system, and the new permissions of the file system.

For example, suppose the administrator may assign LUN17 to NAS server 304b. After file system /export0017 is created, the administrator may reassign the file system to a user "fred" by inputting the user name into the corresponding text box in panel 1206. The administrator may reassign the file system to a group "research" by inputting the group name into the corresponding text box in panel 1206. The administrator may change permissions for the file system in panel 1206. For example, the administrator may unselect the group write "w" box, and the world read "r", write "w", and execute "x" boxes in panel 1206. GUI 1200 sends a resulting management directive to SAN server 302a:

c39 /export0017 2 fred research rwxr-x—

The directive instructs SAN server 302a to change the owner to fred, the group to research, and the permissions to rwxr-w—, for file system /export0017.

After SAN server 302a receives the c39 management directive, it creates a NAS protocol message and forwards the message to both of NAS servers 304a and 304b. Sending the message to both NAS servers keeps the permissions consistent during fail-over, which is further described below. The message may contain a string of the following form:

LUN:Setperm:fileSystemName:owner:group:permissions

When a NAS server receives the string, it changes the owner, group, and world permissions as specified. If the change of permissions is successful, the NAS server responds with the NAS:1:0 string. If the change of permissions is unsuccessful, the NAS servers respond with two messages. The first packet contains the NAS:0:NumBytes string, where NumBytes is the number of bytes in the second message. The second message contains a description of the error.

7.0 GUI COMMAND LINE INTERFACE

GUI 1200 may provide a command-line interface (CLI) to the NAS functionality to receive CLI commands. CLI commands which correspond to functionality described above are presented below.

The administrator may input the following CLI commands to allocate and de-allocate a NAS LUN: makeNASMap and unMakeNASMap. The commands are followed by two parameters. The NASServerNumber parameter is 1 or 2, depending upon which NAS server being allocated or deallocated the LUN (i.e. NAS servers 304a and 304b). The SANNASLUN parameter is the LUN to be allocated or deallocated:

| makeNASMap | SANNASLUN | NASServerNumber |
|---|---|---|
| unMakeNASMap | SANNASLUN | NASServerNumber |

The administrator may input the following CLI commands to export or unexport a file system: makeExport (followed by five parameters) and unMakeExport (followed by four parameters). The protocolFlag parameter is 0 for CIFS protocol, and is 1 for NFS protocol. The NASserverNumber parameter is equal to 1 or 2 (for NAS server 304a or 304b, respectively). The rwFlag parameter is equal to 0 for read-only, and equal to 1 for read-write. The List parameter is a comma-separated list of hosts or users:

makeExport SANNASLUN protocolFlag NASServerNumber rwFlag List unMakeExport SANNASLUN protocolFlag NASServerNumber The administrator issues the following CLI command to set the permissions on a file system: ChangeExport (followed by five parameters):

ChangeExport SANNASLUN NASServerNumber Owner Group Permissions

CLI commands may also be used to retrieve NAS file system listings. For example, CLI commands that may be used are listed as follows, followed by their description:

nasMaps

This CLI command lists LUNs assigned to NAS. For example, this is determined by determining the LUNs assigned to NASServerNASOne and NASServerNASTwo (i.e., NAS server 304a and 304b).

exports

This CLI command lists all NAS file systems and their properties.

nfsExports

This CLI command lists all NAS file systems exported via NFS, along with their properties.

cifsExports

This CLI command lists all NAS file systems exported via CIFS, along with their properties.

refreshNASMaps

This CLI command refreshes all NAS related configurations and deletes all uncommitted NAS changes.

Additional CLI commands, or modifications to the CLI commands presented above, applicable to GUI 1200 of the present invention would be recognized by persons skilled in the relevant art(s) from the teachings herein.

8.0 OBTAINING STATISTICS

Although not shown in GUI 1200, a management directive may be provided that obtains NAS statistics. The management directive allows monitoring of the NAS functionality, and alerts a user upon error.

To obtain statistics and error information, monitoring users or applications may send a c40 management directive to a SAN server. The c40 obtain statistics management directive is followed by no parameters. The directive is sent to the SAN server, and the SAN server returns a series of strings that show network statistics, remote procedure call statistics, file system statistics, and error conditions.

A string returned by the SAN server that contains network statistics may have the following form:

NASServer:NET:OutputPackets:Collisions:InputPackets:InputErrors

The NASServer parameter is the number 1 or 2, which corresponds to the first and second NAS servers (i.e., NAS servers 304a and 304b). Each NAS server will be represented by one instance of that line.

The value of the OutputPackets parameter is the number of network packets sent out by the NAS server. The value of the Collisions parameter is the number of network collisions that have occurred. Those two values may be used to determine a collision rate (the collision rate is Collisions divided by OutputPackets). If the collision rate is greater than 0.05, the user's "wire" is considered "hot." This means that there likely are too many machines coupled to the user's "wire" or network, causing network collisions and greatly reducing performance. If that happens, entity monitoring the network statistics may recommend that the user install bridges or switches into the network.

The value of the InputPackets parameter is the number of packets received by the NAS server. The value of the InputErrors parameter is the number of bad packets received. Input errors may be caused by electrical problems on the network, or by receiving bad checksums. If the entity monitoring the network statistics sees the InputErrors rising, the user may have a client machine coupled to the network with a faulty network interface card, or the client may have damaged cables.

If the value of InputPackets on NAS server 304a is significantly higher or lower than that of NAS server 304b, the user may consider reassigning NAS LUNs across the NAS servers to help balance the load.

Another returned string type contains remote procedure call (RPC) statistics, and may have the following form:

NASServer:RPC:TotalCalls:MalformedCalls

As in the prior string, the value of NAS Server is 1 or 2, which corresponds to the first or second NAS server (i.e., NAS server 304a and 304b). Each NAS server will be represented by one instance of the RPC statistics line.

The value of the TotalCalls parameter is the number of RPC calls received. The value of the MalformedCalls parameter is the number of RPC calls that had errors. A malformed call is one that was damaged by the network (but still passed the checksum). If the entity monitoring the RPC statistics sees a large number of malformed calls, the user may have a network that is jittery.

If the value of the TotalCalls parameter on NAS server 304a is significantly higher or lower than that of NAS server 304b, the user is providing more NFS traffic to one of the servers. The user should think about reassigning NAS LUNs across the NAS servers to help balance the load.

A third returned string type contains file system information, and may have the following form:

NASServer:FS:/exportxxxx:TotalSize:AvailableSize

Each NAS Server may provide one of these strings for each file system it owns.

The /exportxxxx parameter is the name of the file system (where xxxx is a four-digit representation of the LUN number). The value of the TotalSize parameter is the size of the file system in kilobytes, for example. The value of the AvailableSize parameter is the amount of free space (in kilobytes, for example). If the amount of free space becomes too small, the entity monitoring the file system information should inform the user.

A fourth returned string type contains error information, and may have the following form:

NASServer:ERR:Severity:TimeOfError:Message

Each NAS Server may provide one or more of these strings. The Severity parameter is a number (with 1 being the most critical). The Message parameter describes an error that occurred. For example, if NAS server 304b went down and NAS server 304a took over, the following error message may be returned:

1:ERR:1:08.23–15.03:TAKEOVER—192.168.30.31 is taking over 192.168.30.32

To summarize, an example output from a c40 call is shown below. Note that any number of the above described strings may result in an output to the c40 call:

1:NET:7513:0:59146:0

1:RPC:430:0

1:FS:/export0005:256667:209459

1:ERR:1:08.23–15.03:TAKEOVER—192.168.30.31 is taking over 192.168.30.32

1:ERR:1:08.23–18.22:RELINQUISH—Relinquishing control of 192.168.30.32

2:NET:6772:0:55656:0

2:RPC:453:0

2:FS:/export0001:3434322:67772

2:FS:/export0002:256667:20945

The output indicates that network is OK. However, NAS server 304a took over for NAS server 304b at a time of 15:03 on Aug. 23, as indicated by a timestamp in the output above. The output also indicates that NAS server 304b came back up at a time of 18:22. Further description of fail-over and recovery are provide in a section below. (Note that in embodiments, the timestamp may further indicate the particular time zone.)

When a SAN server receives the c40 management directive, it creates a NAS protocol message and forwards it to the NAS servers. The message may contain a string of the following form:

LUN:GetStats

Figure 22:
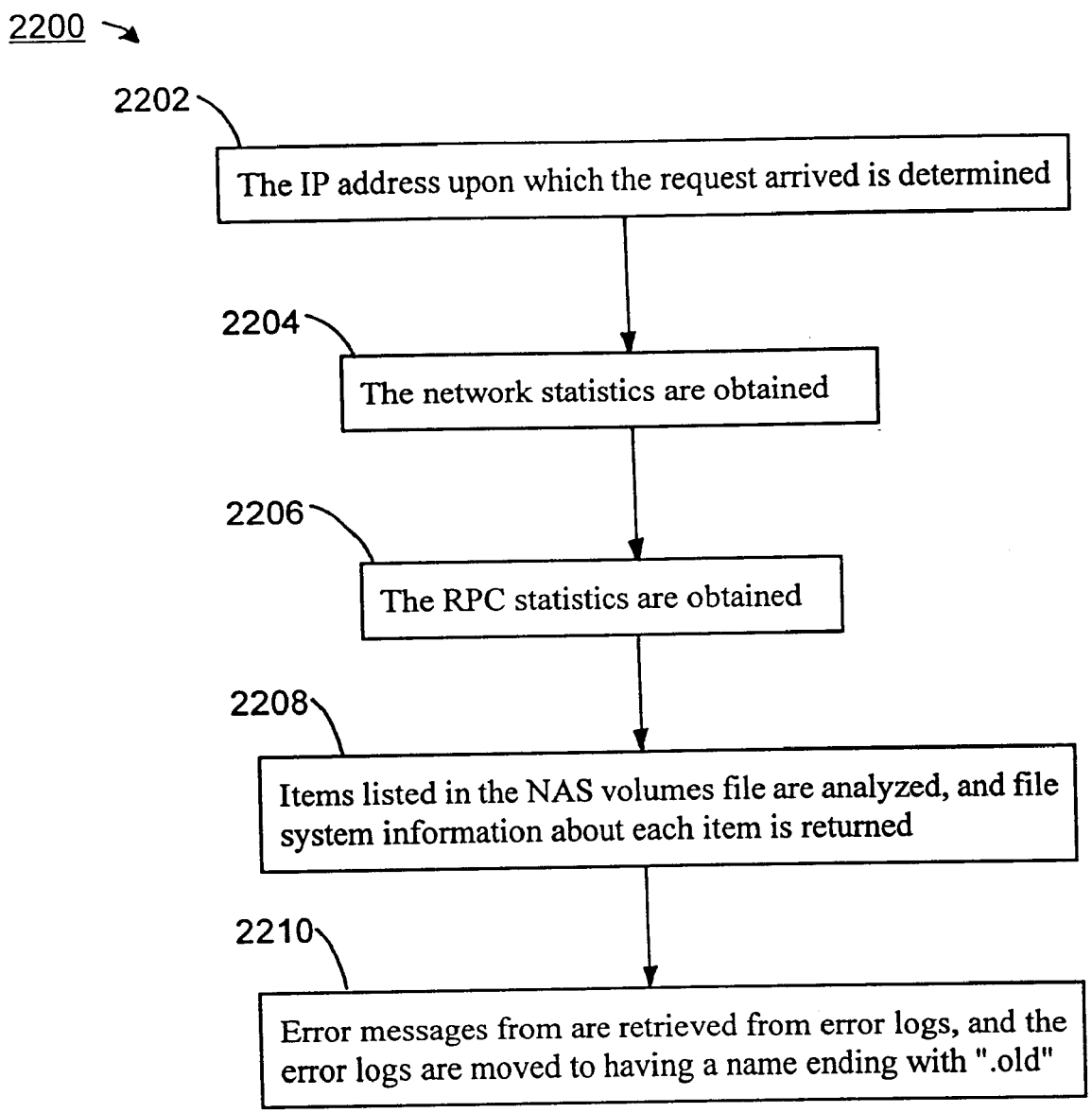

In an embodiment, when the NAS servers receive one of these messages, each of NAS servers 304a and 304b may execute the steps shown in flowchart 2200 of FIG. 22, and further described below. In particular, the steps below may be executed by NAS file manager 512 in each NAS server. For example, steps 2202–2210 may be executed by storage configuration module 514:

In step 2202, the IP address upon which the request arrived is determined.

In step 2204, the network statistics are obtained.

In step 2206, the RPC statistics are obtained.

In step 2208, items listed in /usr/StorageFile/etc/Ipaddress.NASvolumes are analyzed, and file system information about each item is returned.

In step 2210, error messages from are retrieved from error logs, and the error logs are moved to having a name ending with ".old". In this manner, a subsequent call will not return the same errors.

If the above steps are successful, the NAS servers each respond with two messages. The first message containing the following string:

NAS:1:NumBytes

The value of the NumBytes parameter is the number of bytes in the information that follows. The second message is the information collected in the above steps, such as shown in the example output above. If unsuccessful, the unsuccessful NAS server respond with the "NAS:0:NumBytes" string, followed by a string that describes the error.

9.0 PROVIDING HIGH AVAILABILITY ACCORDING TO THE PRESENT INVENTION

As described above, a goal of the NAS implementation of the present invention is to provide high-availability. The following sections present the NAS high-availability features by describing NAS configuration, boot-up, and fail-over.

9.1 NAS SERVER CONFIGURATION

To improve ease of installation, the NAS configuration is accomplished by the SAN servers. According to the present invention, a command is issued on the SAN server, informing it of the initial IP addresses of the SAN servers. Once the SAN servers have this information, the SAN server can communicate with the NAS servers. Further NAS configuration may be accomplished from the SAN server.

In an embodiment, to aid in the configuration of the storage appliance, a NAS Configuration Sheet may be supplied to each user configuring the system. The user fills out the NAS Configuration sheet, and a configuring entity may run three commands (described in the following subsection) to configure the NAS servers. The commands send a c41 management directive to the SAN server.

The c41 management directive takes on several instances, each configuring a different part of a NAS server. The first instance configures the NAS server addresses, as described in the following section. Further instances of the c41 management directive may be used to configure NFS and CIFS on a NAS server.

9.1.1 CONFIGURING NAS SERVER ADDRESSES

In the embodiment shown in FIG. 7, because each NAS server provides redundancy, each includes two Internet protocol (IP) addresses. The first IP address is a "boot up" IP address, and the second is a public IP address. Two IP addresses are necessary for fail-over, as further described in a section below.

To configure NAS addresses, the entity performing the configuration may obtain the completed NAS Configuration Sheet, and use this information to perform the configuration. To perform the configuration, a CLI or GUI sends the c41 management directive to the SAN server. The c41 configure NAS server management directive may use the following parameters:

1. The keyword addr;
2. The IP address of the primary SAN server;
3. The IP address of the redundant SAN server;
4. The hostname of the first NAS server;
5. The public IP address of the first NAS server;
6. The boot up IP address of the first NAS server;
7. The hostname of the second NAS server;
8. The public IP address of the second NAS server;
9. The boot up IP address of the second NAS server;
10. The IP netmask;
11. The IP broadcast address; and
12. The default gateway address.

Figure 23:
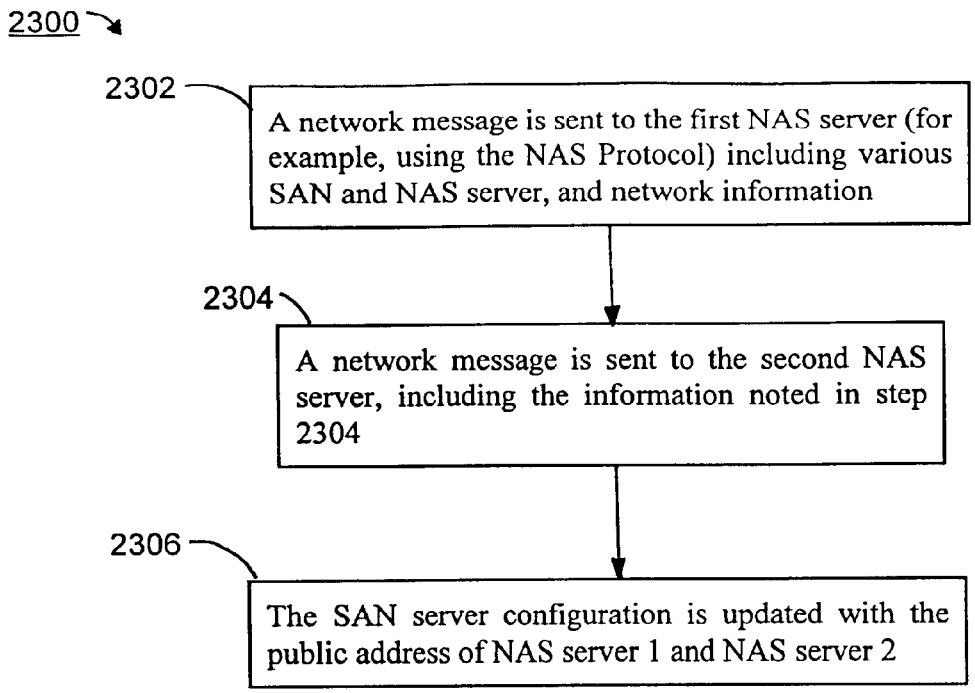

In an embodiment, when a SAN server receives the c41 management directive with a first parameter of addr, the SAN server may execute the steps shown in flowchart 2300 of FIG. 23, and further described below. In particular, the steps below may be executed by SAN storage manager 404 in the SAN server 302:

In step 2302, a network message is sent to the first NAS server (for example, using the NAS Protocol) including the information listed above. The SAN server uses the configured IP address to communicate with the NAS server. The SAN server informs the NAS server that it is NAS server 1.

In step 2304, a network message is sent to the second NAS server, including the information listed above. The SAN server uses the configured IP address to communicate with the NAS server. The SAN server informs the NAS server that it is NAS server 2.

In step 2306, the SAN server configuration is updated with the public address of NAS server 1 and NAS server 2. In an embodiment, future communication with the NAS servers occurs via the public IP address.

The network message of steps 2302 and 2304 above may include a string of the following form:

CONF:ADDR:ServNum:IP1:IP2:HostName1:IP3:IP4: HostName2:IP5:IP6:NM:BC:GW

The ServNum parameter is the NAS Server number. The SAN server places a 1 in that field when it sends the message to the first NAS server, and places a 2 in that field when it sends the message to the second NAS server. The IP1 and IP2 parameters are the addresses of the SAN servers, IP3 and IP4 are the public and boot-up addresses of the first NAS server, and IP5 and IP6 are the public and boot-up addresses of the second NAS server. NM, BC, and GW are the Netmask, Broadcast address, and Gateway of the network.

Figure 24:
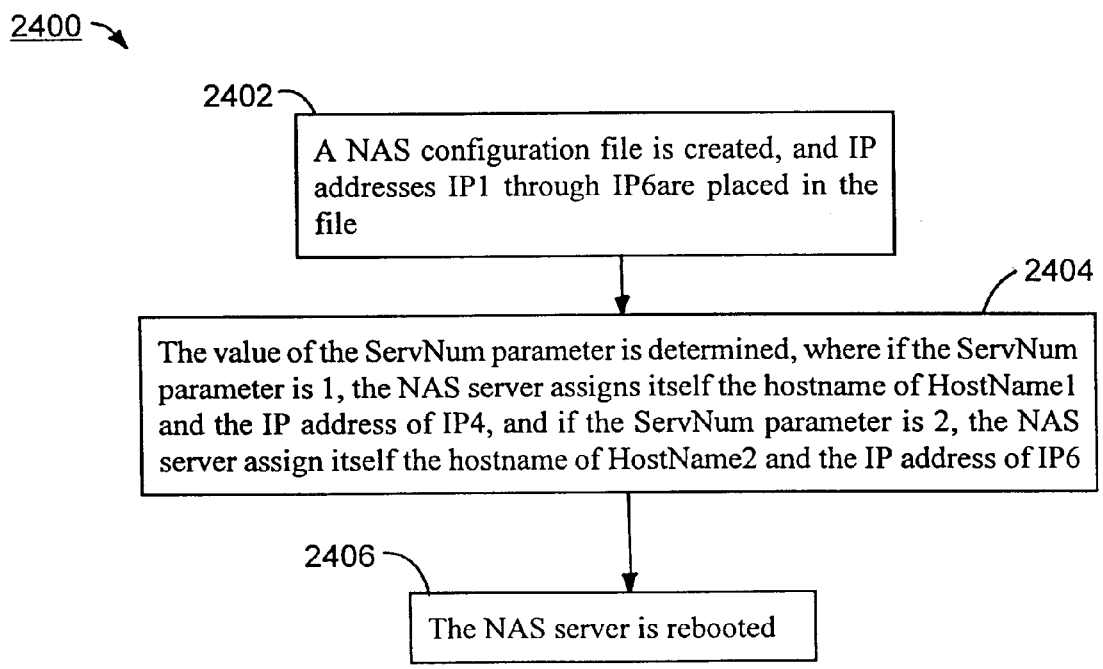

In an embodiment, when the NAS servers receive the network message, they may execute the steps shown in flowchart 2400 of FIG. 24, and further described below. In particular, the steps below may be executed by NAS file manager 512 in each NAS server. For example, steps 2402–2406 may be executed by storage configuration module 514:

In step 2402, a file named /usr/StorageFile/etc/NASconfig is created, and the following information is placed in the file:

SanAppliance: IP1 IP2
1: IP3 IP4
2: IP5 IP6

The first line contains the addresses of both SAN servers, the second line contains the public and boot-up addresses of the first NAS server, and the third line contains the public and boot-up addresses of the second NAS server. Both NAS servers will use that file to figure out their NAS server number.

In step 2404, the value of the ServNum parameter is determined. If the ServNum parameter is 1, the NAS server modifies its Linux configuration files to assign itself the hostname of HostName1, and the IP address of IP4 (i.e., it's boot-up IP address). If the ServNum parameter is 2, the NAS server modifies its Linux configuration to assign itself the hostname of HostName2, and the IP address of IP6.

In step 2406, the NAS server is rebooted.

After rebooting, each NAS server have been assigned and configured with the desired hostname and boot-up IP address. Also, the SAN servers have stored the public address of each NAS server. After boot-up, the NAS servers may assign themselves their public IP address, which is described in the following section.

9.2 NAS SERVER BOOT-UP

Following boot-up after step 2406 of the prior section, each NAS Server may execute the steps shown in flowchart

Figure 25:
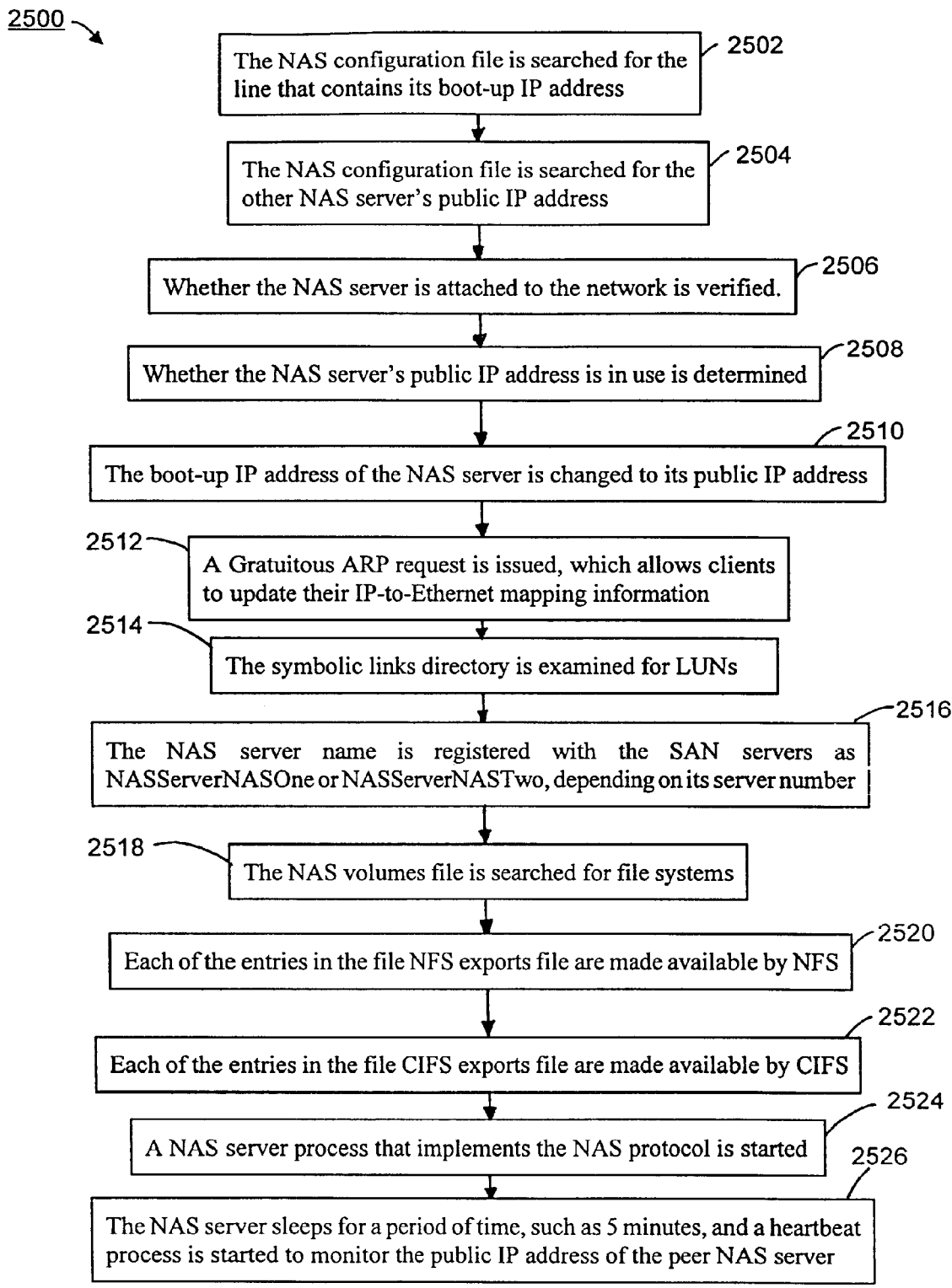
Figure 27:
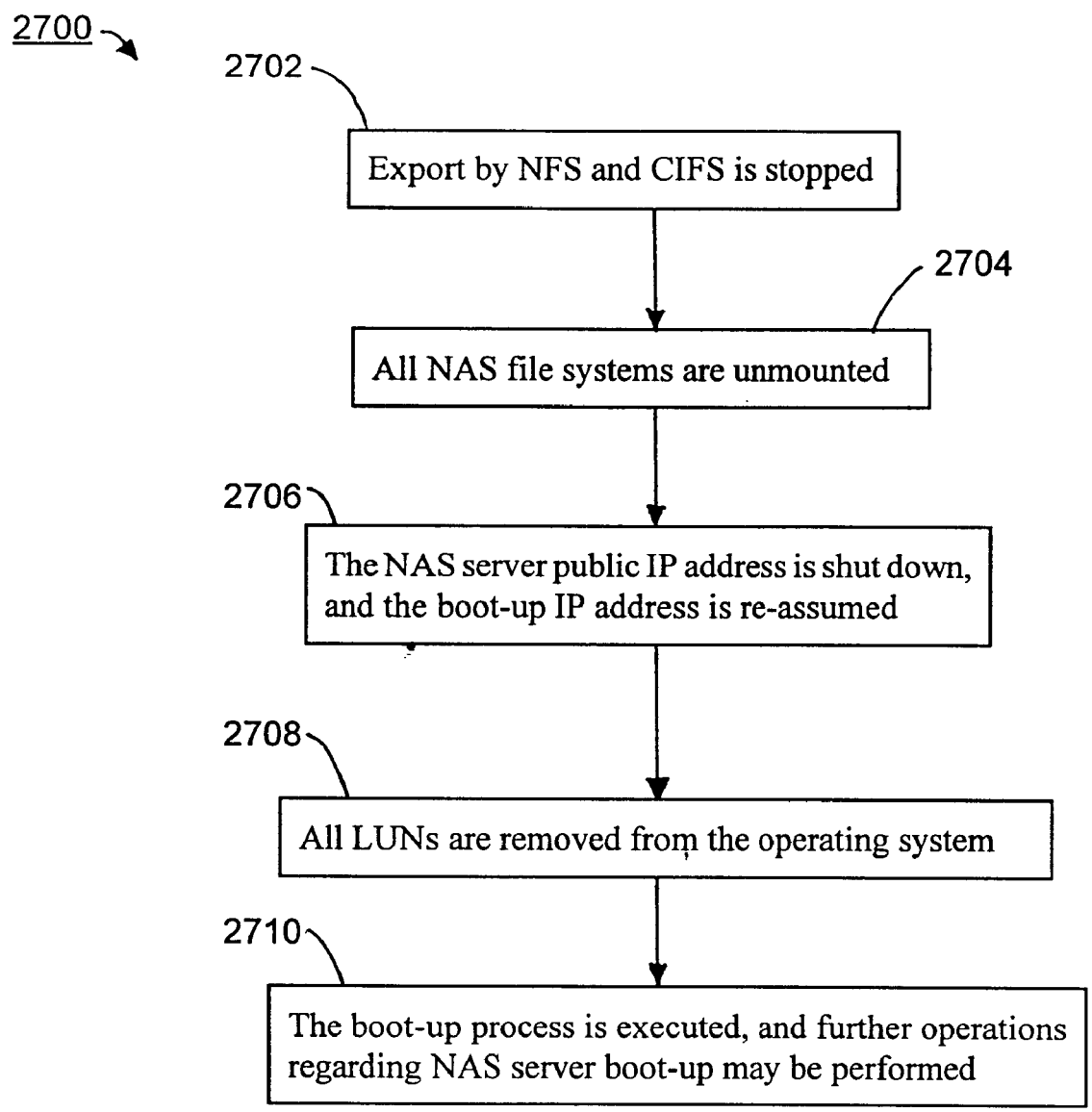
Figure 28:
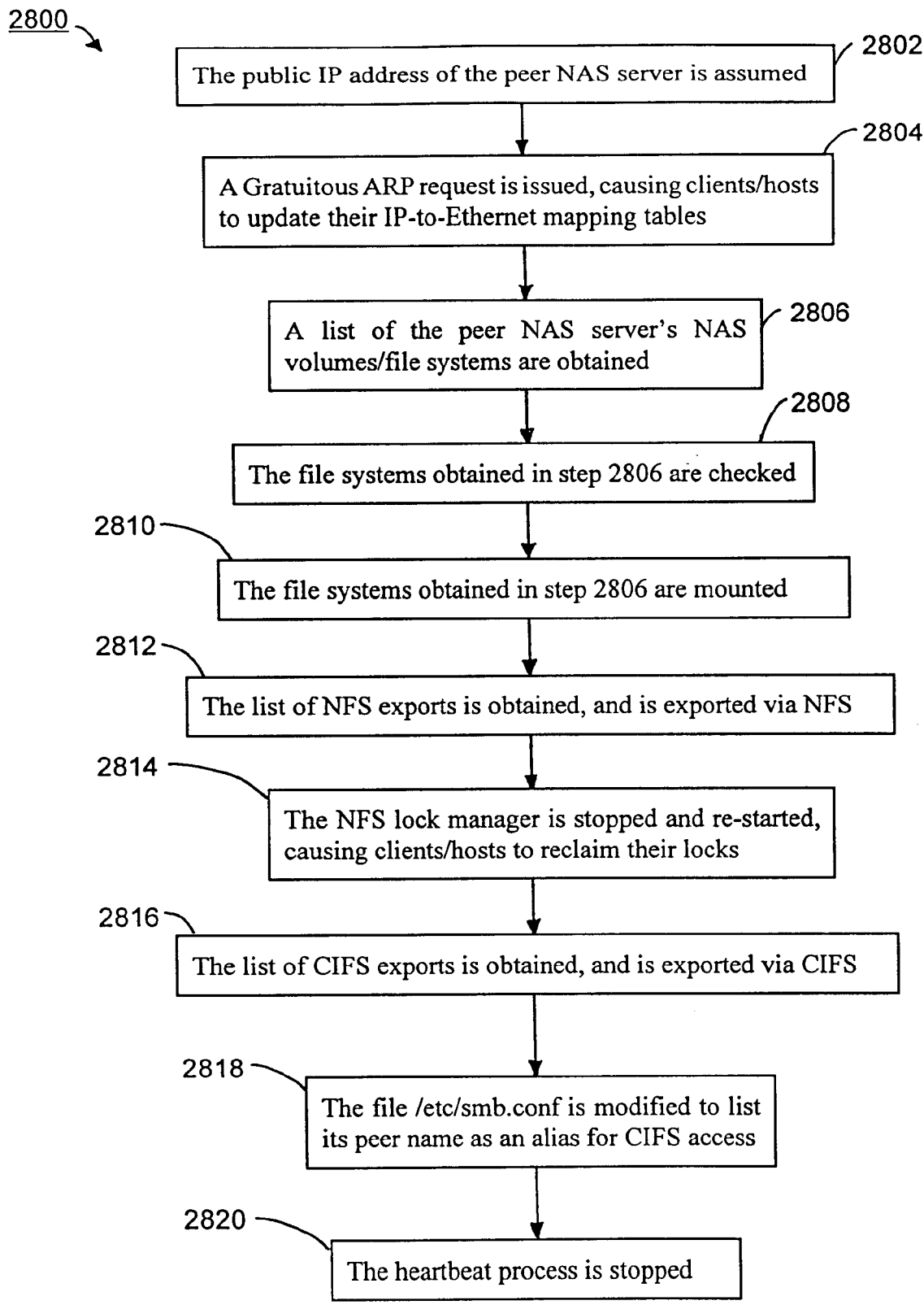

2500 of FIG. 25, and further described below. In particular, the steps below may be executed by NAS file manager 512 in each NAS server. For example, steps 2502–2526 may be executed by storage configuration module 514:

In step 2502, the file /usr/StorageFile/etc/NASconfig is searched for the line that contains its boot-up IP address. From that line, the NAS server determines its NAS server number and its public IP address.

In step 2504, the file /usr/StorageFile/etc/NASconfig is searched for the other NAS server's public IP address. This may be accomplished by searching the file for the other NAS server number.

In step 2506, whether the NAS server is attached to the network is verified. This may be verified by attempting to communicate with the SAN servers, for example (the IP addresses of the SAN servers are stored in /usr/StorageFile/etc/NASconfig). If the NAS server cannot communicate with the SAN servers, it assumes that its network interface card has a problem. In this situation, the NAS server may go into a loop, where it sleeps for 10 seconds, for example, and the retries step 3.

In step 2508, whether the NAS server's public IP address is in use is determined. This may be determined by attempting to send a network message to its public IP address, for example. If its public address is in use, then fail-over has occurred. In this case, the NAS server sends a message to the peer NAS server, informing the peer NAS server that it has come back up. The peer NAS server relinquishes control of the assumed public IP address, and relinquishes control of the file systems it assumed control over during fail-over.

In step 2510, the boot-up IP address of the NAS server is changed to its public IP address.

In step 2512, a Gratuitous ARP request is issued, which allows clients to update their IP-to-Ethenet mapping information.

In step 2514, the directory /dev/StorageDir is examined for LUNs. To avoid constantly reassigning Linux symbolic device names, the NAS server does not query for all LUNs on startup. Instead, NAS server examines the file /dev/StorageDir. For each symbolic link in that directory, the NAS server adds the LUN into its operating system and re-creates the symbolic link. The links in /dev/StorageDir are more fully described above.

In step 2516, the NAS server name is registered with the SAN servers as NASServerNASOne or NASServerNASTwo, depending on its server number.

In step 2518, the file /usr/StorageFile/etc/PublicIPAddress.NASvolumes is searched for file systems. For each file system listed in the directory, the NAS server checks the file system and mounts it.

In step 2520, each of the entries in the file /usr/StorageFile/etc/PublicIPAddress.NFSexports are made available by NFS.

In step 2522, each of the entries in the file /usr/StorageFile/etc/PublicIPAddress.CIFSexports are made available by CIFS.

In step 2524, a NAS server process that implements the NAS protocol is started.

In step 2526, the NAS server sleeps for a period of time, such as 5 minutes, and a heartbeat process is started to monitor the public IP address of the peer NAS server. The NAS server waits for a period of time because the peer NAS server may also be booting up.

Hence, after the NAS server performs the above steps, it has determined its public IP address, the process that implements the NAS protocol is running, and a heartbeat process that monitors the peer NAS server has been started. The following sub-section describes what happens when the peer NAS server crashes.

9.3 NAS SERVER FAILURE AND RECOVERY

As described above, after a NAS server boots, it starts a heartbeat process that monitors its peer. For example, the NAS server may send a heartbeat pulse to the peer NAS server, and receive a heartbeat pulse sent by the peer NAS server. If the NAS server determines that it cannot communicate with the peer NAS server, by monitoring the peer NAS server's heartbeat pulse, fail-over occurs. When fail-over occurs, the NAS server takes on the public IP address of the peer NAS server, takes on the hostname of the peer NAS server (as an alias to its own, for example), and exports all of the file systems that were exported by the peer NAS server.

FIG. 15 illustrates a NAS server 304 that includes a heartbeat process module 1502. Embodiments for the heartbeat process module 1502 of the NAS server of the present invention are described as follows. These implementations are described herein for illustrative purposes, and are not limiting. In particular, the heartbeat process module as described herein can be achieved using any number of structural implementations, including hardware, firmware, software, or any combination thereof. The present invention is applicable to further ways of determining network failures, through the use of heartbeat signals and other means. Example implementations for determining network failures are described in pending U.S. patent application entitled "Internet Protocol Data Mirroring," Ser. No. 09/664,499, Attorney Docket Number 1942.0040000, the full disclosure of which is incorporated herein by reference.

Heartbeat process module 1502 generates a heartbeat process. Under the control of the heartbeat process executing on the NAS server, the NAS server connects to the NAS Protocol server on the public IP address of the peer NAS server (for example, the connection may be made every 10 seconds). After the connection is made, the NAS server sends a message containing the following string:

AYT:

After the peer NAS server receives the message, the peer NAS server may execute the steps shown in flowchart 2600 of FIG. 26, and further described below:

In step 2602, the IP address upon which the request arrived is determined.

In step 2604, the following files are checked for any modifications since the last "AYT:" message was received:

/usr/StorageFile/etc/Ipaddress.NASvolumes

/usr/StorageFile/etc/Ipaddress.CIFSexports

/usr/StorageFile/etc/Ipaddress.NFSexports

In step 2606, if it was determined in step 2604 that any of those files have been modified, the modified file is sent in a response to the message.

In step 2608, if any of the NFS locking status files have been modified since the last "AYT:" message, the modified NFS locking status file(s) are sent in a response to the message.

The response to the "AYT:" message may include several messages. A first message contains a string that may have the following form:

NAS:1:NumFiles

The NumFiles parameter indicates the number of files that the peer NAS server is sending in the response to the NAS server. If value of the NumFiles parameter is not zero, the peer NAS server sends two messages for each file found modified in the steps above. A first of the two messages may contain the following string:

Filename:fileSize

The Filename parameter is the name of the file being sent in the response. The fileSize parameter is the number of bytes in the file. A second of the two messages may contain the contents of the file.

If an error occurs, the peer NAS server responds with the "NAS:0:NumBytes" string, followed by a string that describes the error. The parameter NumBytes is the length of the string that followed.

As a result of the above steps, after sending an "AYT:" message to the peer NAS server, the NAS server may receive files containing the peer NAS server's NAS volumes, CIFS exports, and NFS exports. For example, NAS server 304a may have a public IP address of 192.11.109.8, and NAS server 304b may have the public IP address of 192.11.109.9. Accordingly, NAS server 304a would store the following files containing its information. These files are typically populated when the NAS server receives NAS Protocol messages:

/usr/StorageFile/etc/192.11.109.8.NASvolumes
/usr/StorageFile/etc/192.11.109.8.CIFSexports
/usr/StorageFile/etc/192.11.109.8.NFSexports NAS server 304a would also store the following files containing the corresponding information of the peer NAS server, NAS server 304b:

/usr/StorageFile/etc/192.11.109.9.NASvolumes
/usr/StorageFile/etc/192.11.109.9.CIFSexports
/usr/StorageFile/etc/192.11.109.9.NFSexports So, at periodic intervals (such as 10 seconds), NAS server 304a sends an "ATY:" message to peer NAS server 304b, and peer NAS server 304b responds with updates to the above described NAS files.

If the NAS server cannot connect to the peer NAS server, the peer may be down, and fail-over may be necessary. If the NAS server cannot connect to the public IP address of the peer NAS server, it first checks to see if it can send a "ping" to the public IP address of the peer. If so, the NAS server may assume the NAS Protocol server on the peer NAS server has exited. The NAS server may accordingly record an error message. The error message may be displayed the next time a user sends the c40 directive to the NAS server, for example.

If the NAS server is unable to connect to the public IP address of the peer NAS server, and is unable to "ping" the public IP address of the peer NAS server, the NAS server may attempt to contact each SAN server. If the NAS server cannot contact either SAN server, the NAS server may assume that something is wrong with its network interface card. In that event, the NAS server may sleep for some interval of time, such as 10 seconds, and then attempt to contact the NAS and SAN servers again. By sleeping for a period of time, fail-over due to temporary network outages may be avoided. After the second attempt, if the NAS server cannot contact its peer NAS server and the SAN servers, the NAS server may shut down NAS services. Specifically, the NAS server may execute the steps shown in flowchart 2700 of FIG. 27, and further described below:

In step 2702, export of file systems by NFS and CIFS is stopped.

In step 2704, all NAS file systems are unmounted.

In step 2706, the NAS server public IP address is shut down, and the boot-up IP address is re-assumed.

In step 2708, all LUNs are removed from the operating system.

In step 2710, the boot-up process described in the previous section is executed, and further operations described in the previous section regarding NAS server boot-up may be performed.

If the NAS server is unable to connect to the public IP address of the peer NAS server, but can contact a SAN server, it may assume the peer NAS server is down. In that event, the NAS server may sleep for a period of time (for example, 10 seconds). Sleeping for a period of time may aid in preventing fail-over from occurring during temporary network outages. After sleeping, the NAS server may re-attempt connecting to the peer NAS server. If, after the second attempt, the NAS server is unable to connect with the peer NAS server, the NAS server may perform NAS fail-over. In an embodiment, the NAS server may execute the steps shown in flowchart 2800 of FIG. 28, and further described below:

In step 2802, the public IP address of the peer NAS server is assumed.

In step 2804, a Gratuitous ARP request is issued, causing clients/hosts to update their IP-to-Ethernet mapping tables.

In step 2806, a list of the peer NAS server's NAS volumes/file systems are obtained from /usr/StorageFile/etc/Ipaddr.NASvolumes. "Ipaddr" is the public IP address of the peer NAS server.

In step 2808, the file systems obtained in step 2806 are checked.

In step 2810, the file systems obtained in step 2806 are mounted.

In step 2812, the list of NFS exports is obtained from /usr/StorageFile/etc/Ipaddr.NFSexports, and is exported via NFS.

In step 2814, the NFS lock manager is stopped and re-started, causing clients/hosts to reclaim their locks.

In step 2816, the list of CIFS exports is obtained from /usr/StorageFile/etc/Ipaddr.CIFSexports, and is exported via CIFS.

In step 2818, the file /etc/smb.conf is modified to list its peer name as an alias for CIFS access.

In step 2820, the heartbeat process is stopped. The heartbeat process is resumed when the peer comes back up, as described below.

When fail-over occurs, clients see a small period of time where the server seems inaccessible. That is because the NAS server must check every file system that was exported by the failed peer, mount it, and export it. However, after the NAS server completes the processing, the client sees the server as accessible again. It client is not aware that a second server has assumed the identity of the failed server.

As mentioned in the section above relating to NAS server boot-up, a NAS server resumes its NAS functionality when it comes back up. After the NAS server boots, the NAS server checks to see if its public IP address is in use. For example, the NAS server may determine this by attempting to send a network message to its public IP address. If the NAS server's public address is in use, then fail-over has likely occurred. If that event, the NAS server may notify the peer NAS server that it has recovered. For example, the NAS server may send a message containing the following string to the peer NAS server:

I_AM_BACK:

When the peer NAS server receives this message, the peer NAS server may perform steps to return control of the original storage resources to the NAS server. For example, the peer NAS server may execute the steps shown in flowchart 2900 of FIG. 29, and further described below:

In step 2902, the public IP address of the NAS server is brought down.

In step 2904, file systems in Ipaddr.NFSexports are unexported.

In step 2906, file systems in Ipaddr.CIFSexports are unexported.

In step 2908, file systems in Ipaddr.NASvolumes are unexported

In step 2910, the heartbeat to the NAS server is re-started.

In summary, failure of a NAS server results in the peer NAS server taking over all of the failed NAS server's resources. When the failed NAS server comes back up, it resumes control over its original resources.

10.0 EXAMPLE NAS PROTOCOL MESSAGES

The NAS Protocol discussed above is a simple protocol that allows a SAN server to communicate with the NAS servers, and allows the NAS servers to communicate between themselves. FIG. 15 illustrates a NAS server 304 that includes a NAS protocol module 1504, according to an embodiment of the present invention. Embodiments for the NAS protocol module 1504 of the present invention are described as follows. These implementations are described herein for illustrative purposes, and are not limiting. In particular, the NAS protocol module as described herein can be achieved using any number of structural implementations, including hardware, firmware, software, or any combination thereof.

NAS protocol module 1504 generates a NAS protocol process. In an embodiment, the NAS protocol process binds to TCP port number 8173. The NAS protocol may use ASCII strings. To simplify session-layer issues, the first packet is 256 bytes. If the string in the packet is less than 256 bytes, the string may be NULL-terminated and the receiving process ignores the remainder of the 256 bytes.

Messages in the NAS protocol are listed below. Further description of each message is presented elsewhere herein. In an embodiment, for all cases, a failure response consists of two messages. The first message is a 256-byte packet that contains the string "NAS:0:NumBytes", where NumBytes is the number of bytes in the second message. The second message contains a string describing the error. The responses listed below are example responses indicating successful completion.

```
Request:   LUN:Enable:LunNumber:CreateFSFlag
Response:  NAS:1:0
Request:   LUN :Disable:LunNumber
Response:  NAS:1:0
Request:   LUN:ListVols:Type
Response:  Message 1:   NAS:1:NumBytes
           Message 2:   NumBytes of data
Request:   LUN:GetStats
Response:  Message 1:   NAS:1:NumBytes
           Message 2:   NumBytes of data
Request:   LUN: Setperm:FileSystem:Owner:Group:Permissions
Response:  NAS:1:0
Request:   NFS:Unexport:FileSystem
Response:  NAS:1:0
Request:   Message 1:   NFS:Export:FileSystem:rwFlag:NumBytes
           Message 2:   NumBytes-length string with comma-
                        separated list of hosts
Response:  NAS:1:0
Request:   CIFS:Unexport:FileSystem
Response:  NAS:1:0
Request:   Message 1:   CIFS:Export:FileSystem:rwFlag:NumBytes
           Message 2:   NumBytes-length string with comma-separated
                        list of users
Response:  NAS:1:0
```

Additional NAS protocol messages, or modifications to the NAS protocol messages presented above, would be recognized by persons skilled in the relevant art(s) from the teachings herein, and are within the scope and spirit of the present invention.

11.0 EXAMPLE COMPUTER SYSTEM

Figure 10:
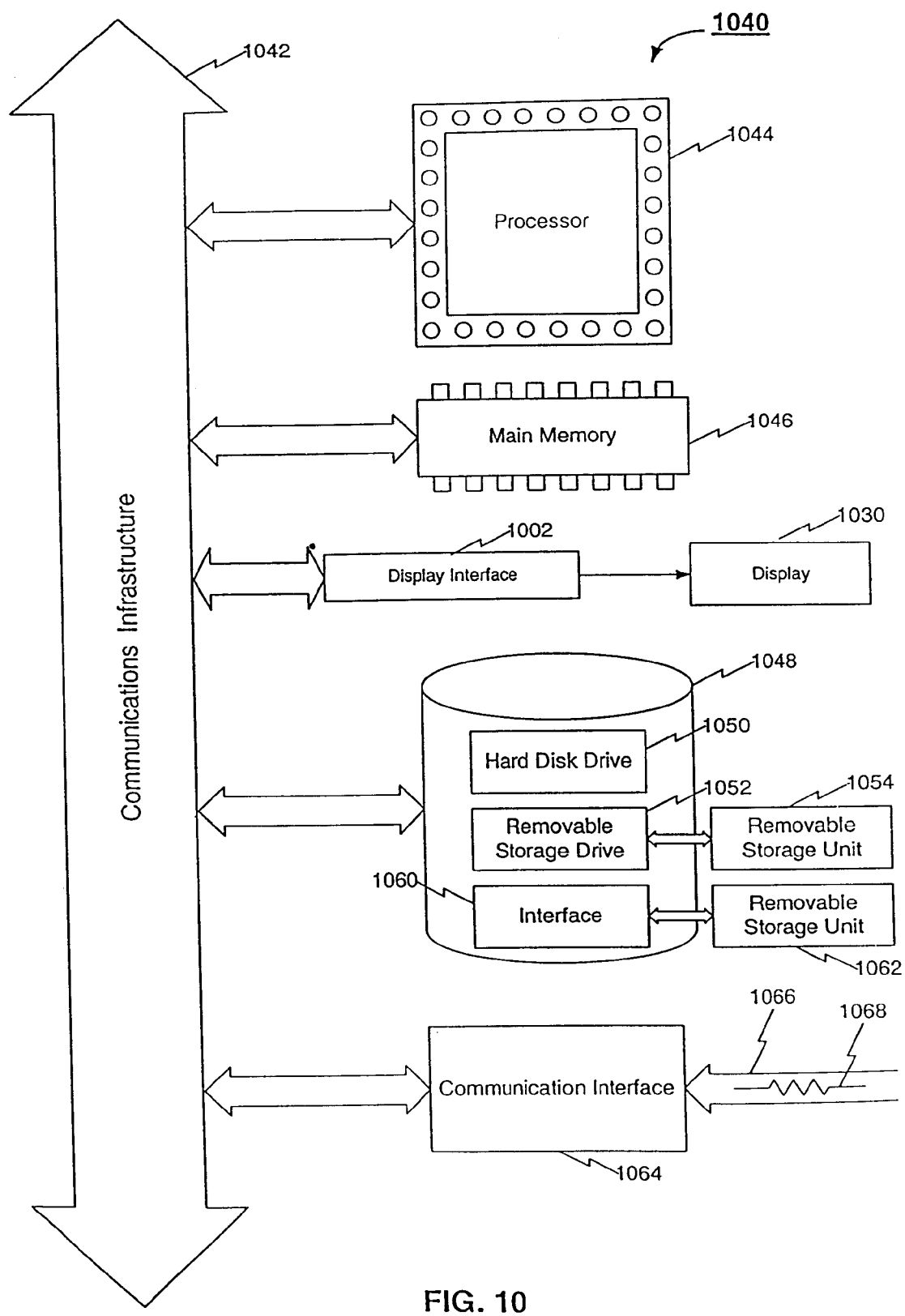
FIG. 10 shows an example of a computer system for implementing aspects of the present invention.

An example of a computer system 1040 is shown in FIG. 10. The computer system 1040 represents any single or multi-processor computer. In conjunction, single-threaded and multi-threaded applications can be used. Unified or distributed memory systems can be used. Computer system 1040, or portions thereof, may be used to implement the present invention. For example, each of the SAN servers and NAS servers of the present invention may comprise software running on a computer system such as computer system 1040.

In one example, elements of the present invention may be implemented in a multi-platform (platform independent) programming language such as JAVA 1.1, programming language/structured query language (PL/SQL), hyper-text mark-up language (HTML), practical extraction report language (PERL), common gateway interface/structured query language (CGI/SQL) or the like. Java™-enabled and JavaScript™-enabled browsers are used, such as, Netscape™, HotJava™, and Microsoft™ Explorer™ browsers. Active content Web pages can be used. Such active content Web pages can include Java™ applets or ActiveX™ controls, or any other active content technology developed now or in the future. The present invention, however, is not intended to be limited to Java™, JavaScript™, or their enabled browsers, and can be implemented in any programming language and browser, developed now or in the future, as would be apparent to a person skilled in the art given this description.

In another example, the present invention may be implemented using a high-level programming language (e.g., C++) and applications written for the Microsoft Windows™ environment. It will be apparent to persons skilled in the relevant art(s) how to implement the invention in alternative embodiments from the teachings herein.

Computer system 1040 includes one or more processors, such as processor 1044. One or more processors 1044 can execute software implementing routines described above, such as shown in flowchart 1200. Each processor 1044 is connected to a communication infrastructure 1042 (e.g., a communications bus, cross-bar, or network). Various software embodiments are described in terms of this exemplary computer system. After reading this description, it will become apparent to a person skilled in the relevant art how to implement the invention using other computer systems and/or computer architectures. For example, SAN server 302 and/or NAS server 304 may include one or more of processor 1044.

Computer system 1040 can include a display interface 1002 that forwards graphics, text, and other data from the communication infrastructure 1042 (or from a frame buffer not shown) for display on the display unit 1030. For example, administrative interface 412 may include a display unit 1030 that displays GUI 1200. The display unit 1030 may be included in the structure of storage appliance 210, or may be separate. For instance, GUI communication link 426 may be included in display interface 1002. Display interface 1002 may include a network connection, including a LAN, WAN, or the Internet, such that GUI 1200 may be viewed remotely from SAN server 302.

Computer system 1040 also includes a main memory 1046, preferably random access memory (RAM), and can also include a secondary memory 1048. The secondary memory 1048 can include, for example, a hard disk drive 1050 and/or a removable storage drive 1052, representing a floppy disk drive, a magnetic tape drive, an optical disk drive, etc. The removable storage drive 1052 reads from and/or writes to a removable storage unit 1054 in a well known manner. Removable storage unit 1054 represents a floppy disk, magnetic tape, optical disk, etc., which is read by and written to by removable storage drive 1052. As will be appreciated, the removable storage unit 1054 includes a computer usable storage medium having stored therein computer software and/or data.

In alternative embodiments, secondary memory 1048 may include other similar means for allowing computer programs or other instructions to be loaded into computer system 1040. Such means can include, for example, a removable storage unit 1062 and an interface 1060. Examples can include a program cartridge and cartridge interface (such as that found in video game devices), a removable memory chip (such as an EPROM, or PROM) and associated socket, and other removable storage units 1062 and interfaces 1060 which allow software and data to be transferred from the removable storage unit 1062 to computer system 1040.

Computer system 1040 can also include a communications interface 1064. For example, first network interface 406, second network interface 402, and SAN server interface 408 shown in FIG. 4, and first network interface 508 and second network interface 502 shown in FIG. 5, may include one or more aspects of communications interface 1064. Communications interface 1064 allows software and data to be transferred between computer system 1040 and external devices via communications path 1066. Examples of communications interface 1064 can include a modem, a network interface (such as Ethernet card), a communications port, interfaces described above, etc. Software and data transferred via communications interface 1064 are in the form of signals which can be electronic, electromagnetic, optical or other signals capable of being received by communications interface 1064, via communications path 1066. Note that communications interface 1064 provides a means by which computer system 1040 can interface to a network such as the Internet.

The present invention can be implemented using software running (that is, executing) in an environment similar to that described above with respect to FIG. 8. In this document, the term "computer program product" is used to generally refer to removable storage unit 1054, a hard disk installed in hard disk drive 1050, or a carrier wave carrying software over a communication path 1066 (wireless link or cable) to communication interface 1064. A computer useable medium can include magnetic media, optical media, or other recordable media, or media that transmits a carrier wave or other signal. These computer program products are means for providing software to computer system 1040.

Computer programs (also called computer control logic) are stored in main memory 1046 and/or secondary memory 1048. Computer programs can also be received via communications interface 1064. Such computer programs, when executed, enable the computer system 1040 to perform the features of the present invention as discussed herein. In particular, the computer programs, when executed, enable the processor 1044 to perform features of the present invention. Accordingly, such computer programs represent controllers of the computer system 1040.

The present invention can be implemented as control logic in software, firmware, hardware or any combination thereof. In an embodiment where the invention is implemented using software, the software may be stored in a computer program product and loaded into computer system 1040 using removable storage drive 1052, hard disk drive 1050, or interface 1060. Alternatively, the computer program product may be downloaded to computer system 1040 over communications path 1066. The control logic (software), when executed by the one or more processors 1044, causes the processor(s) 1044 to perform functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s) from the teachings herein.

12.0 CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for interfacing a storage area network (SAN) with a first data communication network, wherein one or more hosts coupled to the first data communication network can access data stored in one or more of a plurality of storage devices in the SAN, wherein the one or more hosts access one or more of the plurality of storage devices as network attached storage (NAS), comprising the steps of:

coupling a SAN server to a SAN;

coupling a NAS server to the SAN server through a second data communication network;

coupling the NAS server to the first data communication network;

allocating a portion of at least one of the plurality of storage devices from the SAN server to the NAS server;

configuring the allocated portion as NAS storage in the NAS server;

exporting the configured portion from the NAS server to be accessible to the one or more hosts coupled to the first data communication network.

2. The method of claim 1, wherein the SAN server is configured to allocate storage from the SAN to at least one host attached to the second data communication network, further comprising the step of:

coupling the SAN server to the second data communication network.

3. The method of claim 2, wherein said allocating step comprises the step of:

viewing the NAS server from the SAN server as a host attached to the second data communication network.

4. The method of claim 3, wherein said allocating step further comprises the step of:

allocating the portion of at least one of the plurality of storage devices from the SAN server to the NAS server in the same manner as the portion would be allocated from the SAN server to a host attached to the second data communication network.

5. The method of claim 1, further comprising the steps of:
coupling an administrative interface to the SAN server; and
receiving a storage allocation directive from the administrative interface with the SAN server.

6. The method of claim 5, wherein said allocating step comprises the step of:
sending a NAS protocol storage allocation message from the SAN server to the NAS server.

7. The method of claim 6, further comprising the step of:
sending a response from the NAS server to the SAN server that indicates whether said configuring step was successful.

8. The method of claim 1, further comprising the steps of:
deallocating a second virtual NAS storage device to form a deallocated storage portion;
unexporting the virtual NAS storage device; and
deconfiguring the deallocated storage portion.

9. The method of claim 8, further comprising the step of:
receiving a storage deallocation directive from an administrative interface with the SAN server.

10. The method of claim 9, wherein said deallocating step comprises the step of:
sending a NAS protocol storage deallocation message from the SAN server to the NAS server.

11. The method of claim 10, further comprising the step of:
sending a response from the NAS server to the SAN server that indicates whether said deconfiguring step was successful.

12. The method of claim 1, further comprising the step of:
coupling a second NAS server in parallel with the first NAS server.

13. The method of claim 12, further comprising the steps of:
determining the failure of the first NAS server; and
performing fail-over of storage resources from the first NAS server to the second NAS server.

14. The method of claim 13, wherein said determining step comprises the step of:
monitoring a heartbeat signal sent from the first NAS server at the second NAS server.

15. The method of claim 13, further comprising the steps of:
notifying the second NAS server that the first NAS server has recovered; and
returning control of the storage resources to the first NAS server.

16. A method for managing the allocation of storage from a storage area network (SAN) as network attached storage (NAS) to a data communication network, comprising the steps of:
(a) receiving a storage management directive from a graphical user interface;
(b) sending a message corresponding to the received storage management directive to a NAS server; and
(c) receiving a response corresponding to the sent message from the NAS server.

17. The method of claim 16, further comprising the steps of:
(d) providing an command line interface (CLI) at the graphical user interface; and (e) allowing a user to input the storage directive as a CLI command into the CLI.

18. The method of claim 16, wherein said message is a NAS protocol message, wherein step (b) comprises the step of:
sending a NAS protocol message corresponding to the received storage directive to a NAS server.

19. The method of claim 16, wherein step (a) comprises the step of:
receiving a storage management directive from the graphical user interface that is any one of the following storage management directives: storage allocation, list file systems, export file system, unexport file system, set permissions, obtain statistics, or configure NAS server.

20. An apparatus for accessing a plurality of storage devices in a storage area network (SAN) as network attached storage (NAS) in a data communication network, comprising:
a SAN server that includes:
 a first interface configured to be coupled to the SAN; and
 a second interface that is coupled to a first data communication network; and
a NAS server that includes:
 a third interface configured to be coupled to a second data communication network; and
 a fourth interface that is coupled to said first data communication network;
wherein said SAN server allocates a first portion of the plurality of storage devices in the SAN to be accessible through said second interface to at least one first host coupled to said first data communication network;
wherein said SAN server allocates a second portion of the plurality of storage devices in the SAN to said NAS server; and
wherein said NAS server configures access to said second portion of the plurality of storage devices to at least one second host coupled to said second data communication network.

21. The apparatus of claim 20, wherein said first portion of the plurality of storage devices in the SAN includes a first at least one physical storage device, wherein said SAN server further includes:
a storage mapper that maps said first at least one physical storage device to at least one first logical storage device that is accessible to said at least one first host;
wherein said second portion of the plurality of storage devices in the SAN includes a second at least one physical storage device; and
wherein said storage mapper maps said second at least one physical storage device to at least one second logical storage device that is allocated to said NAS server.

22. The apparatus of claim 20, wherein each of said first interface, said second interface, and said fourth interface includes a fibre channel or SCSI interface, and wherein said third interface includes an Ethernet adaptor.

23. The apparatus of claim 20, further comprising a storage appliance, wherein said SAN server and said NAS server are included in said storage appliance.

24. The apparatus of claim 20, wherein said NAS server exports at least a portion of said second portion of said plurality of storage devices through said third interface to said second data communication network using network file system (NFS) protocol.

25. The apparatus of claim 20, wherein said NAS server exports at least a portion of said second portion of said plurality of storage devices through said third interface to said second data communication network using common Internet file system (CIFS) protocol.

26. The apparatus of claim 20, further comprising an administrative interface coupled to said SAN server.

27. The apparatus of claim 26, wherein said administrative interface includes a graphical user interface.

28. The apparatus of claim 20, further comprising a fibre channel switch coupled between said second interface of said SAN server and said first data communication network.

29. The apparatus of claim 20, further comprising a fibre channel switch coupled between said first interface of said SAN server and said SAN.

30. A storage appliance for accessing a plurality of storage devices in a storage area network (SAN) as network attached storage (NAS) in a data communication network, comprising:

a first SAN server configured to be coupled to the plurality of storage devices in the SAN via a first data communication network, wherein said first SAN server is configured to be coupled to a second data communication network;

a second SAN server configured to be coupled to the plurality of storage devices in the SAN via a third data communication network, wherein said second SAN server is configured to be coupled to a fourth data communication network;

a first NAS server configured to be coupled to a fifth data communication network, wherein said first NAS server is coupled to said second and said fourth data communication networks; and a second NAS server configured to be coupled to said fifth data communication network, wherein said second NAS server is coupled to said second and said fourth data communication networks;

wherein said first SAN server allocates a first portion of the plurality of storage devices in the SAN to be accessible to at least one first host coupled to said second data communication network;

wherein said first SAN server allocates a second portion of the plurality of storage devices in the SAN to said first NAS server;

wherein said first NAS server configures access to said second portion of the plurality of storage devices to at least one second host coupled to said fifth data communication network;

wherein said second NAS server assumes the configuring of access to said second portion of the plurality of storage devices by said first NAS server during failure of said first NAS server; and wherein said second SAN server assumes allocation of said second portion of the plurality of storage devices by said first SAN server during failure of said first SAN server.

31. The apparatus of claim 30, further comprising:

a first fibre channel switch coupled between said first SAN server and said second data communication network; and a second fibre channel switch coupled between said second SAN server and said fourth data communication network.

32. The apparatus of claim 30, further comprising:

a first fibre channel switch coupled between said first SAN server and said first data communication network; and a second fibre channel switch coupled between said second SAN server and said third data communication network.

33. A system for interfacing a storage area network (SAN) with a first data communication network, wherein one or more hosts coupled to the first data communication network can access data stored in one or more of a plurality of storage devices in the SAN, wherein the one or more hosts access one or more of the plurality of storage devices as network attached storage (NAS), comprising the steps of:

means for coupling a SAN server to a SAN;

means for coupling a NAS server to the SAN server through a second data communication network;

means for coupling the NAS server to the first data communication network;

means for allocating a portion of at least one of the plurality of storage devices from the SAN server to the NAS server;

means for configuring the allocated portion as NAS storage in the NAS server; and means for exporting the configured portion from the NAS server to be accessible to the one or more hosts coupled to the first data communication network.

34. The system of claim 33, wherein the SAN server is configured to allocate storage from the SAN to at least one host attached to the second data communication network, further comprising:

means for coupling the SAN server to the second data communication network.

35. The system of claim 34, wherein said means for allocating comprises:

means for viewing the NAS server from the SAN server as a host attached to the second data communication network.

36. The system of claim 35, wherein means for allocating further comprises:

means for allocating the portion of at least one of the plurality of storage devices from the SAN server to the NAS server in the same manner as the portion would be allocated from the SAN server to a host attached to the second data communication network.

37. The system of claim 33, further comprising:

means for coupling an administrative interface to the SAN server; and means for receiving a storage allocation directive from the administrative interface with the SAN server.

* * * * *